(12) United States Patent
Shelton, IV et al.

(10) Patent No.: US 12,499,266 B2
(45) Date of Patent: Dec. 16, 2025

(54) PATIENT DATA REMOVAL

(71) Applicant: Cilag GmbH International, Zug (CH)

(72) Inventors: Frederick E. Shelton, IV, Hillsboro, OH (US); Matthew David Cowperthwait, Cincinnati, OH (US); Christopher Waid, Cincinnati, OH (US); Taylor W. Aronhalt, Loveland, OH (US); Jason L. Harris, Lebanon, OH (US)

(73) Assignee: Cilag GmbH International, Zug (CH)

( * ) Notice: Subject to any disclaimer, the term of this patent is extended or adjusted under 35 U.S.C. 154(b) by 268 days.

(21) Appl. No.: 17/958,245

(22) Filed: Sep. 30, 2022

(65) Prior Publication Data

US 2024/0111893 A1     Apr. 4, 2024

(51) Int. Cl.
  *G06F 21/62*     (2013.01)
  *G06F 21/60*     (2013.01)

(52) U.S. Cl.
  CPC ........ *G06F 21/6245* (2013.01); *G06F 21/604* (2013.01)

(58) Field of Classification Search
  CPC . G06F 21/6245; G06F 21/604; G06F 21/6254
  See application file for complete search history.

(56) References Cited

U.S. PATENT DOCUMENTS

| | | |
|---|---|---|
| D229,784 S | 1/1974 | Carter et al. |
| 6,171,112 B1 | 1/2001 | Clark et al. |
| 6,941,271 B1 | 9/2005 | Soong |
| 7,308,412 B2 | 12/2007 | Rakshit et al. |
| 7,490,048 B2 | 2/2009 | Joao |
| 7,860,793 B2 | 12/2010 | Karkanias et al. |

(Continued)

FOREIGN PATENT DOCUMENTS

| | | |
|---|---|---|
| EP | 2439668 A1 | 4/2012 |
| JP | 2020062494 A | 4/2020 |
| WO | 2022103404 A1 | 5/2022 |

OTHER PUBLICATIONS

International Search Report and Written Opinion received for PCT Application No. PCT/IB2023/059762, mailed on Nov. 28, 2023, 23 pages.

(Continued)

*Primary Examiner* — Mohammad W Reza
(74) *Attorney, Agent, or Firm* — Condo Roccia Koptiw LLP

(57) ABSTRACT

A data system may adjust the input data to a machine learning model based on a change in a consent associated with a patient. The data system may detect the change in the consent associated with the patient. The data system may identify private data associated with the change in the consent. The data system may identify a machine learning model to which the private data has contributed. The data system may determine input data that has contributed to the machine learning model. The input data may include the private data. The data system may determine, based on the change in the consent associated with the private data, whether to replace the private data in the input data with replacement data. The data system may adjust the input data based on the determination of whether to replace the private data in the input data with replacement data.

20 Claims, 17 Drawing Sheets

(56) References Cited

U.S. PATENT DOCUMENTS

| | | |
|---|---|---|
| 8,566,113 B2 | 10/2013 | Friedlander et al. |
| 8,725,536 B2 | 5/2014 | Deobhakta et al. |
| 9,298,766 B2 | 3/2016 | Kozloski et al. |
| 9,471,623 B2 | 10/2016 | Kozloski et al. |
| 9,569,593 B2 | 2/2017 | Casella Dos Santos |
| 9,569,594 B2 | 2/2017 | Casella Dos Santos |
| 9,785,753 B2 | 10/2017 | Casella Dos Santos |
| 9,788,907 B1 | 10/2017 | Alvi et al. |
| 9,790,557 B2 | 10/2017 | Blelloch et al. |
| 9,875,592 B1 | 1/2018 | Erickson et al. |
| 10,199,124 B2 | 2/2019 | Casella Dos Santos |
| 10,304,062 B1 | 5/2019 | Hines |
| 10,325,079 B1 | 6/2019 | Vukich et al. |
| 10,348,505 B1 | 7/2019 | Crawforth et al. |
| 10,355,865 B1 | 7/2019 | Crawforth et al. |
| 10,460,078 B2 | 10/2019 | Turner, Jr. et al. |
| 10,490,304 B2 | 11/2019 | Shah |
| 10,560,272 B2 | 2/2020 | Yang et al. |
| 10,592,503 B2 | 3/2020 | Kozloski et al. |
| 10,628,833 B2 | 4/2020 | Hines |
| 10,755,700 B2 | 8/2020 | Lewis et al. |
| 10,795,975 B2 | 10/2020 | Vukich et al. |
| 10,811,124 B2 | 10/2020 | Shah |
| 10,841,286 B1 | 11/2020 | Davidovics et al. |
| 10,853,456 B1 | 12/2020 | Crawforth et al. |
| 10,867,299 B2 | 12/2020 | Cheng et al. |
| 10,878,939 B2 | 12/2020 | Sadhasivam |
| 10,881,399 B2 | 1/2021 | Shelton, IV et al. |
| 10,885,170 B1 | 1/2021 | Maliani |
| 10,966,791 B2 | 4/2021 | Harris et al. |
| 10,978,192 B2 | 4/2021 | Casella Dos Santos |
| 10,984,894 B2 | 4/2021 | Foley et al. |
| 10,992,458 B2 | 4/2021 | Natanzon et al. |
| 10,992,676 B2 | 4/2021 | Zlotnick et al. |
| 11,003,883 B2 | 5/2021 | Aronoff-Spencer et al. |
| 11,055,384 B1 | 7/2021 | Crawforth et al. |
| 11,055,419 B2 | 7/2021 | Williams et al. |
| 11,057,192 B2 | 7/2021 | Zheng et al. |
| 11,061,798 B1 | 7/2021 | Jain et al. |
| 11,100,533 B1 | 8/2021 | Taubeneck et al. |
| 11,144,660 B2 | 10/2021 | Latka et al. |
| 11,144,674 B2 | 10/2021 | Yang |
| 11,146,403 B2 | 10/2021 | Ponnuru et al. |
| 11,159,376 B2 | 10/2021 | Liebinger et al. |
| 11,163,855 B1 | 11/2021 | Crawforth et al. |
| 11,170,376 B2 | 11/2021 | Kavali |
| 11,194,919 B2 | 12/2021 | Karia et al. |
| 11,214,839 B2 | 1/2022 | Chowdhury et al. |
| 11,240,003 B2 | 2/2022 | Cao et al. |
| 11,244,059 B2 | 2/2022 | Yoon et al. |
| 11,256,712 B2 | 2/2022 | Duraisamy et al. |
| 11,256,826 B2 | 2/2022 | Kottekulam et al. |
| 11,269,859 B1 | 3/2022 | Luedtke et al. |
| 11,270,263 B2 | 3/2022 | Shah |
| 11,294,999 B2 | 4/2022 | Dubeau |
| 11,304,699 B2 | 4/2022 | Shelton, IV et al. |
| 11,314,891 B2 | 4/2022 | Hennebert et al. |
| 11,327,950 B2 | 5/2022 | Thapar et al. |
| 11,341,493 B2 | 5/2022 | Cheng et al. |
| 11,362,914 B2 | 6/2022 | Jetzfellner |
| 11,374,738 B2 | 6/2022 | Cran |
| 11,386,405 B2 | 7/2022 | Pandit et al. |
| 11,423,052 B2 | 8/2022 | Pandit et al. |
| 11,436,368 B2 | 9/2022 | Beno et al. |
| 11,478,124 B2 | 10/2022 | Ninh et al. |
| 11,501,007 B2 | 11/2022 | Beno et al. |
| 11,522,703 B1 | 12/2022 | Jain et al. |
| 11,532,395 B2 | 12/2022 | Sharma et al. |
| 11,559,308 B2 | 1/2023 | Yates et al. |
| 11,576,677 B2 | 2/2023 | Shelton, IV et al. |
| 11,618,924 B2 | 4/2023 | Chidambaran et al. |
| 11,651,096 B2 | 5/2023 | Ricotta, Jr. et al. |
| 11,723,642 B2 | 8/2023 | Shelton, IV et al. |
| 11,870,920 B2 | 1/2024 | Ricotta et al. |
| 11,871,901 B2 | 1/2024 | Shelton, IV et al. |
| 11,886,421 B2 | 1/2024 | Padmanabhan |
| 11,899,817 B2 | 2/2024 | Padmanabhan |
| 11,923,068 B2 | 3/2024 | Nawana et al. |
| 12,002,554 B2 | 6/2024 | Hassett |
| 12,008,232 B2 | 6/2024 | Park et al. |
| 2003/0033168 A1 | 2/2003 | Califano et al. |
| 2003/0074564 A1 | 4/2003 | Peterson |
| 2005/0125254 A1 | 6/2005 | Schoenberg |
| 2005/0177400 A1 | 8/2005 | Rosenfeld et al. |
| 2006/0293925 A1 | 12/2006 | Flom |
| 2007/0078685 A1 | 4/2007 | Dettinger et al. |
| 2007/0208263 A1 | 9/2007 | John et al. |
| 2009/0150292 A1 | 6/2009 | Trinh et al. |
| 2009/0240681 A1 | 9/2009 | Saddiqi et al. |
| 2009/0327297 A1 | 12/2009 | Deobhakta et al. |
| 2010/0063841 A1 | 3/2010 | D' Ambrosia et al. |
| 2010/0094654 A1 | 4/2010 | Stewart |
| 2010/0299159 A1 | 11/2010 | Califano et al. |
| 2011/0022414 A1 | 1/2011 | Carr et al. |
| 2011/0078104 A1 | 3/2011 | Honkola et al. |
| 2012/0089412 A1 | 4/2012 | Bardy et al. |
| 2012/0259648 A1 | 10/2012 | Mallon et al. |
| 2012/0259651 A1 | 10/2012 | Mallon et al. |
| 2012/0310670 A1 | 12/2012 | Pruitt |
| 2013/0194092 A1 | 8/2013 | Moriarty et al. |
| 2014/0012922 A1 | 1/2014 | Wu |
| 2014/0200919 A1 | 7/2014 | Malec |
| 2015/0074409 A1 | 3/2015 | Reid et al. |
| 2015/0302766 A1 | 10/2015 | Oberlander et al. |
| 2015/0347705 A1 | 12/2015 | Simon et al. |
| 2016/0019372 A1 | 1/2016 | Clark |
| 2016/0080364 A1 | 3/2016 | Karimzadeh et al. |
| 2016/0232304 A1 | 8/2016 | Goyal |
| 2017/0202605 A1 | 7/2017 | Shelton, IV et al. |
| 2017/0243344 A1 | 8/2017 | Yu et al. |
| 2017/0372096 A1 | 12/2017 | Yousfi et al. |
| 2018/0007320 A1 | 1/2018 | Greco et al. |
| 2018/0012039 A1 | 1/2018 | Takahashi et al. |
| 2018/0049822 A1 | 2/2018 | Henderson et al. |
| 2018/0068068 A1 | 3/2018 | Bronkalla |
| 2018/0075202 A1 | 3/2018 | Davis et al. |
| 2018/0082024 A1 | 3/2018 | Curbera et al. |
| 2018/0121605 A1 | 5/2018 | Allen et al. |
| 2018/0211010 A1 | 7/2018 | Malhotra et al. |
| 2018/0353698 A1 | 12/2018 | Saint et al. |
| 2019/0059929 A1 | 2/2019 | Shelton, IV et al. |
| 2019/0087542 A1 | 3/2019 | Ingraham |
| 2019/0104919 A1 | 4/2019 | Shelton, IV et al. |
| 2019/0200844 A1 | 7/2019 | Shelton, IV et al. |
| 2019/0200981 A1 | 7/2019 | Harris et al. |
| 2019/0200988 A1 | 7/2019 | Shelton, IV |
| 2019/0201033 A1 | 7/2019 | Yates et al. |
| 2019/0201047 A1 | 7/2019 | Yates et al. |
| 2019/0201115 A1 | 7/2019 | Shelton, IV et al. |
| 2019/0201137 A1 | 7/2019 | Shelton, IV et al. |
| 2019/0205441 A1 | 7/2019 | Shelton, IV et al. |
| 2019/0205567 A1 | 7/2019 | Shelton, IV et al. |
| 2019/0206216 A1 | 7/2019 | Shelton, IV et al. |
| 2019/0206551 A1 | 7/2019 | Yates et al. |
| 2019/0206562 A1 | 7/2019 | Shelton, IV et al. |
| 2019/0206564 A1 | 7/2019 | Shelton, IV et al. |
| 2019/0206569 A1 | 7/2019 | Shelton, IV et al. |
| 2019/0207773 A1 | 7/2019 | Shelton, IV et al. |
| 2019/0207911 A1 | 7/2019 | Wiener et al. |
| 2019/0216452 A1 | 7/2019 | Nawana et al. |
| 2019/0348158 A1 | 11/2019 | Livesay et al. |
| 2019/0371479 A1 | 12/2019 | Rondoni et al. |
| 2020/0015907 A1 | 1/2020 | Scheib |
| 2020/0097910 A1 | 3/2020 | Krasnov et al. |
| 2020/0118686 A1 | 4/2020 | Jooste et al. |
| 2020/0275976 A1 | 9/2020 | Mckinnon et al. |
| 2020/0315452 A1 | 10/2020 | Dirghangi et al. |
| 2020/0380155 A1 | 12/2020 | Sarferaz |
| 2020/0394334 A1 | 12/2020 | Bulut et al. |
| 2020/0394615 A1* | 12/2020 | Sethre .................. G06N 5/02 |
| 2020/0402650 A1* | 12/2020 | Mitsumori ............ G06N 20/20 |
| 2020/0405296 A1 | 12/2020 | Shelton, IV et al. |
| 2021/0005299 A1 | 1/2021 | Mcfarlane |
| 2021/0006553 A1 | 1/2021 | Matsunaga |

(56) References Cited

U.S. PATENT DOCUMENTS

| | | |
|---|---|---|
| 2021/0084109 A1 | 3/2021 | Gimenez et al. |
| 2021/0118547 A1 | 4/2021 | Morris et al. |
| 2021/0133557 A1 | 5/2021 | Iyoob et al. |
| 2021/0174415 A1 | 6/2021 | Narasimhan et al. |
| 2021/0182932 A1 | 6/2021 | Bello, Jr. |
| 2021/0280286 A1 | 9/2021 | Ravindranathan et al. |
| 2021/0397735 A1 | 12/2021 | Samatov et al. |
| 2021/0407632 A1 | 12/2021 | Carlson et al. |
| 2022/0000556 A1 | 1/2022 | Casey et al. |
| 2022/0052847 A1 | 2/2022 | Gonzalez et al. |
| 2022/0059209 A1 | 2/2022 | Woo et al. |
| 2022/0127459 A1 | 4/2022 | De et al. |
| 2022/0157459 A1 | 5/2022 | Siewerdsen et al. |
| 2022/0198784 A1* | 6/2022 | Toporek ............ G06V 10/7747 |
| 2022/0202369 A1 | 6/2022 | Roche |
| 2022/0215942 A1 | 7/2022 | Piatnik |
| 2022/0233102 A1 | 7/2022 | Shelton, IV et al. |
| 2022/0233119 A1 | 7/2022 | Shelton, IV et al. |
| 2022/0238216 A1 | 7/2022 | Shelton, IV et al. |
| 2022/0331019 A1 | 10/2022 | Gough et al. |
| 2023/0026634 A1 | 1/2023 | Shelton, IV et al. |
| 2023/0027210 A1 | 1/2023 | Shelton, IV et al. |
| 2023/0049758 A1* | 2/2023 | Park ...................... G16H 30/20 |
| 2023/0095002 A1 | 3/2023 | Shelton, IV et al. |
| 2023/0097906 A1 | 3/2023 | Shelton, IV et al. |
| 2023/0098538 A1 | 3/2023 | Shelton, IV et al. |
| 2023/0377714 A1 | 11/2023 | Liarno et al. |
| 2024/0013895 A1 | 1/2024 | Jin et al. |
| 2024/0111893 A1 | 4/2024 | Shelton, IV et al. |
| 2024/0112768 A1 | 4/2024 | Shelton, IV et al. |
| 2024/0112769 A1 | 4/2024 | Shelton, IV et al. |
| 2024/0112770 A1 | 4/2024 | Shelton, IV et al. |
| 2024/0112771 A1 | 4/2024 | Shelton, IV et al. |
| 2024/0112772 A1 | 4/2024 | Shelton, IV et al. |
| 2024/0120041 A1 | 4/2024 | Shelton, IV et al. |
| 2024/0120046 A1 | 4/2024 | Shelton, IV et al. |

OTHER PUBLICATIONS

International Search Report and Written Opinion received for PCT Application No. PCT/IB2023/059771, mailed on Jan. 31, 2024, 16 pages.

Revised Patent Subject Matter Eligibility Guidance, Federal Register, vol. 84, No. 4, Jan. 7, 2019. pp. 50-57.

Yu et al., "Consent Based Workflow Control in EMRs", Procedia Technology, vol. 16, 2014, pp. 1434-1445.

* cited by examiner

PATIENT DATA REMOVAL

CROSS-REFERENCE TO RELATED APPLICATIONS

This application is related to the following, filed contemporaneously, the contents of each of which are incorporated by reference herein:
U.S. patent application Ser. No. 17/958,230, filed Sep. 30, 2022, entitled METHOD FOR HEALTH DATA AND CONSENT MANAGEMENT;
U.S. patent application Ser. No. 17/958,247, filed Sep. 30, 2022, entitled PATIENT DATA CURATION;
U.S. patent application Ser. No. 17/958,241, filed Sep. 30, 2022, entitled PATIENT DATA UTILIZATION REPORTING; and
U.S. patent application Ser. No. 17/958,244, filed Sep. 30, 2022, entitled PATIENT DATA SHARING.

BACKGROUND

Surgical procedures are typically performed in surgical operating theaters or rooms in a healthcare facility such as, for example, a hospital. Various surgical devices and systems are utilized in performance of a surgical procedure. In the digital and information age, medical systems and facilities are often slower to implement systems or procedures utilizing newer and improved technologies due to patient safety and a general desire for maintaining traditional practices.

SUMMARY

A data propagation reporting system may obtain an annotation associated with health data associated with a patient and may determine, based on the annotation, utilization information associated with the patient's health data. The data propagation reporting system may generate a patient data utilization report that may include at least a portion of the utilization information associated with the patient. The utilization information may indicate at least one of: the system(s) in which the health data associated with the patient has been used, when the health data associated with the patient has been accessed, or the purpose(s) for which the health data associated with the patient has been used. The utilization information may indicate the control program(s) (e.g., system algorithms) to which the patient's data has been contributed. The utilization information may indicate the data collection(s) in which the patient's data has been included.

The data propagation reporting system may obtain an indication that the health data patient data has been accessed. Based on the indication, the data propagation reporting system may generate an access annotation configured to indicate that the health care associated with the patient was accessed. The access annotation may be added to the health data. The annotation used for generating patient data utilization report(s) may include the access annotation.

The health data associated with the patient may include multiple datasets associated with the patient. The data propagation reporting system may obtain an indication of an algorithm to which one or more datasets associated with the patient have contributed. Based on the indication, the data propagation reporting system may generate a contribution annotation configured to indicate that the dataset(s) associated with the patient has contributed to the algorithm. The contribution annotation may be added to, or associated to, the patient's health data. The annotation used for generating patient data utilization report(s) may include the contribution annotation.

The data propagation reporting system may obtain an indication of a data collection in which a dataset of the plurality of datasets associated with the patient is included. Based on the indication, the data propagation reporting system may generate an inclusion annotation configured to indicate that the dataset associated with the patient is included in the data collection. The inclusion annotation may be added to the health data. The annotation used for generating patient data utilization report(s) may include the inclusion annotation.

A health data management system may obtain a consent key for accessing health data associated with a patient. The system may determine that at least some of the health data associated with the patient is stored in an external system, different from the health data system. The external system may be, for example, a second health data management system or a secure storage container associated with the patient. The health data management system(s) may each be associated with a different health care provider. The health data system may send a request to access the health data associated with the patient. The access request may include a consent key associated with the patient's consent data. The consent key may be, may include, and/or may indicate the patient's consent data. The consent key may be generated based on the patient's consent data. The health data system may access the health data associated with the patient from the external system (e.g., upon the external system authorizing access based on the consent key).

The health data system may identify a modification (e.g., addition, revision, deletion and/or the like) to the health data stored in the external system. The health data system may send a request to modify the health data. The request to modify the health data may include a second consent key. The second consent key may be related to the consenting to modifications of patient data across systems associated with separate entities.

The health data system may receive, e.g., from an external system, a request to access health data associated with a patient. The request may be received with a consent key. The health data system may verify that the consent key indicates that the external system has consent from the patient to access the health data. The health data system may provide access to the health data to the external system, based on the verification.

The consent key may be associated with patient consent data. For example, the health data system may provide access to the patient's health data to an external system and may receive an indication that the patient has made a change to the patient consent data. The health data system may determine, based on the change to the patient consent data, whether to continue to provide access to the health data to the external system.

A medical data processing system may associate a utilization score with data in a dataset. For example, the medical data processing system may obtain a dataset including medical data. The medical data processing system may obtain an indication of a control program and determine, for the control program, a utilization score of the dataset. The medical data processing system may associate the utilization score with the medical data in the dataset. The utilization score may indicate a level of valuableness of the dataset to the control program.

The medical data processing system may determine the utilization score of the dataset based on metadata associated with the dataset. For example, the medical data processing system may determine the metadata associated with the dataset, retrieve the metadata associated with the dataset from a metadata repository, and determine the utilization score of the dataset based on the metadata associated with the dataset. The metadata repository may include one or more of structural metadata, administrative metadata, or external metadata.

The medical data processing system may determine the utilization score of the dataset based on the type of the control program. For example, the medical data processing system may determine the type of the control program based on the indication of the control program. The type of the control program may include a program type configured to control an operational parameter of a medical device.

The medical data processing system may determine the utilization score of the dataset based on the output of a machine learning model. For example, the medical data processing system may input the medical data of the dataset to the machine learning model. The medical data processing system may predict a valuableness of the dataset to the control program based on an output of the machine learning model. The output of the machine learning model may include one or more of an association, a number of interactions, a pattern, and/or a trend associated with the medical data of the dataset.

The medical data processing system may compartmentalize the dataset into subsets of medical data. For example, the medical data processing system may determine that a first field in the dataset contributes to the utilization score to a greater extent than a second field in the dataset. The medical data processing system may compartmentalize the dataset into a first subset of medical data associated with the first field and a second subset of medical data associated with the second field. The medical data processing system may continue collecting medical data associated with the first field and add the collected medical data associated with the first field to the first subset of medical data associated with the first field. The medical data processing system may discontinue collecting additional medical data associated with the second field.

The medical data processing system may rank datasets in a database based on a utilization score associated with a respective dataset. For example, the medical data processing system may obtain a first dataset and a second dataset from the database and determine a first utilization score for the first dataset and a second utilization score for the second dataset, for example, as described in one or more examples herein. The medical data processing system may rank the first dataset and the second dataset based on the first utilization score and the second utilization score. The medical data processing system may determine that the first dataset is ranked higher than the second dataset and discontinue collecting additional medical data associated with the second dataset based on the determination that the first dataset is ranked higher than the second dataset.

The medical data processing system may determine the utilization score of the dataset based on medical data in addition to medical data collected when medical device(s) is in control loop operation(s). For example, the dataset may include medical data collected from a controller of a medical device when the medical device is in a control loop operation. The medical data processing system may determine the utilization score of the dataset based on data in addition to the medical data collected when the medical device is in the control loop operation.

A data system may adjust the input data to a machine learning model based on change(s) in the consent associated with a patient. The data system may detect the change in the consent associated with the patient. The data system may identify private data associated with the change in the consent. The data system may identify a machine learning model to which the private data has contributed. The data system may determine input data that has contributed to the machine learning model. The input data may include the private data. The data system may determine, based on the change in the consent associated with the private data, whether to replace the private data in the input data with replacement data. The data system may adjust the input data based on the determination of whether to replace the private data in the input data with replacement data, by one or more of the following: removing at least a portion of the private data, replacing the private data with private data that differs from the private data associated with change in the consent, replacing the private data with public data, or converting the private data to public data.

If the data system determines, based on the change in the consent, to replace the private data, the data system may generate synthetic data based on the private data and replace the private data in the input data with the generated synthetic data. The data system may obtain private data that is not impacted by the change in the consent based on the private data associated with the change in the consent and replace the private data associated with the change in the consent with the private data that is not impacted by the change in the consent.

In some examples, the data system may determine to remove the private data associated with the change in the consent, and adjust the machine learning model to compensate for the removal. For example, the data system may determine to remove at least a portion of the private data from the input data and not to replace the removed portion of the private data. The data system may identify an impacted model parameter associated with the machine learning model based on the removed portion of the private data. The data system may determine a weight adjustment to the impacted model parameter based on removed portion of the private data. The data system may adjust the machine learning model based on the determined weight adjustment associated with the impacted model parameter.

The data system may determine whether to replace the private data with replacement data based on a predicted change of the output of the machine learning model. The data system may predict a change of the output of the machine learning model based on the change in the consent associated with the private data. In examples, the data system may determine whether to replace the private data with replacement data based on an impact score associated with the private data. For example, the data system may determine the impact score based on the number of model parameters that are to be impacted by a removal of the private data and/or the extent to which the model parameters are to be impacted by the removal of the private data. For example, the extent to which a model parameter is to be impacted by the removal of the private data may be indicated by a weight (e.g., change in weight) of the model parameter associated with the machine learning model. If the determined impact score is greater than or equal to a threshold, the data system may replace the private data with the replacement data. If the determined impact score is less than the threshold, the data system may not replace the private data with the replacement data.

The data system may determine whether a dataset contains private data based on a machine learning model. For example, the data system may determine a classification parameter for the dataset based on a data classification machine learning model. The classification parameter may indicate a privacy level associated with the dataset. The privacy level being private may indicate that the dataset is capable of identifying a patient. The privacy level being public may indicate that the dataset is not capable of identifying a patient. The data system may add the classification parameter in metadata of the dataset. The data system may identify the private data associated with the change in the consent associated with the patient based on the classification parameter of the dataset. In some examples, the data system may replace the private data associated with the change in the consent with public data based on the data system identifying the public data using the classification parameter associated with a dataset that includes the public data.

BRIEF DESCRIPTION OF THE DRAWINGS

Examples described herein may include a Brief Description of the Drawings.

DETAILED DESCRIPTION

Figure 1:
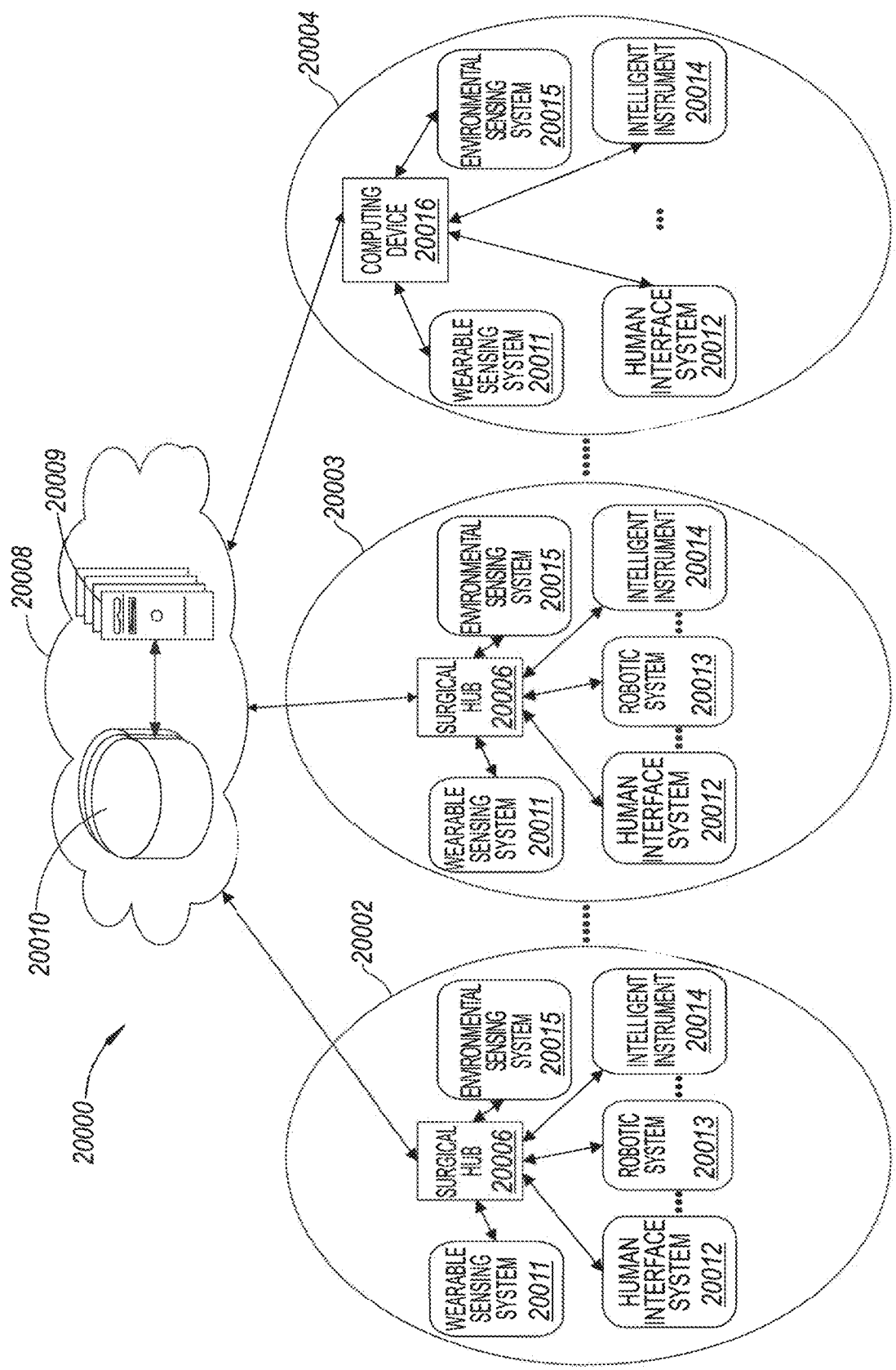
FIG. 1 is a block diagram of a computer-implemented surgical system.

FIG. 1 is a block diagram of a computer-implemented surgical system 20000. An example surgical system such as the surgical system 20000 may include one or more surgical systems (e.g., surgical sub-systems) 20002, 20003 and 20004. For example, surgical system 20002 may include a computer-implemented interactive surgical system. For example, surgical system 20002 may include a surgical hub 20006 and/or a computing device 20016 in communication with a cloud computing system 20008, for example, as described in FIG. 2. The cloud computing system 20008 may include at least one remote cloud server 20009 and at least one remote cloud storage unit 20010. Example surgical systems 20002, 20003, or 20004 may include a wearable sensing system 20011, an environmental sensing system 20015, a robotic system 20013, one or more intelligent instruments 20014, human interface system 20012, etc. The human interface system is also referred herein as the human interface device. The wearable sensing system 20011 may include one or more health care professional (HCP) sensing systems, and/or one or more patient sensing systems. The environmental sensing system 20015 may include one or more devices, for example, used for measuring one or more environmental attributes, for example, as further described in FIG. 2. The robotic system 20013 may include a plurality of devices used for performing a surgical procedure, for example, as further described in FIG. 2.

The surgical system 20002 may be in communication with a remote server 20009 that may be part of a cloud computing system 20008. In an example, the surgical system 20002 may be in communication with a remote server 20009 via an internet service provider's cable/FIOS networking node. In an example, a patient sensing system may be in direct communication with a remote server 20009. The surgical system 20002 and/or a component therein may communicate with the remote servers 20009 via a cellular transmission/reception point (TRP) or a base station using one or more of the following cellular protocols: GSM/GPRS/EDGE (2G), UMTS/HSPA (3G), long term evolution (LTE) or 4G, LTE-Advanced (LTE-A), new radio (NR) or 5G.

A surgical hub 20006 may have cooperative interactions with one of more means of displaying the image from the laparoscopic scope and information from one or more other smart devices and one or more sensing systems 20011. The surgical hub 20006 may interact with one or more sensing systems 20011, one or more smart devices, and multiple displays. The surgical hub 20006 may be configured to gather measurement data from the one or more sensing systems 20011 and send notifications or control messages to the one or more sensing systems 20011. The surgical hub 20006 may send and/or receive information including notification information to and/or from the human interface system 20012. The human interface system 20012 may include one or more human interface devices (HIDs). The surgical hub 20006 may send and/or receive notification information or control information to audio, display and/or control information to various devices that are in communication with the surgical hub.

For example, the sensing systems 20001 may include the wearable sensing system 20011 (which may include one or more HCP sensing systems and one or more patient sensing systems) and the environmental sensing system 20015 as discussed in FIG. 1. The one or more sensing systems 20001 may measure data relating to various biomarkers. The one or more sensing systems 20001 may measure the biomarkers using one or more sensors, for example, photosensors (e.g., photodiodes, photoresistors), mechanical sensors (e.g., motion sensors), acoustic sensors, electrical sensors, electrochemical sensors, thermoelectric sensors, infrared sensors, etc. The one or more sensors may measure the biomarkers as described herein using one of more of the following sensing technologies: photoplethysmography, electrocardiography, electroencephalography, colorimetry, impedimentary, potentiometry, amperometry, etc.

The biomarkers measured by the one or more sensing systems 20001 may include, but are not limited to, sleep, core body temperature, maximal oxygen consumption, physical activity, alcohol consumption, respiration rate, oxygen saturation, blood pressure, blood sugar, heart rate variability, blood potential of hydrogen, hydration state, heart rate, skin conductance, peripheral temperature, tissue perfusion pressure, coughing and sneezing, gastrointestinal motility, gastrointestinal tract imaging, respiratory tract bacteria, edema, mental aspects, sweat, circulating tumor cells, autonomic tone, circadian rhythm, and/or menstrual cycle.

The biomarkers may relate to physiologic systems, which may include, but are not limited to, behavior and psychology, cardiovascular system, renal system, skin system, nervous system, gastrointestinal system, respiratory system, endocrine system, immune system, tumor, musculoskeletal system, and/or reproductive system. Information from the biomarkers may be determined and/or used by the computer-implemented patient and the surgical system 20000, for example. The information from the biomarkers may be determined and/or used by the computer-implemented patient and the surgical system 20000 to improve said systems and/or to improve patient outcomes, for example. The one or more sensing systems 20001, biomarkers 20005, and physiological systems are described in more detail in U.S. application Ser. No. 17/156,287, titled METHOD OF ADJUSTING A SURGICAL PARAMETER BASED ON BIOMARKER MEASUREMENTS, filed Jan. 22, 2021, the disclosure of which is herein incorporated by reference in its entirety.

Figure 2:
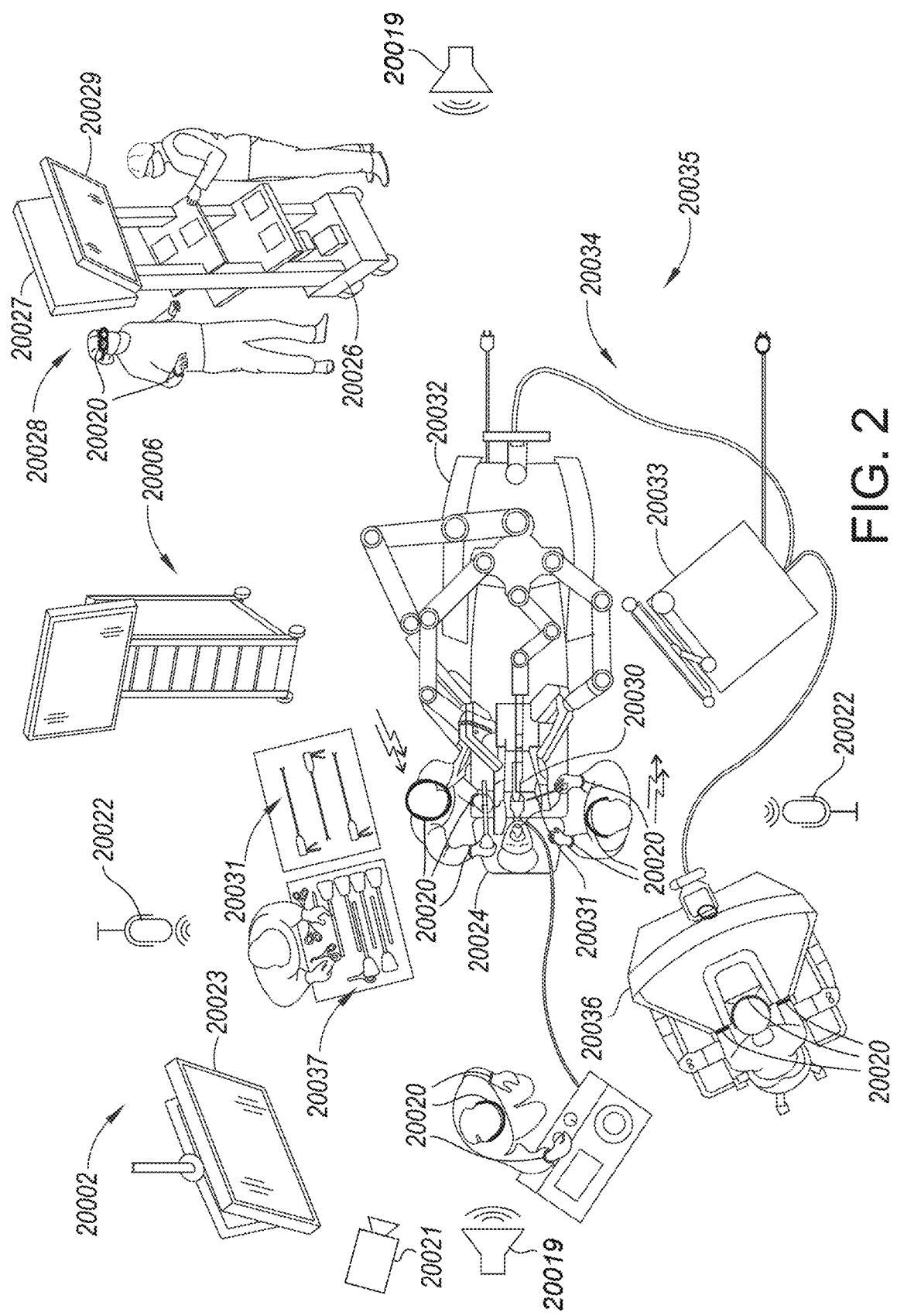
FIG. 2 shows an example surgical system in a surgical operating room.

FIG. 2 shows an example of a surgical system 20002 in a surgical operating room. As illustrated in FIG. 2, a patient is being operated on by one or more health care professionals (HCPs). The HCPs are being monitored by one or more HCP sensing systems 20020 worn by the HCPs. The HCPs and the environment surrounding the HCPs may also be monitored by one or more environmental sensing systems including, for example, a set of cameras 20021, a set of microphones 20022, and other sensors that may be deployed in the operating room. The HCP sensing systems 20020 and the environmental sensing systems may be in communication with a surgical hub 20006, which in turn may be in communication with one or more cloud servers 20009 of the cloud computing system 20008, as shown in FIG. 1. The environmental sensing systems may be used for measuring one or more environmental attributes, for example, HCP position in the surgical theater, HCP movements, ambient noise in the surgical theater, temperature/humidity in the surgical theater, etc.

As illustrated in FIG. 2, a primary display 20023 and one or more audio output devices (e.g., speakers 20019) are positioned in the sterile field to be visible to an operator at the operating table 20024. In addition, a visualization/notification tower 20026 is positioned outside the sterile field. The visualization/notification tower 20026 may include a first non-sterile human interactive device (HID) 20027 and a second non-sterile HID 20029, which may face away from each other. The HID may be a display or a display with a touchscreen allowing a human to interface directly with the HID. A human interface system, guided by the surgical hub 20006, may be configured to utilize the HIDs 20027, 20029, and 20023 to coordinate information flow to operators inside and outside the sterile field. In an example, the surgical hub 20006 may cause an HID (e.g., the primary HID 20023) to display a notification and/or information about the patient and/or a surgical procedure step. In an example, the surgical hub 20006 may prompt for and/or receive input from personnel in the sterile field or in the non-sterile area. In an example, the surgical hub 20006 may cause an HID to display a snapshot of a surgical site, as recorded by an imaging device 20030, on a non-sterile HID 20027 or 20029, while maintaining a live feed of the surgical site on the primary HID 20023. The snapshot on the non-sterile display 20027 or 20029 can permit a non-sterile operator to perform a diagnostic step relevant to the surgical procedure, for example.

In one aspect, the surgical hub 20006 may be configured to route a diagnostic input or feedback entered by a non-sterile operator at the visualization tower 20026 to the primary display 20023 within the sterile field, where it can be viewed by a sterile operator at the operating table. In one example, the input can be in the form of a modification to the snapshot displayed on the non-sterile display 20027 or 20029, which can be routed to the primary display 20023 by the surgical hub 20006.

Referring to FIG. 2, a surgical instrument 20031 is being used in the surgical procedure as part of the surgical system 20002. The hub 20006 may be configured to coordinate information flow to a display of the surgical instrument 20031. For example, in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety. A diagnostic input or feedback entered by a non-sterile operator at the visualization tower 20026 can be routed by the hub 20006 to the surgical instrument display within the sterile field, where it can be viewed by the operator of the surgical instrument 20031. Example surgical instruments that are suitable for use with the surgical system 20002 are described under the heading "Surgical Instrument Hardware" and in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety, for example.

FIG. 2 illustrates an example of a surgical system 20002 being used to perform a surgical procedure on a patient who is lying down on an operating table 20024 in a surgical operating room 20035. A robotic system 20034 may be used in the surgical procedure as a part of the surgical system 20002. The robotic system 20034 may include a surgeon's console 20036, a patient side cart 20032 (surgical robot), and a surgical robotic hub 20033. The patient side cart 20032 can manipulate at least one removably coupled surgical tool 20037 through a minimally invasive incision in the body of the patient while the surgeon views the surgical site through the surgeon's console 20036. An image of the surgical site can be obtained by a medical imaging device 20030, which can be manipulated by the patient side cart 20032 to orient the imaging device 20030. The robotic hub 20033 can be used to process the images of the surgical site for subsequent display to the surgeon through the surgeon's console 20036.

Other types of robotic systems can be readily adapted for use with the surgical system 20002. Various examples of robotic systems and surgical tools that are suitable for use with the present disclosure are described in U.S. Patent Application Publication No. US 2019-0201137 A1 (U.S. patent application Ser. No. 16/209,407), titled METHOD OF ROBOTIC HUB COMMUNICATION, DETECTION, AND CONTROL, filed Dec. 4, 2018, the disclosure of which is herein incorporated by reference in its entirety.

Various examples of cloud-based analytics that are performed by the cloud computing system 20008, and are suitable for use with the present disclosure, are described in U.S. Patent Application Publication No. US 2019-0206569 A1 (U.S. patent application Ser. No. 16/209,403), titled METHOD OF CLOUD BASED DATA ANALYTICS FOR USE WITH THE HUB, filed Dec. 4, 2018, the disclosure of which is herein incorporated by reference in its entirety.

In various aspects, the imaging device 20030 may include at least one image sensor and one or more optical components. Suitable image sensors may include, but are not limited to, Charge-Coupled Device (CCD) sensors and Complementary Metal-Oxide Semiconductor (CMOS) sensors.

The optical components of the imaging device 20030 may include one or more illumination sources and/or one or more lenses. The one or more illumination sources may be directed to illuminate portions of the surgical field. The one or more image sensors may receive light reflected or refracted from the surgical field, including light reflected or refracted from tissue and/or surgical instruments.

The one or more illumination sources may be configured to radiate electromagnetic energy in the visible spectrum as well as the invisible spectrum. The visible spectrum, sometimes referred to as the optical spectrum or luminous spectrum, is the portion of the electromagnetic spectrum that is visible to (i.e., can be detected by) the human eye and may be referred to as visible light or simply light. A typical human eye will respond to wavelengths in air that range from about 380 nm to about 750 nm.

The invisible spectrum (e.g., the non-luminous spectrum) is the portion of the electromagnetic spectrum that lies below and above the visible spectrum (i.e., wavelengths below about 380 nm and above about 750 nm). The invisible spectrum is not detectable by the human eye. Wavelengths greater than about 750 nm are longer than the red visible spectrum, and they become invisible infrared (IR), microwave, and radio electromagnetic radiation. Wavelengths less than about 380 nm are shorter than the violet spectrum, and they become invisible ultraviolet, x-ray, and gamma ray electromagnetic radiation.

In various aspects, the imaging device 20030 is configured for use in a minimally invasive procedure. Examples of imaging devices suitable for use with the present disclosure include, but are not limited to, an arthroscope, angioscope, bronchoscope, choledochoscope, colonoscope, cytoscope, duodenoscope, enteroscope, esophagogastro-duodenoscope (gastroscope), endoscope, laryngoscope, nasopharyngo-neproscope, sigmoidoscope, thoracoscope, and ureteroscope.

The imaging device may employ multi-spectrum monitoring to discriminate topography and underlying structures. A multi-spectral image is one that captures image data within specific wavelength ranges across the electromagnetic spectrum. The wavelengths may be separated by filters or by the use of instruments that are sensitive to particular wavelengths, including light from frequencies beyond the visible light range, e.g., IR and ultraviolet. Spectral imaging can allow extraction of additional information that the human eye fails to capture with its receptors for red, green, and blue. The use of multi-spectral imaging is described in greater detail under the heading "Advanced Imaging Acquisition Module" in U.S. Patent Application Publication No. US 2019-0200844 A1 (U.S. patent application Ser. No. 16/209,385), titled METHOD OF HUB COMMUNICATION, PROCESSING, STORAGE AND DISPLAY, filed Dec. 4, 2018, the disclosure of which is herein incorporated by reference in its entirety. Multi-spectrum monitoring can be a useful tool in relocating a surgical field after a surgical task is completed to perform one or more of the previously described tests on the treated tissue. It is axiomatic that strict sterilization of the operating room and surgical equipment is required during any surgery. The strict hygiene and sterilization conditions required in a "surgical theater," i.e., an operating or treatment room, necessitate the highest possible sterility of all medical devices and equipment. Part of that sterilization process is the need to sterilize anything that comes in contact with the patient or penetrates the sterile field, including the imaging device 20030 and its attachments and components. It will be appreciated that the sterile field may be considered a specified area, such as within a tray or on a sterile towel, that is considered free of microorganisms, or the sterile field may be considered an area, immediately around a patient, who has been prepared for a surgical procedure. The sterile field may include the scrubbed team members, who are properly attired, and all furniture and fixtures in the area.

Wearable sensing system 20011 illustrated in FIG. 1 may include one or more sensing systems, for example, HCP sensing systems 20020 as shown in FIG. 2. The HCP sensing systems 20020 may include sensing systems to monitor and detect a set of physical states and/or a set of physiological states of a healthcare personnel (HCP). An HCP may be a surgeon or one or more healthcare personnel assisting the surgeon or other healthcare service providers in general. In an example, a sensing system 20020 may measure a set of biomarkers to monitor the heart rate of an HCP. In an example, a sensing system 20020 worn on a surgeon's wrist (e.g., a watch or a wristband) may use an accelerometer to detect hand motion and/or shakes and determine the magnitude and frequency of tremors. The sensing system 20020 may send the measurement data associated with the set of biomarkers and the data associated with a physical state of the surgeon to the surgical hub 20006 for further processing. One or more environmental sensing devices may send environmental information to the surgical hub 20006. For example, the environmental sensing devices may include a camera 20021 for detecting hand/body position of an HCP. The environmental sensing devices may include microphones 20022 for measuring the ambient noise in the surgical theater. Other environmental sensing devices may include devices, for example, a thermometer to measure temperature and a hygrometer to measure humidity of the surroundings in the surgical theater, etc. The surgical hub 20006, alone or in communication with the cloud computing system, may use the surgeon biomarker measurement data and/or environmental sensing information to modify the control algorithms of hand-held instruments or the averaging delay of a robotic interface, for example, to minimize tremors. In an example, the HCP sensing systems 20020 may measure one or more surgeon biomarkers associated with an HCP and send the measurement data associated with the surgeon biomarkers to the surgical hub 20006. The HCP sensing systems 20020 may use one or more of the following RF protocols for communicating with the surgical hub 20006: Bluetooth, Bluetooth Low-Energy (BLE), Bluetooth Smart, Zigbee, Z-wave, IPv6 Low-power wireless Personal Area Network (6LoWPAN), Wi-Fi. The surgeon biomarkers may include one or more of the following: stress, heart rate, etc. The environmental measurements from the surgical theater may include ambient noise level associated with the surgeon or the patient, surgeon and/or staff movements, surgeon and/or staff attention level, etc.

The surgical hub 20006 may use the surgeon biomarker measurement data associated with an HCP to adaptively control one or more surgical instruments 20031. For example, the surgical hub 20006 may send a control program to a surgical instrument 20031 to control its actuators to limit or compensate for fatigue and use of fine motor skills. The surgical hub 20006 may send the control program based on situational awareness and/or the context on importance or criticality of a task. The control program may instruct the instrument to alter operation to provide more control when control is needed.

Figure 3:
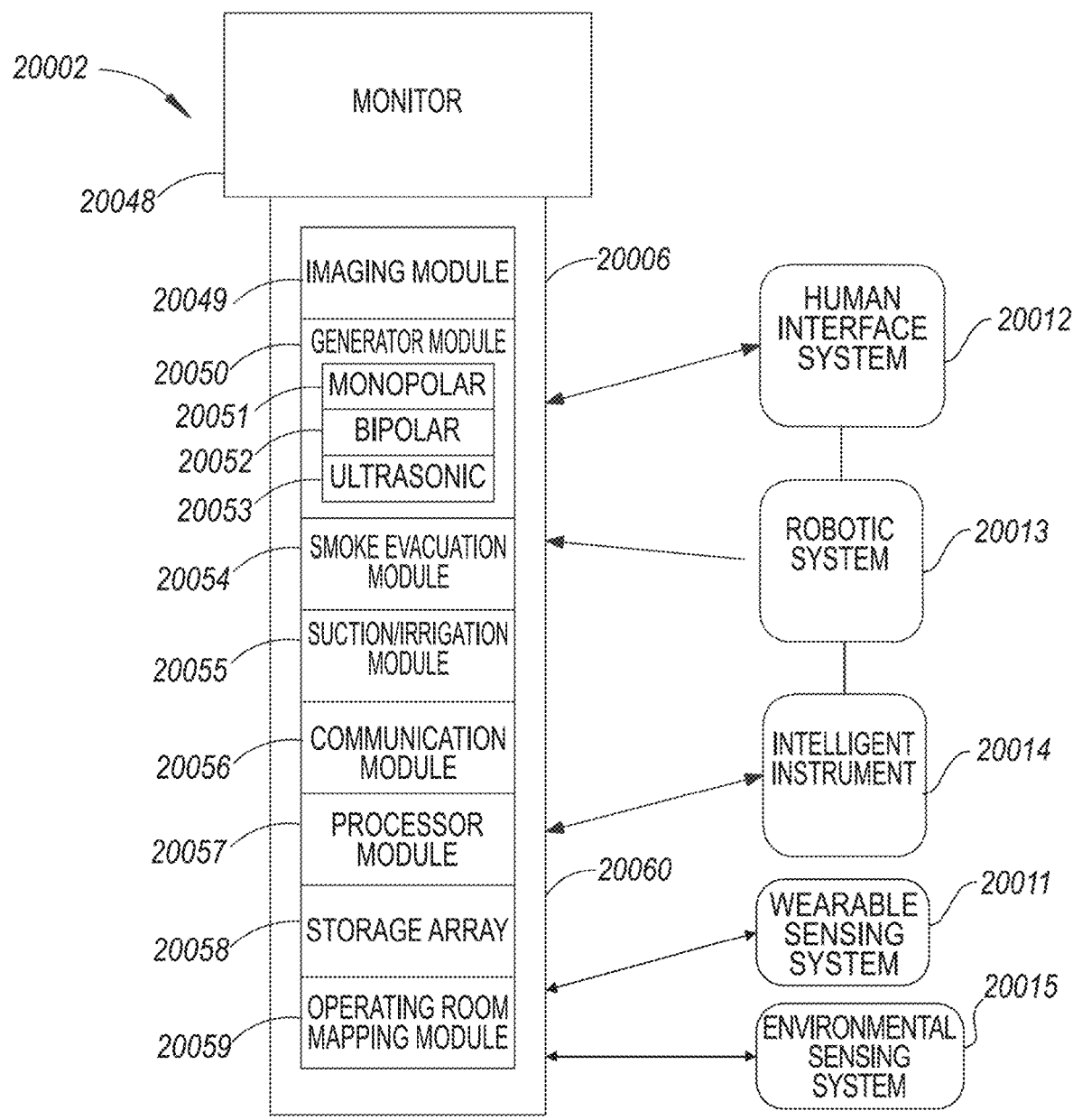
FIG. 3 illustrates an example surgical hub paired with various systems.

FIG. 3 shows an example surgical system 20002 with a surgical hub 20006. The surgical hub 20006 may be paired with, via a modular control, a wearable sensing system 20011, an environmental sensing system 20015, a human interface system 20012, a robotic system 20013, and an intelligent instrument 20014. The hub 20006 includes a display 20048, an imaging module 20049, a generator module 20050, a communication module 20056, a processor module 20057, a storage array 20058, and an operating-room mapping module 20059. In certain aspects, as illustrated in FIG. 3, the hub 20006 further includes a smoke evacuation module 20054 and/or a suction/irrigation module 20055. The various modules and systems may be connected to the modular control either directly via a router or via the communication module 20056. The operating theater devices may be coupled to cloud computing resources and data storage via the modular control. The human interface system 20012 may include a display sub-system and a notification sub-system.

The modular control may be coupled to non-contact sensor module. The non-contact sensor module may measure the dimensions of the operating theater and generate a map of the surgical theater using, ultrasonic, laser-type, and/or the like, non-contact measurement devices. Other distance sensors can be employed to determine the bounds of an operating room. An ultrasound-based non-contact sensor module may scan the operating theater by transmitting a burst of ultrasound and receiving the echo when it bounces off the perimeter walls of an operating theater as described under the heading "Surgical Hub Spatial Awareness Within an Operating Room" in U.S. Provisional Patent Application Ser. No. 62/611,341, titled INTERACTIVE SURGICAL PLATFORM, filed Dec. 28, 2017, which is herein incorporated by reference in its entirety. The sensor module may be configured to determine the size of the operating theater and to adjust Bluetooth-pairing distance limits. A laser-based non-contact sensor module may scan the operating theater by transmitting laser light pulses, receiving laser light pulses that bounce off the perimeter walls of the operating theater, and comparing the phase of the transmitted pulse to the received pulse to determine the size of the operating theater and to adjust Bluetooth pairing distance limits, for example.

During a surgical procedure, energy application to tissue, for sealing and/or cutting, is generally associated with smoke evacuation, suction of excess fluid, and/or irrigation of the tissue. Fluid, power, and/or data lines from different sources are often entangled during the surgical procedure. Valuable time can be lost addressing this issue during a surgical procedure. Detangling the lines may necessitate disconnecting the lines from their respective modules, which may require resetting the modules. The hub modular enclosure 20060 offers a unified environment for managing the power, data, and fluid lines, which reduces the frequency of entanglement between such lines. Aspects of the present disclosure present a surgical hub 20006 for use in a surgical procedure that involves energy application to tissue at a surgical site. The surgical hub 20006 includes a hub enclosure 20060 and a combo generator module slidably receivable in a docking station of the hub enclosure 20060. The docking station includes data and power contacts. The combo generator module includes two or more of an ultrasonic energy generator component, a bipolar RF energy generator component, and a monopolar RF energy generator component that are housed in a single unit. In one aspect, the combo generator module also includes a smoke evacuation component, at least one energy delivery cable for connecting the combo generator module to a surgical instrument, at least one smoke evacuation component configured to evacuate smoke, fluid, and/or particulates generated by the application of therapeutic energy to the tissue, and a fluid line extending from the remote surgical site to the smoke evacuation component. In one aspect, the fluid line may be a first fluid line, and a second fluid line may extend from the remote surgical site to a suction and irrigation module 20055 slidably received in the hub enclosure 20060. In one aspect, the hub enclosure 20060 may include a fluid interface. Certain surgical procedures may require the application of more than one energy type to the tissue. One energy type may be more beneficial for cutting the tissue, while another different energy type may be more beneficial for sealing the tissue. For example, a bipolar generator can be used to seal the tissue while an ultrasonic generator can be used to cut the sealed tissue. Aspects of the present disclosure present a solution where a hub modular enclosure 20060 is configured to accommodate different generators and facilitate an interactive communication therebetween. One of the advantages of the hub modular enclosure 20060 is enabling the quick removal and/or replacement of various modules. Aspects of the present disclosure present a modular surgical enclosure for use in a surgical procedure that involves energy application to tissue. The modular surgical enclosure includes a first energy-generator module, configured to generate a first energy for application to the tissue, and a first docking station comprising a first docking port that includes first data and power contacts, wherein the first energy-generator module is slidably movable into an electrical engagement with the power and data contacts and wherein the first energy-generator module is slidably movable out of the electrical engagement with the first power and data contacts. Further to the above, the modular surgical enclosure also includes a second energy-generator module configured to generate a second energy, different than the first energy, for application to the tissue, and a second docking station comprising a second docking port that includes second data and power contacts, wherein the second energy generator module is slidably movable into an electrical engagement with the power and data contacts, and wherein the second energy-generator module is slidably movable out of the electrical engagement with the second power and data contacts. In addition, the modular surgical enclosure also includes a communication bus between the first docking port and the second docking port, configured to facilitate communication between the first energy-generator module and the second energy-generator module. Referring to FIG. 3, aspects of the present disclosure are presented for a hub modular enclosure 20060 that allows the modular integration of a generator module 20050, a smoke evacuation module 20054, and a suction/irrigation module 20055. The hub modular enclosure 20060 further facilitates interactive communication between the modules 20059, 20054, and 20055. The generator module 20050 can be with integrated monopolar, bipolar, and ultrasonic components supported in a single housing unit slidably insertable into the hub modular enclosure 20060. The generator module 20050 can be configured to connect to a monopolar device 20051, a bipolar device 20052, and an ultrasonic device 20053. Alternatively, the generator module 20050 may comprise a series of monopolar, bipolar, and/or ultrasonic generator modules that interact through the hub modular enclosure 20060. The hub modular enclosure 20060 can be configured to facilitate the insertion of multiple generators and interactive communication between the generators docked into the hub modular enclosure 20060 so that the generators would act as a single generator.

Figure 4:
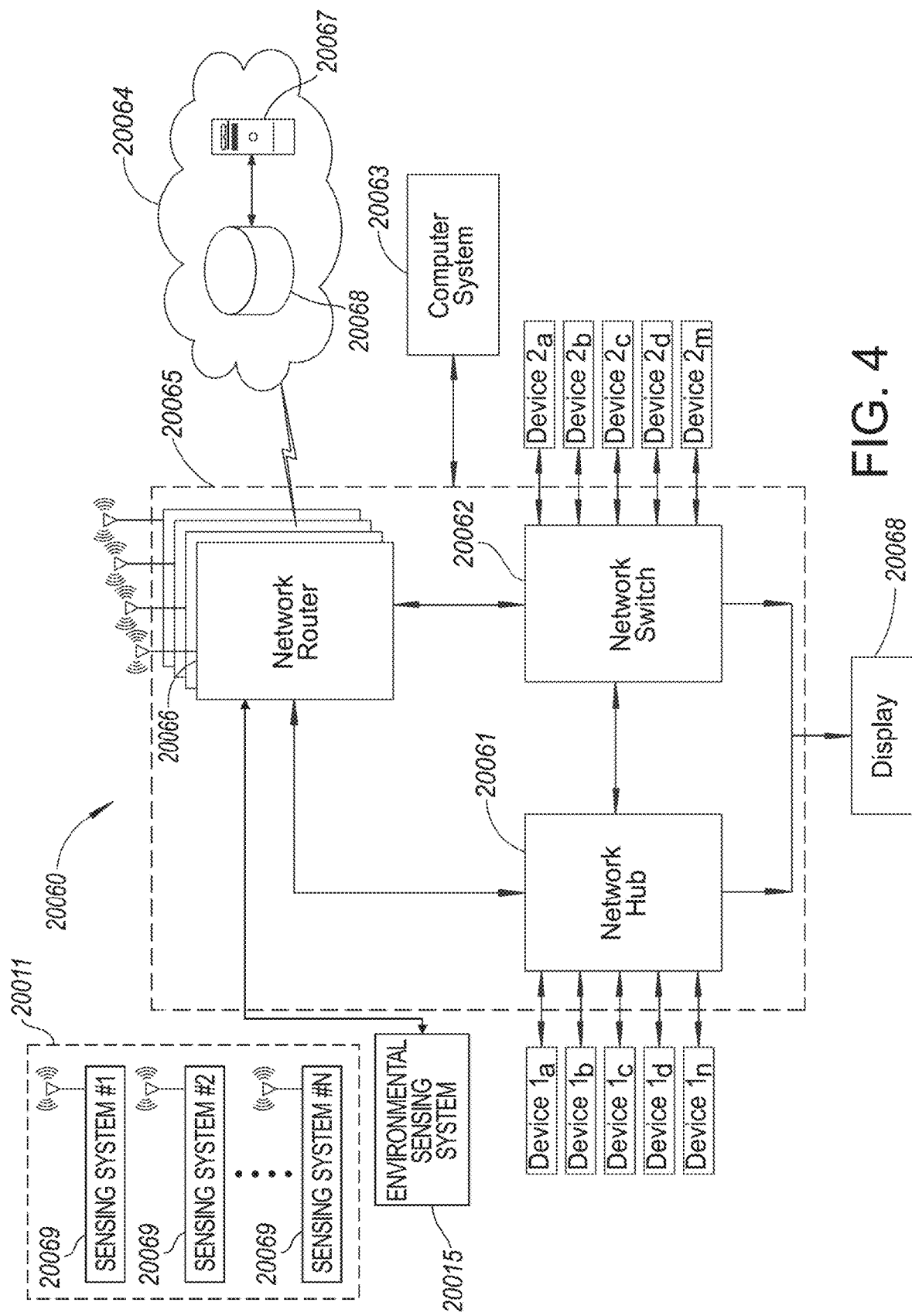
FIG. 4 illustrates a surgical data network having a set of communication surgical hubs configured to connect with a set of sensing systems, an environmental sensing system, a set of devices, etc.

FIG. 4 illustrates a surgical data network having a set of communication hubs configured to connect a set of sensing systems, environment sensing system(s), and a set of other modular devices located in one or more operating theaters of a healthcare facility, a patient recovery room, or a room in a healthcare facility specially equipped for surgical operations, to the cloud, in accordance with at least one aspect of the present disclosure.

As illustrated in FIG. 4, a surgical hub system 20060 may include a modular communication hub 20065 that is configured to connect modular devices located in a healthcare facility to a cloud-based system (e.g., a cloud computing system 20064 that may include a remote server 20067 coupled to a remote storage 20068). The modular communication hub 20065 and the devices may be connected in a room in a healthcare facility specially equipped for surgical operations. In one aspect, the modular communication hub 20065 may include a network hub 20061 and/or a network switch 20062 in communication with a network router 20066. The modular communication hub 20065 may be coupled to a local computer system 20063 to provide local computer processing and data manipulation.

The computer system 20063 may comprise a processor and a network interface 20100. The processor may be coupled to a communication module, storage, memory, non-volatile memory, and input/output (I/O) interface via a system bus. The system bus can be any of several types of bus structure(s) including the memory bus or memory controller, a peripheral bus or external bus, and/or a local bus using any variety of available bus architectures including, but not limited to, 9-bit bus, Industrial Standard Architecture (ISA), Micro-Charmel Architecture (MSA), Extended ISA (EISA), Intelligent Drive Electronics (IDE), VESA Local Bus (VLB), Peripheral Component Interconnect (PCI), USB, Advanced Graphics Port (AGP), Personal Computer Memory Card International Association bus (PCMCIA), Small Computer Systems Interface (SCSI), or any other proprietary bus.

The processor may be any single-core or multicore processor such as those known under the trade name ARM Cortex by Texas Instruments. In one aspect, the processor may be an LM4F230H5QR ARM Cortex-M4F Processor Core, available from Texas Instruments, for example, comprising an on-chip memory of 256 KB single-cycle flash memory, or other non-volatile memory, up to 40 MHz, a prefetch buffer to improve performance above 40 MHz, a 32 KB single-cycle serial random access memory (SRAM), an internal read-only memory (ROM) loaded with StellarisWare® software, a 2 KB electrically erasable programmable read-only memory (EEPROM), and/or one or more pulse width modulation (PWM) modules, one or more quadrature encoder inputs (QEI) analogs, one or more 12-bit analog-to-digital converters (ADCs) with 12 analog input channels, details of which are available for the product datasheet.

In an example, the processor may comprise a safety controller comprising two controller-based families such as TMS570 and RM4x, known under the trade name Hercules ARM Cortex R4, also by Texas Instruments. The safety controller may be configured specifically for IEC 61508 and ISO 26262 safety critical applications, among others, to provide advanced integrated safety features while delivering scalable performance, connectivity, and memory options.

It is to be appreciated that the computer system 20063 may include software that acts as an intermediary between users and the basic computer resources described in a suitable operating environment. Such software may include an operating system. The operating system, which can be stored on the disk storage, may act to control and allocate resources of the computer system. System applications may take advantage of the management of resources by the operating system through program modules and program data stored either in the system memory or on the disk storage. It is to be appreciated that various components described herein can be implemented with various operating systems or combinations of operating systems.

A user may enter commands or information into the computer system 20063 through input device(s) coupled to the I/O interface. The input devices may include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processor 20102 through the system bus via interface port(s). The interface port(s) include, for example, a serial port, a parallel port, a game port, and a USB. The output device(s) use some of the same types of ports as input device(s). Thus, for example, a USB port may be used to provide input to the computer system 20063 and to output information from the computer system 20063 to an output device. An output adapter may be provided to illustrate that there can be some output devices like monitors, displays, speakers, and printers, among other output devices that may require special adapters. The output adapters may include, by way of illustration and not limitation, video and sound cards that provide a means of connection between the output device and the system bus. It should be noted that other devices and/or systems of devices, such as remote computer(s), may provide both input and output capabilities.

The computer system 20063 can operate in a networked environment using logical connections to one or more remote computers, such as cloud computer(s), or local computers. The remote cloud computer(s) can be a personal computer, server, router, network PC, workstation, microprocessor-based appliance, peer device, or other common network node, and the like, and typically includes many or all of the elements described relative to the computer system. For purposes of brevity, only a memory storage device is illustrated with the remote computer(s). The remote computer(s) may be logically connected to the computer system through a network interface and then physically connected via a communication connection. The network interface may encompass communication networks such as local area networks (LANs) and wide area networks (WANs). LAN technologies may include Fiber Distributed Data Interface (FDDI), Copper Distributed Data Interface (CDDI), Ethernet/IEEE 802.3, Token Ring/IEEE 802.5, and the like. WAN technologies may include, but are not limited to, point-to-point links, circuit-switching networks like Integrated Services Digital Networks (ISDN) and variations thereon, packet-switching networks, and Digital Subscriber Lines (DSL).

In various examples, the computer system 20063 may comprise an image processor, image-processing engine, media processor, or any specialized digital signal processor (DSP) used for the processing of digital images. The image processor may employ parallel computing with single instruction, multiple data (SIMD) or multiple instruction, multiple data (MIMD) technologies to increase speed and efficiency. The digital image-processing engine can perform a range of tasks. The image processor may be a system on a chip with multicore processor architecture.

The communication connection(s) may refer to the hardware/software employed to connect the network interface to the bus. While the communication connection is shown for illustrative clarity inside the computer system 20063, it can also be external to the computer system 20063. The hardware/software necessary for connection to the network interface may include, for illustrative purposes only, internal and external technologies such as modems, including regular telephone-grade modems, cable modems, optical fiber modems, and DSL modems, ISDN adapters, and Ethernet cards. In some examples, the network interface may also be provided using an RF interface.

Surgical data network associated with the surgical hub system 20060 may be configured as passive, intelligent, or switching. A passive surgical data network serves as a conduit for the data, enabling it to go from one device (or segment) to another and to the cloud computing resources. An intelligent surgical data network includes additional features to enable the traffic passing through the surgical data network to be monitored and to configure each port in the network hub 20061 or network switch 20062. An intelligent surgical data network may be referred to as a manageable hub or switch. A switching hub reads the destination address of each packet and then forwards the packet to the correct port.

Modular devices 1a-1n located in the operating theater may be coupled to the modular communication hub 20065. The network hub 20061 and/or the network switch 20062 may be coupled to a network router 20066 to connect the devices 1a-1n to the cloud computing system 20064 or the local computer system 20063. Data associated with the devices 1a-1n may be transferred to cloud-based computers via the router for remote data processing and manipulation. Data associated with the devices 1a-1n may also be transferred to the local computer system 20063 for local data processing and manipulation. Modular devices 2a-2m located in the same operating theater also may be coupled to a network switch 20062. The network switch 20062 may be coupled to the network hub 20061 and/or the network router 20066 to connect the devices 2a-2m to the cloud 20064. Data associated with the devices 2a-2m may be transferred to the cloud computing system 20064 via the network router 20066 for data processing and manipulation. Data associated with the devices 2a-2m may also be transferred to the local computer system 20063 for local data processing and manipulation.

The wearable sensing system 20011 may include one or more sensing systems 20069. The sensing systems 20069 may include an HCP sensing system and/or a patient sensing system. The one or more sensing systems 20069 may be in communication with the computer system 20063 of a surgical hub system 20060 or the cloud server 20067 directly via one of the network routers 20066 or via a network hub 20061 or network switching 20062 that is in communication with the network routers 20066.

The sensing systems 20069 may be coupled to the network router 20066 to connect to the sensing systems 20069 to the local computer system 20063 and/or the cloud computing system 20064. Data associated with the sensing systems 20069 may be transferred to the cloud computing system 20064 via the network router 20066 for data processing and manipulation. Data associated with the sensing systems 20069 may also be transferred to the local computer system 20063 for local data processing and manipulation.

As illustrated in FIG. 4, the surgical hub system 20060 may be expanded by interconnecting multiple network hubs 20061 and/or multiple network switches 20062 with multiple network routers 20066. The modular communication hub 20065 may be contained in a modular control tower configured to receive multiple devices 1a-1n/2a-2m. The local computer system 20063 also may be contained in a modular control tower. The modular communication hub 20065 may be connected to a display 20068 to display images obtained by some of the devices 1a-1n/2a-2m, for example during surgical procedures. In various aspects, the devices 1a-1n/2a-2m may include, for example, various modules such as an imaging module coupled to an endoscope, a generator module coupled to an energy-based surgical device, a smoke evacuation module, a suction/irrigation module, a communication module, a processor module, a storage array, a surgical device coupled to a display, and/or a non-contact sensor module, among other modular devices that may be connected to the modular communication hub 20065 of the surgical data network.

In one aspect, the surgical hub system 20060 illustrated in FIG. 4 may comprise a combination of network hub(s), network switch(es), and network router(s) connecting the devices 1a-1n/2a-2m or the sensing systems 20069 to the cloud-base system 20064. One or more of the devices 1a-1n/2a-2m or the sensing systems 20069 coupled to the network hub 20061 or network switch 20062 may collect data in real-time and transfer the data to cloud computers for data processing and manipulation. It will be appreciated that cloud computing relies on sharing computing resources rather than having local servers or personal devices to handle software applications. The word "cloud" may be used as a metaphor for "the Internet," although the term is not limited as such. Accordingly, the term "cloud computing" may be used herein to refer to "a type of Internet-based computing," where different services-such as servers, storage, and applications—are delivered to the modular communication hub 20065 and/or computer system 20063 located in the surgical theater (e.g., a fixed, mobile, temporary, or field operating room or space) and to devices connected to the modular communication hub 20065 and/or computer system 20063 through the Internet. The cloud infrastructure may be maintained by a cloud service provider. In this context, the cloud service provider may be the entity that coordinates the usage and control of the devices 1a-1n/2a-2m located in one or more operating theaters. The cloud computing services can perform a large number of calculations based on the data gathered by smart surgical instruments, robots, sensing systems, and other computerized devices located in the operating theater. The hub hardware enables multiple devices, sensing systems, and/or connections to be connected to a computer that communicates with the cloud computing resources and storage.

Applying cloud computer data processing techniques on the data collected by the devices 1a-1n/2a-2m, the surgical data network can provide improved surgical outcomes, reduced costs, and improved patient satisfaction. At least some of the devices 1a-1n/2a-2m may be employed to view tissue states to assess leaks or perfusion of sealed tissue after a tissue sealing and cutting procedure. At least some of the devices 1a-1n/2a-2m may be employed to identify pathology, such as the effects of diseases, using the cloud-based computing to examine data including images of samples of body tissue for diagnostic purposes. This may include localization and margin confirmation of tissue and phenotypes. At least some of the devices 1a-1n/2a-2m may be employed to identify anatomical structures of the body using a variety of sensors integrated with imaging devices and techniques such as overlaying images captured by multiple imaging devices. The data gathered by the devices 1a-1n/2a-2m, including image data, may be transferred to the cloud computing system 20064 or the local computer system 20063 or both for data processing and manipulation including image processing and manipulation. The data may be analyzed to improve surgical procedure outcomes by determining if further treatment, such as the application of endoscopic intervention, emerging technologies, a targeted radiation, targeted intervention, and precise robotics to tissue-specific sites and conditions, may be pursued. Such data analysis may further employ outcome analytics processing and using standardized approaches may provide beneficial feedback to either confirm surgical treatments and the behavior of the surgeon or suggest modifications to surgical treatments and the behavior of the surgeon.

Applying cloud computer data processing techniques on the measurement data collected by the sensing systems 20069, the surgical data network can provide improved surgical outcomes, improved recovery outcomes, reduced costs, and improved patient satisfaction. At least some of the sensing systems 20069 may be employed to assess physiological conditions of a surgeon operating on a patient or a patient being prepared for a surgical procedure or a patient recovering after a surgical procedure. The cloud-based computing system 20064 may be used to monitor biomarkers associated with a surgeon or a patient in real-time and to generate surgical plans based at least on measurement data gathered prior to a surgical procedure, provide control signals to the surgical instruments during a surgical procedure, and notify a patient of a complication during post-surgical period.

The operating theater devices 1a-1n may be connected to the modular communication hub 20065 over a wired channel or a wireless channel depending on the configuration of the devices 1a-1n to a network hub 20061. The network hub 20061 may be implemented, in one aspect, as a local network broadcast device that works on the physical layer of the Open System Interconnection (OSI) model. The network hub may provide connectivity to the devices 1a-1n located in the same operating theater network. The network hub 20061 may collect data in the form of packets and sends them to the router in half duplex mode. The network hub 20061 may not store any media access control/Internet Protocol (MAC/IP) to transfer the device data. Only one of the devices 1a-1n can send data at a time through the network hub 20061. The network hub 20061 may not have routing tables or intelligence regarding where to send information and broadcasts all network data across each connection and to a remote server 20067 of the cloud computing system 20064. The network hub 20061 can detect basic network errors such as collisions but having all information broadcast to multiple ports can be a security risk and cause bottlenecks.

The operating theater devices 2a-2m may be connected to a network switch 20062 over a wired channel or a wireless channel. The network switch 20062 works in the data link layer of the OSI model. The network switch 20062 may be a multicast device for connecting the devices 2a-2m located in the same operating theater to the network. The network switch 20062 may send data in the form of frames to the network router 20066 and may work in full duplex mode. Multiple devices 2a-2m can send data at the same time through the network switch 20062. The network switch 20062 stores and uses MAC addresses of the devices 2a-2m to transfer data.

The network hub 20061 and/or the network switch 20062 may be coupled to the network router 20066 for connection to the cloud computing system 20064. The network router 20066 works in the network layer of the OSI model. The network router 20066 creates a route for transmitting data packets received from the network hub 20061 and/or network switch 20062 to cloud-based computer resources for further processing and manipulation of the data collected by any one of or all the devices 1a-1n/2a-2m and wearable sensing system 20011. The network router 20066 may be employed to connect two or more different networks located in different locations, such as, for example, different operating theaters of the same healthcare facility or different networks located in different operating theaters of different healthcare facilities. The network router 20066 may send data in the form of packets to the cloud computing system 20064 and works in full duplex mode. Multiple devices can send data at the same time. The network router 20066 may use IP addresses to transfer data.

In an example, the network hub 20061 may be implemented as a USB hub, which allows multiple USB devices to be connected to a host computer. The USB hub may expand a single USB port into several tiers so that there are more ports available to connect devices to the host system computer. The network hub 20061 may include wired or wireless capabilities to receive information over a wired channel or a wireless channel. In one aspect, a wireless USB short-range, high-bandwidth wireless radio communication protocol may be employed for communication between the devices 1a-1n and devices 2a-2m located in the operating theater.

In examples, the operating theater devices 1a-1n/2a-2m and/or the sensing systems 20069 may communicate to the modular communication hub 20065 via Bluetooth wireless technology standard for exchanging data over short distances (using short-wavelength UHF radio waves in the ISM band from 2.4 to 2.485 GHz) from fixed and mobile devices and building personal area networks (PANs). The operating theater devices 1a-1n/2a-2m and/or the sensing systems 20069 may communicate to the modular communication hub 20065 via a number of wireless or wired communication standards or protocols, including but not limited to Bluetooth, Low-Energy Bluetooth, near-field communication (NFC), Wi-Fi (IEEE 802.11 family), WiMAX (IEEE 802.16 family), IEEE 802.20, new radio (NR), long-term evolution (LTE), and Ev-DO, HSPA+, HSDPA+, HSUPA+, EDGE, GSM, GPRS, CDMA, TDMA, DECT, and Ethernet derivatives thereof, as well as any other wireless and wired protocols that are designated as 3G, 4G, 5G, and beyond. The computing module may include a plurality of communication modules. For instance, a first communication module may be dedicated to shorter-range wireless communications such as Wi-Fi and Bluetooth Low-Energy Bluetooth, Bluetooth Smart, and a second communication module may be dedicated to longer-range wireless communications such as GPS, EDGE, GPRS, CDMA, WiMAX, LTE, Ev-DO, HSPA+, HSDPA+, HSUPA+, EDGE, GSM, GPRS, CDMA, TDMA, and others.

The modular communication hub 20065 may serve as a central connection for one or more of the operating theater devices 1a-1n/2a-2m and/or the sensing systems 20069 and may handle a data type known as frames. Frames may carry the data generated by the devices 1a-1n/2a-2m and/or the sensing systems 20069. When a frame is received by the modular communication hub 20065, it may be amplified and/or sent to the network router 20066, which may transfer the data to the cloud computing system 20064 or the local computer system 20063 by using a number of wireless or wired communication standards or protocols, as described herein.

The modular communication hub 20065 can be used as a standalone device or be connected to compatible network hubs 20061 and network switches 20062 to form a larger network. The modular communication hub 20065 can be generally easy to install, configure, and maintain, making it a good option for networking the operating theater devices 1a-1n/2a-2m.

Figure 5:
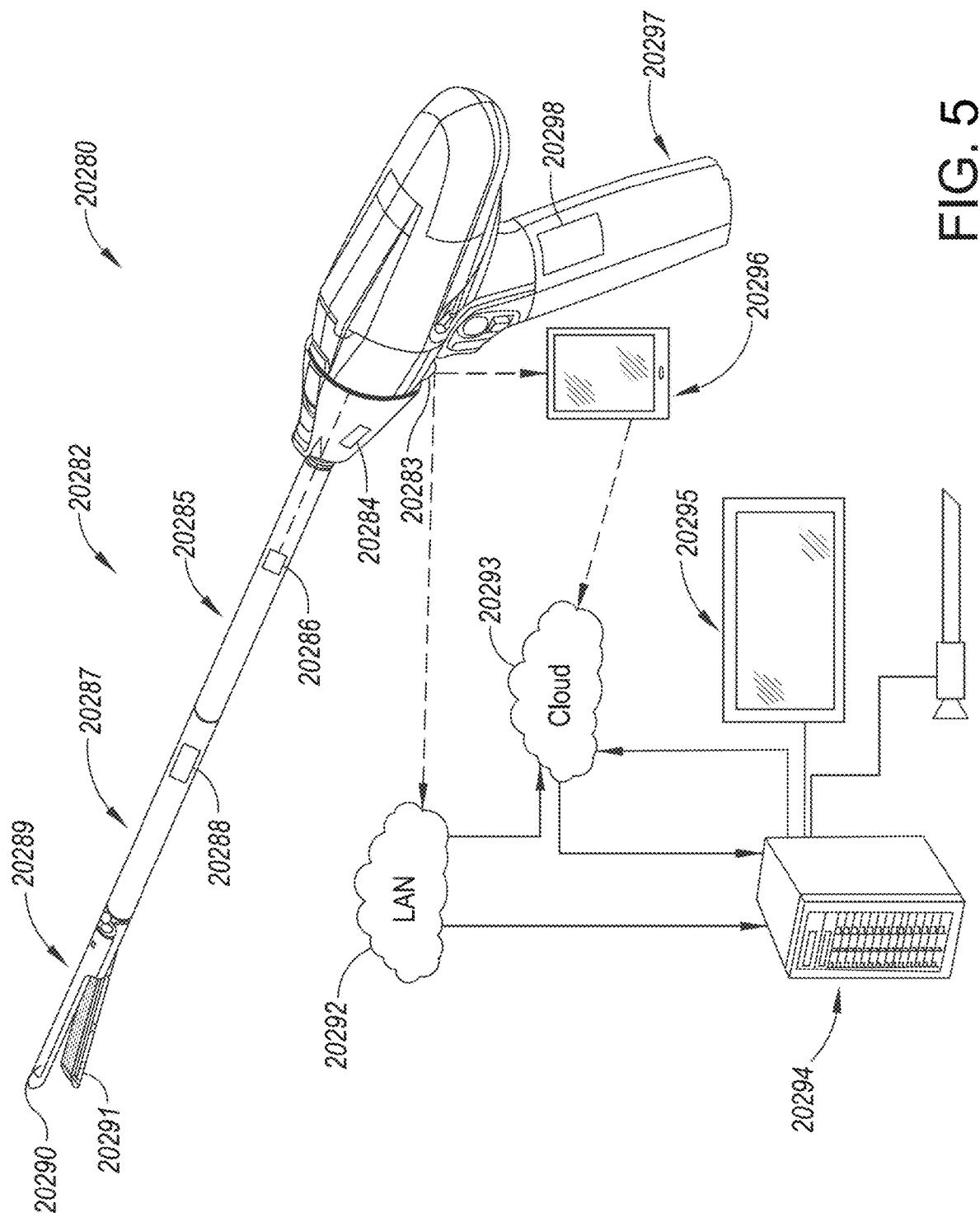
FIG. 5 shows an example surgical device that includes a handle having a controller and a motor, an adapter releasably coupled to the handle, and a loading unit releasably coupled to the adapter.

FIG. 5 illustrates an example surgical system 20280 in accordance with the present disclosure and may include a surgical instrument 20282 that can be in communication with a console 20294 or a portable device 20296 through a local area network 20292 and/or a cloud network 20293 via a wired and/or wireless connection. The console 20294 and the portable device 20296 may be any suitable computing device. The surgical instrument 20282 may include a handle 20297, an adapter 20285, and a loading unit 20287. The adapter 20285 releasably couples to the handle 20297 and the loading unit 20287 releasably couples to the adapter 20285 such that the adapter 20285 transmits a force from a drive shaft to the loading unit 20287. The adapter 20285 or the loading unit 20287 may include a force gauge (not explicitly shown) disposed therein to measure a force exerted on the loading unit 20287. The loading unit 20287 may include an end effector 20289 having a first jaw 20291 and a second jaw 20290. The loading unit 20287 may be an in-situ loaded or multi-firing loading unit (MFLU) that allows a clinician to fire a plurality of fasteners multiple times without requiring the loading unit 20287 to be removed from a surgical site to reload the loading unit 20287.

The first and second jaws 20291, 20290 may be configured to clamp tissue therebetween, fire fasteners through the clamped tissue, and sever the clamped tissue. The first jaw 20291 may be configured to fire at least one fastener a plurality of times or may be configured to include a replaceable multi-fire fastener cartridge including a plurality of fasteners (e.g., staples, clips, etc.) that may be fired more than one time prior to being replaced. The second jaw 20290 may include an anvil that deforms or otherwise secures the fasteners, as the fasteners are ejected from the multi-fire fastener cartridge.

The handle 20297 may include a motor that is coupled to the drive shaft to affect rotation of the drive shaft. The handle 20297 may include a control interface to selectively activate the motor. The control interface may include buttons, switches, levers, sliders, touchscreens, and any other suitable input mechanisms or user interfaces, which can be engaged by a clinician to activate the motor.

The control interface of the handle 20297 may be in communication with a controller 20298 of the handle 20297 to selectively activate the motor to affect rotation of the drive shafts. The controller 20298 may be disposed within the handle 20297 and may be configured to receive input from the control interface and adapter data from the adapter 20285 or loading unit data from the loading unit 20287. The controller 20298 may analyze the input from the control interface and the data received from the adapter 20285 and/or loading unit 20287 to selectively activate the motor. The handle 20297 may also include a display that is viewable by a clinician during use of the handle 20297. The display may be configured to display portions of the adapter or loading unit data before, during, or after firing of the instrument 20282.

The adapter 20285 may include an adapter identification device 20284 disposed therein and the loading unit 20287 may include a loading unit identification device 20288 disposed therein. The adapter identification device 20284 may be in communication with the controller 20298, and the loading unit identification device 20288 may be in communication with the controller 20298. It will be appreciated that the loading unit identification device 20288 may be in communication with the adapter identification device 20284, which relays or passes communication from the loading unit identification device 20288 to the controller 20298.

The adapter 20285 may also include a plurality of sensors 20286 (one shown) disposed thereabout to detect various conditions of the adapter 20285 or of the environment (e.g., if the adapter 20285 is connected to a loading unit, if the adapter 20285 is connected to a handle, if the drive shafts are rotating, the torque of the drive shafts, the strain of the drive shafts, the temperature within the adapter 20285, a number of firings of the adapter 20285, a peak force of the adapter 20285 during firing, a total amount of force applied to the adapter 20285, a peak retraction force of the adapter 20285, a number of pauses of the adapter 20285 during firing, etc.). The plurality of sensors 20286 may provide an input to the adapter identification device 20284 in the form of data signals. The data signals of the plurality of sensors 20286 may be stored within or be used to update the adapter data stored within the adapter identification device 20284. The data signals of the plurality of sensors 20286 may be analog or digital. The plurality of sensors 20286 may include a force gauge to measure a force exerted on the loading unit 20287 during firing.

The handle 20297 and the adapter 20285 can be configured to interconnect the adapter identification device 20284 and the loading unit identification device 20288 with the controller 20298 via an electrical interface. The electrical interface may be a direct electrical interface (i.e., include electrical contacts that engage one another to transmit energy and signals therebetween). Additionally, or alternatively, the electrical interface may be a non-contact electrical interface to wirelessly transmit energy and signals therebetween (e.g., inductively transfer). It is also contemplated that the adapter identification device 20284 and the controller 20298 may be in wireless communication with one another via a wireless connection separate from the electrical interface.

The handle 20297 may include a transceiver 20283 that is configured to transmit instrument data from the controller 20298 to other components of the system 20280 (e.g., the LAN 20292, the cloud 20293, the console 20294, or the portable device 20296). The controller 20298 may also transmit instrument data and/or measurement data associated with one or more sensors 20286 to a surgical hub. The transceiver 20283 may receive data (e.g., cartridge data, loading unit data, adapter data, or other notifications) from the surgical hub 20270. The transceiver 20283 may receive data (e.g., cartridge data, loading unit data, or adapter data)

from the other components of the system 20280. For example, the controller 20298 may transmit instrument data including a serial number of an attached adapter (e.g., adapter 20285) attached to the handle 20297, a serial number of a loading unit (e.g., loading unit 20287) attached to the adapter 20285, and a serial number of a multi-fire fastener cartridge loaded into the loading unit to the console 20294. Thereafter, the console 20294 may transmit data (e.g., cartridge data, loading unit data, or adapter data) associated with the attached cartridge, loading unit, and adapter, respectively, back to the controller 20298. The controller 20298 can display messages on the local instrument display or transmit the message, via transceiver 20283, to the console 20294 or the portable device 20296 to display the message on the display 20295 or portable device screen, respectively.

Figure 6:
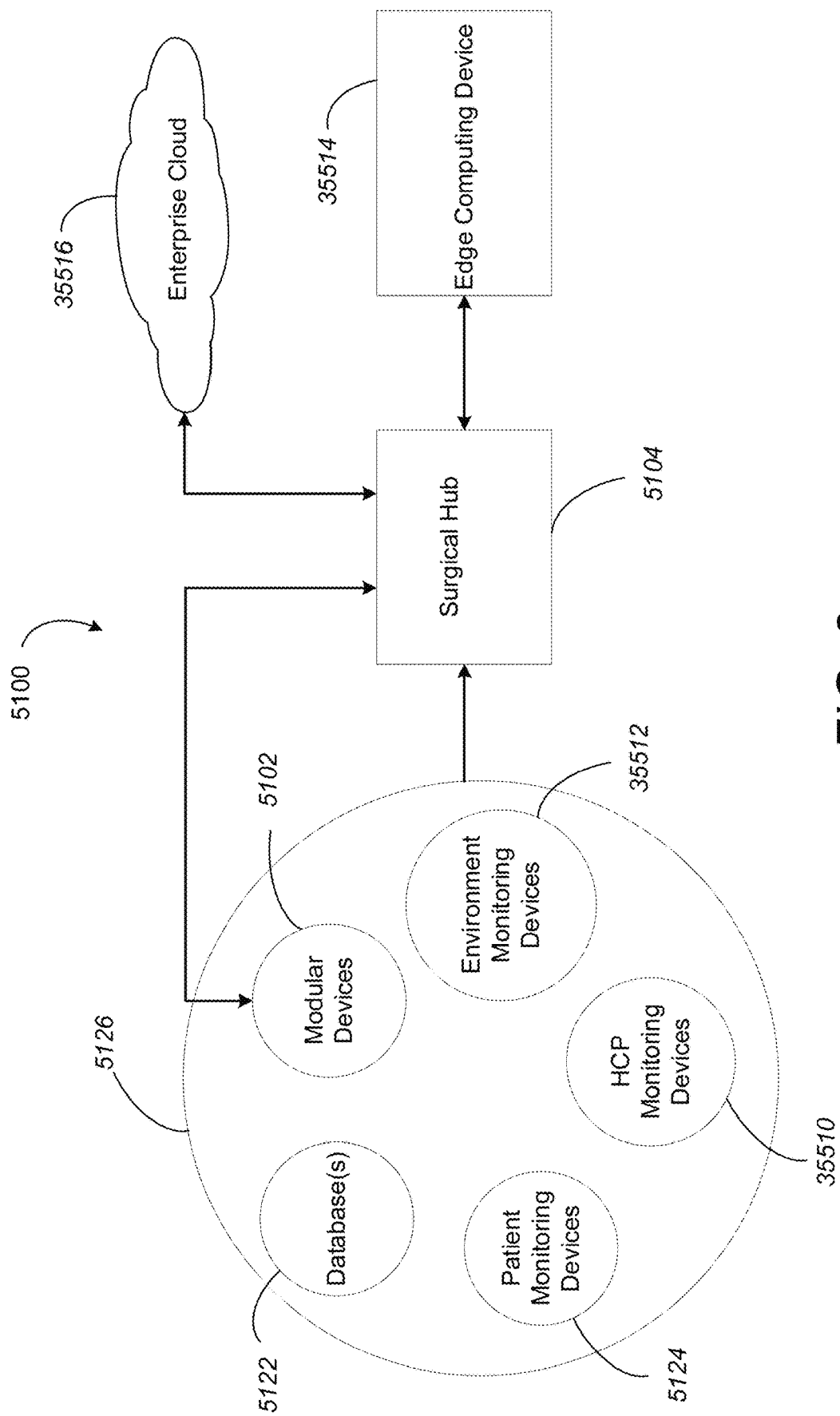
FIG. 6 shows an example situationally aware surgical system.

FIG. 6 illustrates a diagram of a situationally aware surgical system 5100, in accordance with at least one aspect of the present disclosure. The data sources 5126 may include, for example, the modular devices 5102 (which can include sensors configured to detect parameters associated with the patient, HCPs and environment and/or the modular device itself), databases 5122 (e.g., an EMR database containing patient records), patient monitoring devices 5124 (e.g., a blood pressure (BP) monitor and an electrocardiography (EKG) monitor), HCP monitoring devices 35510, and/or environment monitoring devices 35512. The surgical hub 5104 can be configured to derive the contextual information pertaining to the surgical procedure from the data based upon, for example, the particular combination(s) of received data or the particular order in which the data is received from the data sources 5126. The contextual information inferred from the received data can include, for example, the type of surgical procedure being performed, the particular step of the surgical procedure that the surgeon is performing, the type of tissue being operated on, or the body cavity that is the subject of the procedure. This ability by some aspects of the surgical hub 5104 to derive or infer information related to the surgical procedure from received data can be referred to as "situational awareness." For example, the surgical hub 5104 can incorporate a situational awareness system, which is the hardware and/or programming associated with the surgical hub 5104 that derives contextual information pertaining to the surgical procedure from the received data and/or a surgical plan information received from the edge computing system 35514 or an enterprise cloud server 35516.

The situational awareness system of the surgical hub 5104 can be configured to derive the contextual information from the data received from the data sources 5126 in a variety of different ways. For example, the situational awareness system can include a pattern recognition system, or machine learning system (e.g., an artificial neural network), that has been trained on training data to correlate various inputs (e.g., data from database(s) 5122, patient monitoring devices 5124, modular devices 5102, HCP monitoring devices 35510, and/or environment monitoring devices 35512) to corresponding contextual information regarding a surgical procedure. A machine learning system can be trained to accurately derive contextual information regarding a surgical procedure from the provided inputs. In examples, the situational awareness system can include a lookup table storing pre-characterized contextual information regarding a surgical procedure in association with one or more inputs (or ranges of inputs) corresponding to the contextual information. In response to a query with one or more inputs, the lookup table can return the corresponding contextual information for the situational awareness system for controlling the modular devices 5102. In examples, the contextual information received by the situational awareness system of the surgical hub 5104 can be associated with a particular control adjustment or set of control adjustments for one or more modular devices 5102. In examples, the situational awareness system can include a further machine learning system, lookup table, or other such system, which generates or retrieves one or more control adjustments for one or more modular devices 5102 when provided the contextual information as input.

A surgical hub 5104 incorporating a situational awareness system can provide a number of benefits for the surgical system 5100. One benefit may include improving the interpretation of sensed and collected data, which would in turn improve the processing accuracy and/or the usage of the data during the course of a surgical procedure. To return to a previous example, a situationally aware surgical hub 5104 could determine what type of tissue was being operated on; therefore, when an unexpectedly high force to close the surgical instrument's end effector is detected, the situationally aware surgical hub 5104 could correctly ramp up or ramp down the motor of the surgical instrument for the type of tissue.

The type of tissue being operated can affect the adjustments that are made to the compression rate and load thresholds of a surgical stapling and cutting instrument for a particular tissue gap measurement. A situationally aware surgical hub 5104 could infer whether a surgical procedure being performed is a thoracic or an abdominal procedure, allowing the surgical hub 5104 to determine whether the tissue clamped by an end effector of the surgical stapling and cutting instrument is lung (for a thoracic procedure) or stomach (for an abdominal procedure) tissue. The surgical hub 5104 could then adjust the compression rate and load thresholds of the surgical stapling and cutting instrument appropriately for the type of tissue.

The type of body cavity being operated in during an insufflation procedure can affect the function of a smoke evacuator. A situationally aware surgical hub 5104 could determine whether the surgical site is under pressure (by determining that the surgical procedure is utilizing insufflation) and determine the procedure type. As a procedure type can be generally performed in a specific body cavity, the surgical hub 5104 could then control the motor rate of the smoke evacuator appropriately for the body cavity being operated in. Thus, a situationally aware surgical hub 5104 could provide a consistent amount of smoke evacuation for both thoracic and abdominal procedures.

The type of procedure being performed can affect the optimal energy level for an ultrasonic surgical instrument or radio frequency (RF) electrosurgical instrument to operate at. Arthroscopic procedures, for example, may require higher energy levels because the end effector of the ultrasonic surgical instrument or RF electrosurgical instrument is immersed in fluid. A situationally aware surgical hub 5104 could determine whether the surgical procedure is an arthroscopic procedure. The surgical hub 5104 could then adjust the RF power level or the ultrasonic amplitude of the generator (e.g., "energy level") to compensate for the fluid filled environment. Relatedly, the type of tissue being operated on can affect the optimal energy level for an ultrasonic surgical instrument or RF electrosurgical instrument to operate at. A situationally aware surgical hub 5104 could determine what type of surgical procedure is being performed and then customize the energy level for the ultrasonic surgical instrument or RF electrosurgical instrument, respectively, according to the expected tissue profile for the surgical procedure. Furthermore, a situationally aware surgical hub 5104 can be configured to adjust the energy level for the ultrasonic surgical instrument or RF electrosurgical instrument throughout the course of a surgical procedure, rather than just on a procedure-by-procedure basis. A situationally aware surgical hub 5104 could determine what step of the surgical procedure is being performed or will subsequently be performed and then update the control algorithms for the generator and/or ultrasonic surgical instrument or RF electrosurgical instrument to set the energy level at a value appropriate for the expected tissue type according to the surgical procedure step.

In examples, data can be drawn from additional data sources 5126 to improve the conclusions that the surgical hub 5104 draws from one data source 5126. A situationally aware surgical hub 5104 could augment data that it receives from the modular devices 5102 with contextual information that it has built up regarding the surgical procedure from other data sources 5126. For example, a situationally aware surgical hub 5104 can be configured to determine whether hemostasis has occurred (e.g., whether bleeding at a surgical site has stopped) according to video or image data received from a medical imaging device. The surgical hub 5104 can be further configured to compare a physiologic measurement (e.g., blood pressure sensed by a BP monitor communicably connected to the surgical hub 5104) with the visual or image data of hemostasis (e.g., from a medical imaging device communicably coupled to the surgical hub 5104) to make a determination on the integrity of the staple line or tissue weld. The situational awareness system of the surgical hub 5104 can consider the physiological measurement data to provide additional context in analyzing the visualization data. The additional context can be useful when the visualization data may be inconclusive or incomplete on its own.

For example, a situationally aware surgical hub 5104 could proactively activate the generator to which an RF electrosurgical instrument is connected if it determines that a subsequent step of the procedure requires the use of the instrument. Proactively activating the energy source can allow the instrument to be ready for use as soon as the preceding step of the procedure is completed.

The situationally aware surgical hub 5104 could determine whether the current or subsequent step of the surgical procedure requires a different view or degree of magnification on the display according to the feature(s) at the surgical site that the surgeon is expected to need to view. The surgical hub 5104 could proactively change the displayed view (supplied by, e.g., a medical imaging device for the visualization system) accordingly so that the display automatically adjusts throughout the surgical procedure.

The situationally aware surgical hub 5104 could determine which step of the surgical procedure is being performed or will subsequently be performed and whether particular data or comparisons between data will be required for that step of the surgical procedure. The surgical hub 5104 can be configured to automatically call up data screens based upon the step of the surgical procedure being performed, without waiting for the surgeon to ask for the particular information.

Errors may be checked during the setup of the surgical procedure or during the course of the surgical procedure. For example, the situationally aware surgical hub 5104 could determine whether the operating theater is setup properly or optimally for the surgical procedure to be performed. The surgical hub 5104 can be configured to determine the type of surgical procedure being performed, retrieve the corresponding checklists, product location, or setup needs (e.g., from a memory), and then compare the current operating theater layout to the standard layout for the type of surgical procedure that the surgical hub 5104 determines is being performed. In some exemplifications, the surgical hub 5104 can compare the list of items for the procedure and/or a list of devices paired with the surgical hub 5104 to a recommended or anticipated manifest of items and/or devices for the given surgical procedure. If there are any discontinuities between the lists, the surgical hub 5104 can provide an alert indicating that a particular modular device 5102, patient monitoring device 5124, HCP monitoring devices 35510, environment monitoring devices 35512, and/or other surgical item is missing. In some examples, the surgical hub 5104 can determine the relative distance or position of the modular devices 5102 and patient monitoring devices 5124 via proximity sensors, for example. The surgical hub 5104 can compare the relative positions of the devices to a recommended or anticipated layout for the particular surgical procedure. If there are any discontinuities between the layouts, the surgical hub 5104 can be configured to provide an alert indicating that the current layout for the surgical procedure deviates from the recommended layout.

The situationally aware surgical hub 5104 could determine whether the surgeon (or other HCP(s)) was making an error or otherwise deviating from the expected course of action during the course of a surgical procedure. For example, the surgical hub 5104 can be configured to determine the type of surgical procedure being performed, retrieve the corresponding list of steps or order of equipment usage (e.g., from a memory), and then compare the steps being performed or the equipment being used during the course of the surgical procedure to the expected steps or equipment for the type of surgical procedure that the surgical hub 5104 determined is being performed. The surgical hub 5104 can provide an alert indicating that an unexpected action is being performed or an unexpected device is being utilized at the particular step in the surgical procedure.

The surgical instruments (and other modular devices 5102) may be adjusted for the particular context of each surgical procedure (such as adjusting to different tissue types) and validating actions during a surgical procedure. Next steps, data, and display adjustments may be provided to surgical instruments (and other modular devices 5102) in the surgical theater according to the specific context of the procedure.

Figure 7:
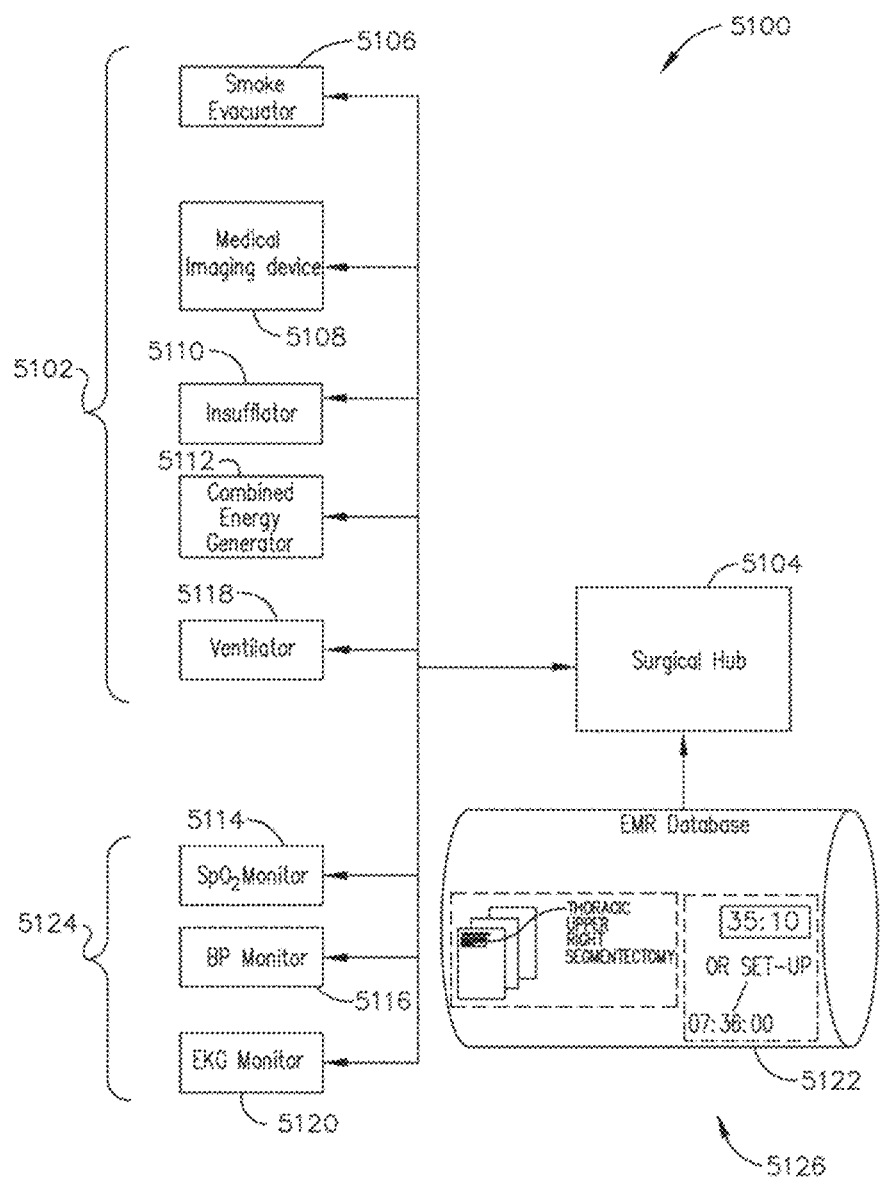
FIG. 7 illustrates a diagram of a surgical hub communicably coupled to a particular set of modular devices and an Electronic Medical Record (EMR) database.

FIG. 7 illustrates a diagram of a surgical hub communicably coupled to a particular set of modular devices and an Electronic Medical Record (EMR) database. FIG. 7 illustrates a diagram of a surgical system 5100 including a surgical hub 5104 communicably coupled to a particular set of data sources 5126. A surgical hub 5104 including a situational awareness system may utilize the data received from the data sources 5126 to derive contextual information regarding the surgical procedure that the surgical hub 5104, the modular devices 5102 paired to the surgical hub 5104, and the patient monitoring devices 5124 paired to the surgical hub 5104 are being utilized in connection with. The inferences (i.e., contextual information) that the situational awareness system may derive from the particular set of data sources 5126 are depicted in dashed boxes extending from the data source(s) 5126 from which they are derived. The contextual information derived from the data sources 5126 may include, for example, what step of the surgical procedure is being performed, whether and how a particular modular device 5102 is being used, and the patient's condition.

In the example illustrated in FIG. 7, the data sources 5126 may include a database 5122, a variety of modular devices 5102, and a variety of patient monitoring devices 5124. The surgical hub 5104 may be connected to various databases 5122 to retrieve therefrom data regarding the surgical procedure that is being performed or is to be performed. In one exemplification of the surgical system 5100, the databases 5122 may include an EMR database of a hospital. The data that may be received by the situational awareness system of the surgical hub 5104 from the databases 5122 may include, for example, start (or setup) time or operational information regarding the procedure (e.g., a segmentectomy in the upper right portion of the thoracic cavity). The surgical hub 5104 may derive contextual information regarding the surgical procedure from this data alone or from the combination of this data and data from other data sources 5126.

The surgical hub 5104 may be connected to (e.g., paired with) a variety of patient monitoring devices 5124. In an example of the surgical system 5100, the patient monitoring devices 5124 that are be paired with the surgical hub 5104 may include a pulse oximeter (SpO2 monitor) 5114, a BP monitor 5116, and an EKG monitor 5120. The perioperative data that is received by the situational awareness system of the surgical hub 5104 from the patient monitoring devices 5124 may include, for example, the patient's oxygen saturation, blood pressure, heart rate, and other physiological parameters. The contex-tual information that may be derived by the surgical hub 5104 from the perioperative data transmitted by the patient monitoring devices 5124 may include, for example, whether the patient is located in the operating theater or under anesthesia. The surgical hub 5104 may derive these inferences from data from the patient monitoring devices 5124 alone or in combination with data from other data sources 5126 (e.g., the ventilator 5118).

The surgical hub 5104 may be connected to (e.g., paired with) a variety of modular devices 5102. In one exemplification of the surgical system 5100, the modular devices 5102 that are paired with the surgical hub 5104 may include a smoke evacuator 5106, a medical imaging device 5108, an insufflator 5110, a combined energy gen-erator 5112 (for powering an ultrasonic surgical instrument and/or an RF electrosurgical instrument), and a ventilator 5118.

The medical imaging device 5108 may include an optical component and an image sensor that generates image data. The optical component may include lens or a light source, for example. The image sensor may include a charge-coupled device (CCD) or a complementary metal-oxide-semicon-ductor (CMOS), for example. In various examples, the medical imaging device 5108 may include an endoscope, a laparoscope, a thoracoscope, and other such imaging devices. Various additional components of the medical imaging device 5108 are described herein. The perioperative data that is received by the surgical hub 5104 from the medical imaging device 5108 may include, for example, whether the medical imaging device 5108 is activated and a video or image feed. The contextual information that is derived by the surgical hub 5104 from the perioperative data transmitted by the medical imaging device 5108 may include, for example, whether the procedure is a VATS procedure (based on whether the medical imaging device 5108 is activated or paired to the surgical hub 5104 at the beginning or during the course of the procedure). Furthermore, the image or video data from the medical imaging device 5108 (or the data stream representing the video for a digital medical imaging device 5108) may be processed by a pattern recognition system or a machine learning system to recognize features (e.g., organs or tissue types) in the field of view (FOY) of the medical imaging device 5108, for example. The contextual information that is derived by the surgical hub 5104 from the recognized features may include, for example, what type of surgical procedure (or step thereof) is being performed, what organ is being operated on, or what body cavity is being operated in.

Figure 8:
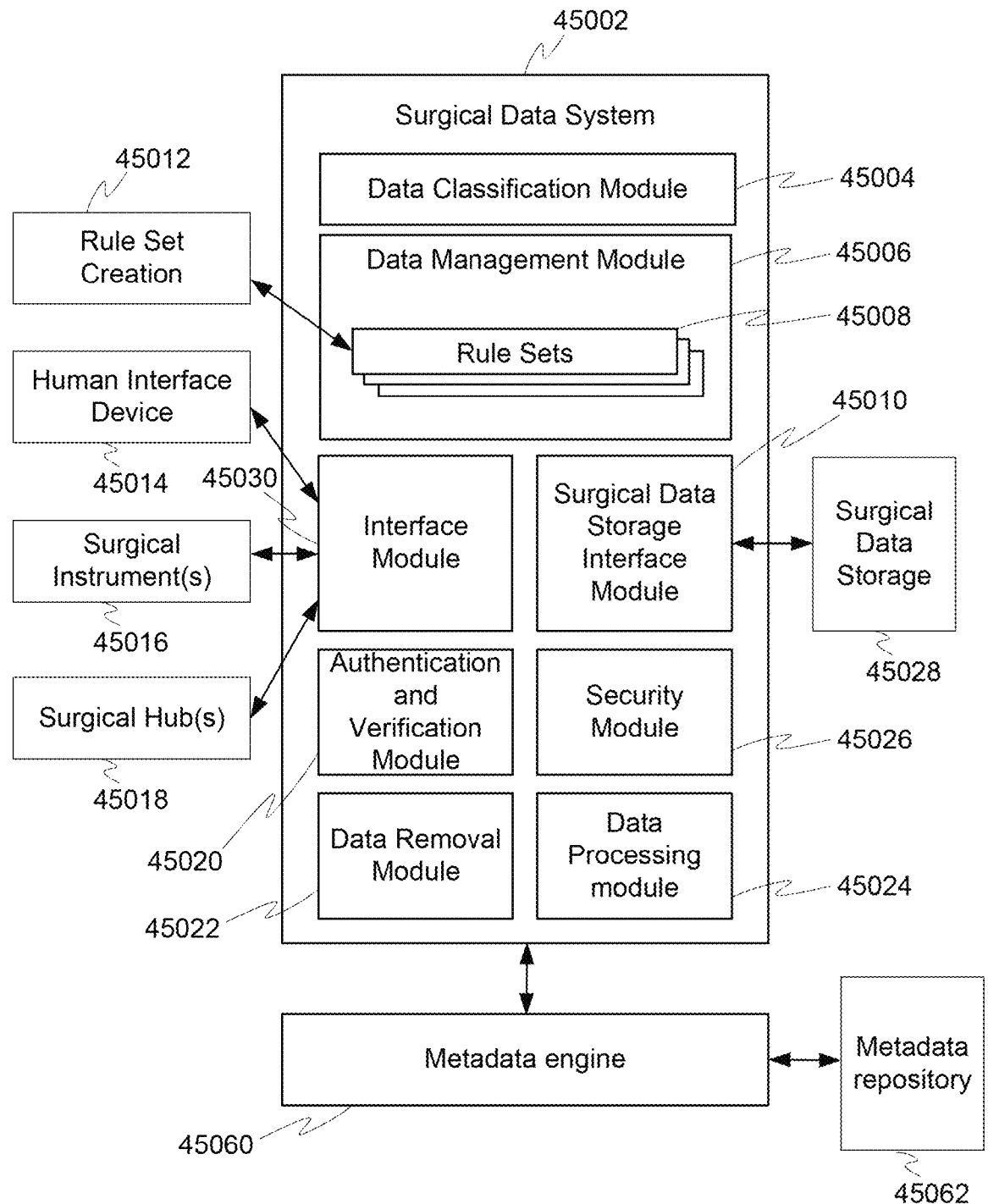
FIG. 8 shows an example surgical data system.

FIG. 8 shows an example surgical data system. The surgical data system 45002 may support functionalities of a surgical hub, for example, the surgical hub 20006 in FIG. 3. The surgical data system 45002 may support functionalities of various modules of a surgical hub, for example, the various modules in the surgical hub 20006 of FIG. 3. The surgical data system 45002 may be part of a surgical hub, for example, the surgical hub 20006 in FIG. 3. The surgical data system 45002 may be part of a processor module of a surgical hub, for example, the processor module 20057 of the surgical hub 20006. The surgical data system 45002 may be a stand-alone system.

The surgical data system 45002 may include any hardware and/or software suitable for providing functionalities of managing and processing surgical information. The surgical data system 45002 may provide functionalities to support the structure and/or functions described in connection with FIGS. 1-19 herein. For example, the surgical data system 45002 may support one or more elements of a computer-implemented interactive surgical system 20070 in FIG. 5. Examples of data processing that are suitable for use with the surgical data system 45002 are described in U.S. Patent Application Publication No. US 2019-0201033 A1 (U.S. patent application Ser. No. 15/940,663), titled SURGICAL SYSTEM DISTRIBUTED PROCESSING, filed Mar. 29, 2018, the disclosure of which is herein incorporated by reference in its entirety. In one or more of those examples, processing of data may be shared with a handheld instrument with a limited processor. The surgical data system 45002 may include a situational awareness system that is described herein. Examples that are suitable for use with the surgical data system 45002 are described in U.S. Patent Application Publication No. US 2019-0206551 A1 (U.S. patent application Ser. No. 15/940,666), titled SPATIAL AWARENESS OF SURGICAL HUBS IN OPERATING ROOMS, filed Mar. 29, 2018, the disclosure of which is herein incorporated by reference in its entirety. In one or more of those examples, a surgical hub may identify the bounds of an operating space.

The surgical data system 45002 may include one or more functional modules. Each module may include hardware, software, or a combination thereof that enable functionality of the module. One or more modules, operating in concert or otherwise, may enable authentication and verification of data, data security, database integration, data classification, data processing, data removal and big data management. The modules may include hardware elements, such as a computer processing unit, a graphics processing unit, a field-programmable gate array (FPGAs), communications hardware, memory, and the like. The modules may include software elements that when executed by a processor cause the modules to perform the functionalities of the modules.

The surgical data system 45002 may include an interface module 45030. The interface module 45030 may enable communication with one or more of a human interface device 45014, a surgical instrument 45016, or a surgical hub 45018 (e.g., surgical hub 5104). The human interface device 45014 may include a display. In some examples, the surgical hub 45018 may be the surgical hub 20006 that has a communication module 20056. The surgical data system 45002 may include, for example, one or more surgical data repositories. The surgical data system 45002 may interact with a surgical data storage 45028 through the surgical data storage interface module 45010. In an example, the surgical data storage 45028 may include the remote server 20067 of the cloud computing system 20064 in FIG. 4.

The surgical data system 45002, may obtain data, for example, from various operating room equipment and sensing devices, as shown in FIG. 2. For example, the data may include any surgical data collected from the various operating room equipment and sensing devices. For example, the surgical data system 45002 may receive data directly from any of the networked devices disclosed in FIGS. 1-8. Such data may include information about a live surgical procedure, for example. Such data may include information about a past surgical procedure. Such data may include information about future, scheduled surgical procedures. Examples of data this is suitable for use with the present disclosure are described in U.S. Patent Application Publication No. US 2019-0207773 A1 (U.S. patent application Ser. No. 15/940, 645), titled SELF DESCRIBING DATA PACKETS GENERATED AT AN ISSUING INSTRUMENT, filed Mar. 29, 2018, the disclosure of which is herein incorporated by reference in its entirety. In one or more of those examples, self-describing data may allow a processor to interpret data without having been told in advance of its receipt.

Information about surgical procedures (e.g., surgical information) may include information about the patient, the staff, the procedure as planned, the procedure as experienced, and post-operative activity including patient outcomes. For example, the information received and used by the surgical data system 45002 may include patient records, patient imaging, models of patient anatomy, patient lab results, patient medical history, and the like. For example, the information received and used by the surgical data system 45002 may include a staff manifest for a procedure, details about the past procedures of the specific staff members, staff metrics, experience, recent scheduling and workload, and historical surgical activity, such instrument use statistics, procedure duration, and the like. For example, the information received and used by the surgical data system 45002 may include procedure plans, equipment and inventory information, pull-lists, checklists, procedure plan analysis and recommendations. For example, the information received and used by the surgical data system 45002 may include any data collected or generated during a live procedure, such as procedure progress, milestones, patient information, vitals, operating theater setup, staff movement, imaging, instrument use, surgical technique, such as that captured by video, recorded manually, and/or inferred from smart-instrument reporting for example, duration, abnormal event reporting, and the like. Any data captured during a live procedure may also be stored and made available as a past procedure. For example, the information received and used by the surgical data system 45002 may include post-operative records, patient recovery information, and patient outcome information, post-operative diagnostic information, such as labs, imaging, etc.

The surgical data system 45002 may include authentication and verification module 45020. The authentication and verification module 45020 may authenticate and/or verify surgical data that the device receives by employing the surgical data system 45002. Examples that are suitable for use with the authentication and verification module 45020 are described in in U.S. Patent Application Publication No. US 2019-0205441 A1 (U.S. patent application Ser. No. 16/182,224), titled SURGICAL NETWORK, INSTRUMENT, AND CLOUD RESPONSES BASED ON VALIDATION OF RECEIVED DATASET AND AUTHENTICATION OF ITS SOURCE AND INTEGRITY, filed Nov. 6, 2018, the disclosure of which is herein incorporated by reference in its entirety. In one or more of those examples, hub, instrument, and cloud responses may operate based on validation of a received dataset and authentication of its source and integrity. One or more of the responses may be a choice of reactions to either the data or metadata.

The surgical data system 45002 may include security module 45026. In an example, the security module 45026 may provide security of monitoring authenticity and sterility of manual device(s) assisting in a robotic case. Examples that are suitable for use with the security module 45026 are described in in U.S. Patent Application Publication No. US 2019-0207911 A1 (U.S. patent application Ser. No. 15/940, 641), titled INTERACTIVE SURGICAL SYSTEMS WITH ENCRYPTED COMMUNICATIONS CAPABILITIES, filed Mar. 29, 2018, the disclosure of which is herein incorporated by reference in its entirety. In one or more of those examples, mantle generator data may be encrypted and communicated through the internet. Examples that are suitable for use with the security module 45026 are described in in U.S. Patent Application Publication No. US 2019-0206216 A1 (U.S. patent application Ser. No. 16/182,248), titled DETECTION AND ESCALATION OF SECURITY RESPONSES OF SURGICAL INSTRUMENTS TO INCREASING SEVERITY THREATS, filed Nov. 6, 2018, the disclosure of which is herein incorporated by reference in its entirety. In one or more of those examples, a wireless pair surgical instrument may detect and escalate security responses to numerous or increasing severity threats.

The surgical data system 45002 may include a data management module 45006. The data management module 45006 may provide management of a data stream, and/or an organization and structure of the data stream, for example, to facilitate an integration of the data stream into a database or multiple databases. The data management module 45006 may provide management of a data stream, and/or an organization and structure of the data stream, for example, by selecting one or more rule sets from rule sets 45008. The rule sets 45008 may be generated via rule set creation 45012. Examples that are suitable for use with the data management module 45006 are described in in U.S. Patent Application Publication No. 2019-0200988 A1 (U.S. patent application Ser. No. 16/024,162), titled SURGICAL SYSTEMS WITH PRIORITIZED DATA TRANSMISSION CAPABILITIES, filed Jun. 29, 2018, the disclosure of which is herein incorporated by reference in its entirety. In one or more of those examples, same data that is received from two different sources may be prioritized. Examples that are suitable for use with the security module 45026 are described in in U.S. Patent Application Publication No. US 2019-0205567 A1 (U.S. patent application Ser. No. 15/940,649), titled DATA PAIRING TO INTERCONNECT A DEVICE MEASURED PARAMETER WITH AN OUTCOME, filed Mar. 29, 2018, the disclosure of which is herein incorporated by reference in its entirety. In one or more of those examples, a data pairing method may allow a surgical hub to interconnect a device measured parameter with an outcome.

The surgical data system 45002 may communicate with a metadata engine 45060. A metadata engine may collect, store (e.g., in short-term), and/or analyze information about data and/or metadata in use within a domain. For example, the metadata engine 45060 may manage metadata harvesting, register metadata, categorize metadata, organize metadata, develop a scheme for metadata storage, and/or manage metadata tagging. Metadata may include data about data such as content data. Metadata may include digital media, catalog(s), dictionar(ies), and taxonom(ies). In examples, metadata of a dataset may include one or more of the following: a title, an indication of a datatype, the number of entries in a dataset, maximum and/or minimum value in the dataset, the number of attributes indicated by the dataset, the lineage of the dataset (e.g., who created an entry, who accessed the dataset at what time, how the dataset was changed, etc.). For example, metadata of a dataset collected from a powered stapler generator during a gastric bypass surgery may include data of tissue type. Metadata harvesting (or metadata discovery) may include discovering the semantics of a data element in a dataset using automated tool(s). For example, an output of a metadata discovery may include a set of mappings between data source elements and a centralized metadata registry. Metadata in one or more examples herein may be discovered using spatial functions and/or spatial predicates. Spatial functions may be used to modify features to create additional features (e.g., creating new features from existing ones), for example, by providing a buffer around them, intersecting features, etc. Spatial predicates may use true/false queries about spatial relationships between geometries. Metadata tagging (e.g., adding information about a dataset) may be used to indicate compilation information associated with a respective dataset, for example, when the dataset is added to a database and/or indicate result(s) based on an inclusion of the dataset in the database. Metadata in one or more examples herein may be registered in a metadata registry. Metadata definitions (e.g., all metadata definitions for an organization) may be stored in the metadata registry and/or maintained in a controlled manner. In examples, metadata registry may be placed at a central and/or secured location in an organization. Metadata in one or more examples herein may be stored in a metadata repository (e.g., a metadata repository 45062). A metadata repository is the database where metadata (e.g., all metadata for an organization) is stored. The metadata registry may indicate relationships among related metadata types, for example, related metadata types in the metadata repository. In examples, the metadata engine may communicate with the surgical data system 45002 through the interface module 45030.

Figure 9:
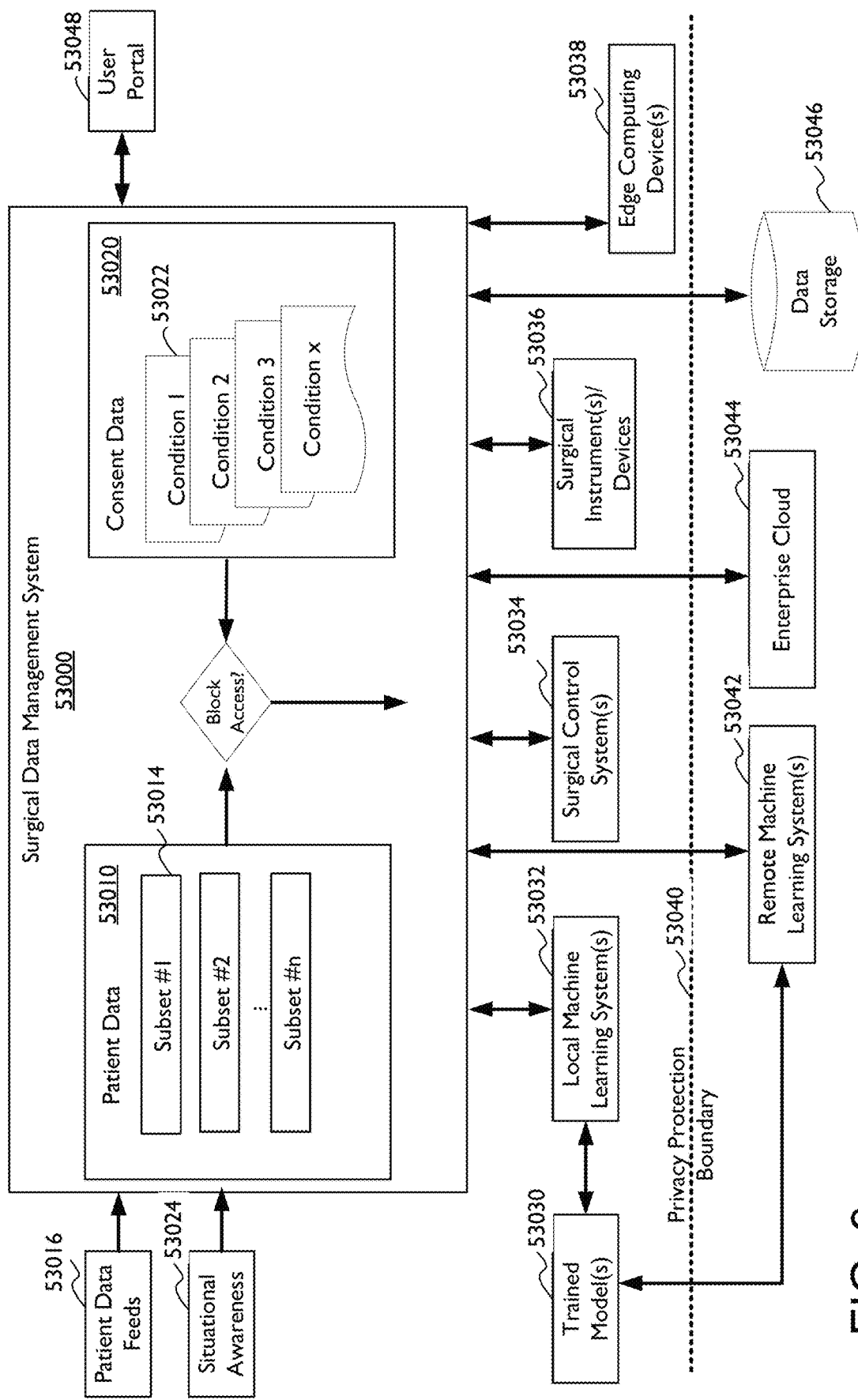
FIG. 9 shows an example surgical data management system.

FIG. 9 shows an example surgical data management system 53000 that may manage patient health data and related consent data. The surgical data management system may be or may include the surgical data system 45002 described herein with respect to FIG. 8. The surgical data management system 53000 may be part of a processor module of a surgical hub, for example, the processor module 20057 of the surgical hub 20006. The surgical data system 45002 may be a stand-alone system. While the surgical data management system 53000 is described in the context of managing surgical data, those skilled in art may appreciate that the techniques described herein apply to other managing other health-related data.

As shown in FIG. 9, the surgical data management system 53000 may receive data from various patient data feeds 53016 and store patient data 53010. Patient data 53010 may include the patient's electronic health record (EHR) within the privacy limits protected and controlled by HIPAA. For example, if the patient data includes patient-identifying information, HIPAA compliance protection of the data may be triggered. HIPAA may specify multiple rules, for example, Privacy Rule; Transactions and Code Sets Rule; Security Rule; Unique Identifiers Rule; Enforcement Rule. Most other major countries have similar laws, rules or requirements. Example patient-identifying information may include, but not limited to, names or part of names, information that may indicate unique identifying characteristic, geographical identifiers, dates directly related to a person, phone number details, fax number details, details of email addresses, social security details, medical record numbers, health insurance beneficiary numbers, account details, certificate or license numbers, vehicle license plate details, device identifiers and serial numbers, website URLs, IP address details, fingerprints, retinal and voice prints, complete face or any comparable photographic images, and/or the like.

Patient data feeds may include data feeds from one or more of environmental sensing system 20015, wearable sensing system 20011, human interface system 20012, robotic system 20013, intelligent instrument 20014, surgical system 20002, and/or the like as described herein with reference to FIGS. 1-4. The patient data feeds 53016 may include data feeds from human interface device 45014, surgical instrument(s) 45016, surgical hub(s) 45018, surgical data storage 45028, surgical data system 45002, and/or the like as described herein with reference to FIG. 8. Patient data 53010 may include data obtained from patients, their healthcare providers (e.g., data entered by the patient or their doctors), data generated by various systems, instruments and/or devices described herein, and/or data received from an external data source (e.g., patient data obtained from another healthcare provider). The patient data 53010 may include data generated by aggregating data feeds from the various data sources described herein. The patient data 53010 may include multiple subsets 53014. The subsets 53014 of patient data 53010 may be compartmentalized as described herein.

The surgical data management system 53000 may store patient consent data 53020. A healthcare provider may obtain permission or consent from patients to use and disclose their protected health data for treatment, payment, and health care operations. The use of a patient's electronic health data or medical records may be restricted based on the patient's consent. For example, only anonymized electronic medical records may be used. Personal identifying information may be either removed or blocked from access for the purpose of identifying patterns, improvements, and/or techniques that may be used to affect the operation of surgical tools for future use. A patient's consent may be associated with one or more conditions 53022 as described in detail herein.

The surgical data management system 53000 may provide a user interface (not shown) to allow patients to have direct control over the hierarchy of granted levels. The surgical data management system 53000 may monitor for triggering events that may trigger changes to a consent. Whether a triggering event has occurred may be determined based on situational awareness using situational awareness 53024 (e.g., as described herein with respect to FIG. 6). Examples of situation awareness may be disclosed in U.S. Patent Application Publication No. US 2019-0104919 A1 (U.S. patent application Ser. No. 16/209,478), titled METHOD FOR SITUATIONAL AWARENESS FOR SURGICAL NETWORK OR SURGICAL NETWORK CONNECTED DEVICE CAPABLE OF ADJUSTING FUNCTION BASED ON A SENSED SITUATION OR USAGE, filed Dec. 4, 2018, the disclosure of which is herein incorporated by reference in its entirety, and in U.S. Patent Application Publication No. US 2019-0206564 A1 (U.S. patent application Ser. No. 16/209,490), titled METHOD FOR FACILITY DATA COLLECTION AND INTERPRETATION, filed Dec. 4, 2018, the disclosure of which is herein incorporated by reference in its entirety, which, in one or more examples, describes where and/or how data is handled.

The surgical data management system 53000 may monitor for triggering events that may trigger a verification of the consent. The surgical data management system 53000 may log, record, and catalog patient consents.

The surgical data management system 53000 may facilitate patient granting and revoking of consent for data logging and/or data usage. For example, the surgical data management system 53000 may record a patient's consent authorizing a healthcare provider's systems to collect and access the collected data. Various consent options may be presented to the patient, for example, via user portal 53048, and the patient consent data 53020 may be generated based on the patient's selection of the options.

The surgical data management system 53000 may provide a user interface to obtain a patient's consent for allowing certain type(s) of data collection. For example, the surgical data management system 53000 may present an option for the patient to indicate that data received directly from the patient (e.g., via the patient's data entry) can be collected. The surgical data management system 53000 may present an option for the patient to indicate that patient's data can or cannot be collected via surgical systems or surgical devices related to the surgical procedure for the patient. The surgical data management system 53000 may present an option for the patient to indicate that patient's data can or cannot be collected via various monitoring or sensing systems described herein with respect to FIG. 4.

The surgical data management system 53000 may provide a user interface to obtain a patient's consent for allowing the patient's medical records for certain specific use(s). For example, the surgical data management system 53000 may present an option for the patient to indicate that the patient's medical records and data collected can be only used for diagnosis of the patient. For example, the surgical data management system 53000 may present an option for the patient to indicate that the patient's medical records and data collected can be used to customize treatment of the patient. For example, the surgical data management system 53000 may present an option for the patient to indicate that the patient's medical records and data collected can be combined with other patient's data and can be used to enhance surgical control. The surgical data management system 53000 may present an option for the patient to indicate that the patient's medical records and other data collected can be accessed by certain systems, organizations, and/or facilities.

The surgical data management system 53000 may reconcile conflicting usage of or access to the data. The surgical data management system 53000 may receive a user indication to revoke the patient's consent. In response to the indication to revoke consent, the surgical data management system 53000 may remove data previously collected based on the consent revocation. The surgical data management system 53000 may instruct inter-related systems and/or devices to refrain from collecting data associated with the patient. The surgical data management system 53000 may instruct inter-related systems and/or devices to remove data associated with the patient based on the consent revocation. The surgical data management system 53000 may generate and present a validation or conformation notification to the patient that the associated instances of their data have been removed as requested.

The surgical data management system 53000 may log medical power of attorneys and/or other legal transfers of power to consent. Legal transfers of power to consent can be used to grant others the ability to access, transfer, consent, or revoke consent. This could be in addition to or in replacement of the patient's rights. For example, a patient may not necessarily have or need the legal right to consent or revoke consent. In these circumstances, a secondary server, security keys, or access granting or confirming could be on a separate key, system, server, etc. that would be needed in cooperation to the system holding or accessing the data in order to gain access and control aspects of the data.

The surgical data management system 53000 may securely record and store patient consent data 53020. For example, a patient's consent record(s) may be associated with an identifier of the person granting consent or a proxy for the consent. The consent may include a reference element that could be used to link the consent to the data without identifying the person who granted the consent or the person the data originated from. The person granting consent may be authenticated, and the consenter's authority to grant consent may be verified by the surgical data management system 53000. The surgical data management system 53000 may verify the consenter's cognitive ability to grant consent, as described herein. The surgical data management system 53000 may verify the consenter's legal authority to grant the consent. The surgical data management system 53000 may prompt the consenter to verify that the consenter understands the level and magnitude of the consent, their options for limiting the scope of the consent, and to verify their understanding of the consent. The consent may be associated with the data in the form of a key, encryption aspect, metadata, etc. The consent data 53020 may be stored with the protected patient data 53010 (e.g., to ensure proper handling of the patient's private data).

The surgical data management system 53000 may catalog patient consents. For example, the surgical data management system 53000 may provide a user portal 53048, which may be accessed by patients at facilities, networks, and/or treatment sites. The user portal 53048 may allow patients to catalog and review the consents they have given. For example, cataloging may be temporally based on a listing of the consents in a hierarchal order. Parent-child consent relationships could be displayed, allowing the patient to know who and how the consent was granted. Historical consent trees may be generated and presented. For example, a historical consent tree may be configured to depict how the initial consent to a specific facility or location has been expanded through that facility's relationships with other facilities or companies.

The surgical data management system 53000 may grant or block access to patient data 53010 based on the associated patient consent data 53020. For example, the surgical data management system 53000 may send patient data 53010 to various systems such as local machine learning system(s) 53032, surgical control system(s) 53034, surgical instrument(s)/device(s) 53036 (e.g., the surgical instrument(s) 45016 in FIG. 8), edge computing device(s) 53038, remote machine learning system(s) 53042, a cloud-based system in the enterprise cloud 53044 and/or a remote data storage 53046 (e.g., the surgical data storage 45028 in FIG. 8). Sending patient data may be in response to a data request from a data requesting system, in response to a triggering event, and/or based on a predetermined schedule (e.g., patient data may be sent periodically). Model(s) 53030 may be trained, for example, by the local machine learning system(s) 53032 and/or the remote machine learning system(s) 53042.

As shown, some data requesting systems, such as local machine learning system(s) 53032, surgical control system(s) 53034, surgical instrument(s)/device(s) 53036 and edge computing device(s) 53038 may be located within the privacy protection boundary 53040. Some data requesting systems such as remote machine learning system(s) 53042, a cloud-based system in the enterprise cloud 53044 and/or a remote data storage 53046 may be located outside of the privacy protection boundary 53040. The privacy protection boundary 53040 may be the boundary of a network of an organization that collects the patient's data for diagnosis, treatment, billing, etc. The privacy protection boundary 53040 may be a HIPAA boundary.

Individuals have the right to request access to a "designated record set," which Health and Human Services defines as a "group of records maintained by or for a covered entity that is used, in whole or part, to make decisions about individuals, or that is a provider's medical and billing records about individuals or a health plan's enrollment, payment, claims adjudication, and case or medical management record systems." Certain information may be excluded from this right to access. For example, an individual may not have a right to access information not used to make decisions about the individual, psychotherapy notes that are maintained separate from the patient's medical records, and/or information compiled in reasonable anticipation of, or for use in, a civil, criminal, or administrative action or proceeding. When someone requests a designated record set, HIPAA (the Health Insurance Portability and Accountability Act) requires records to be provided within thirty calendar days from receipt of the request, although entities should endeavor to respond to the request sooner if possible.

Techniques and systems for data propagation reporting may allow patients to track where their health data is located and how it is being accessed and/or used. For example, the patient's health data may be annotated with utilization information associated with the patient's health data. The utilization information may include information about the access, inclusion and/or use of the patient's health data. For example, the utilization information may include the system(s) (including the location(s), the system type, and/or the like of the system(s)), in which the health data has been stored, accessed, and/or used. For example, the utilization information may include an indication of time(s) and/or durations when the patient's health data has been accessed, included, and/or used. For example, the utilization information may include the purpose for which the patient's health data has been accessed, included and/or used.

Figure 10:
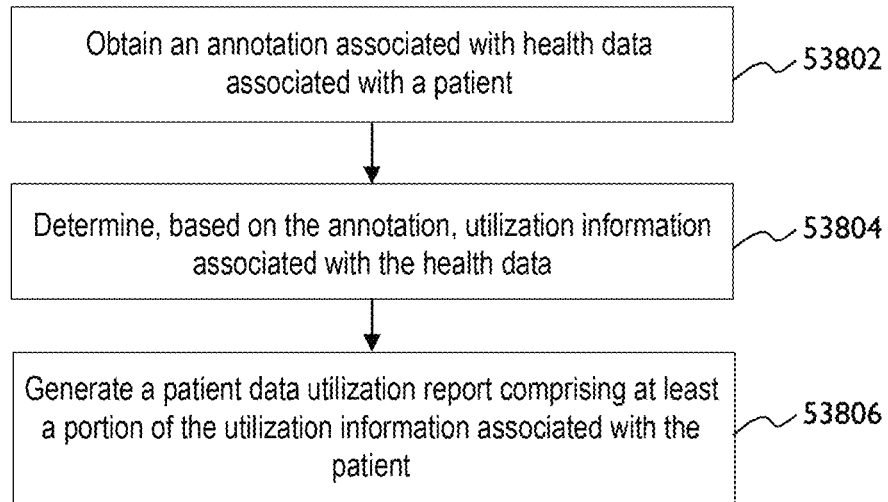
FIGS. 10 and 11 show example processes for data propagation reporting.

FIG. 10 shows an example process for data propagation reporting. At 53802, a data propagation reporting system (e.g., the surgical data management system 53000 as described herein) may obtain the annotation associated with a patient's health data. For example, the system may generate the annotation (e.g., based on system logs, user-entered information, and/or utilization data received from other system(s)). For example, the system may receive the annotation from another system (e.g., a system that is the source of the health data, a system that utilizes the health data, a machine learning system that uses the health data to train machine learning models, a patient data warehouse, and/or the like). For example, the system may receive certain annotations and generates certain annotations.

The annotations may be used to determine whether the patient's health data has been accessed. The annotation associated with the patient's health data may include an access annotation. For example, the system may obtain an indication that the patient's health data has been accessed. The access/utilization indication may be received via real-time data feeds, aperiodic or periodic reports, and/or system logs from internal and/or external systems. The system may generate the access annotation. The access annotation may be generated in response to the system receiving the indication. The access annotation may be configured to indicate that the health data associated with the patient was accessed. For example, the access indication may indicate access time(s) and/or duration(s), identifiers of the system from which the data was accessed, the purpose(s) for which the health data was accessed, and/or the like. The system may add the access annotation to, or associate the access annotation with, the patient's health data. For example, the access annotation may be added to the health data as metadata, as a header, and/or as a footer.

The annotation may be used to determine whether a dataset of the patient's health data has been included in a collection of data (e.g., a larger data set associated with multiple patients). For example, the system may obtain an indication of a data collection in which a dataset associated with the patient is included. The system may generate an inclusion annotation. The inclusion annotation may be generated in response to the system receiving the indication. The inclusion annotation may be configured to indicate that the dataset associated with the patient is included in the data collection. For example, the inclusion annotation may indicate the system in which the data collection is stored, the time at which the dataset was included in the data collection, the purpose(s) of the data collection, and/or the like. The system may add the inclusion annotation to, or associate the inclusion annotation with, the health data associated with the patient.

In some examples, the system may track and record access to dataset(s) of the health data in order to generate the utilization information. The utilization information may include, for example, information about the use of the health data in various control signals, functions, algorithms, and/or analyses. For example, the utilization information may include an indication of whether a dataset of the health data was used in contribution to an algorithm (e.g., an algorithm developed via machine learning, a machine learning-trained model). For example, the system may obtain an indication of an algorithm to which a dataset associated with the patient has contributed. For example, the system may obtain the indication from user input or from a system that generates, stores and/or executes the algorithm. The system may generate a contribution annotation. The contribution annotation may be generated in response to the system receiving the indication. The contribution annotation may be configured to indicate that the dataset associated with the patient has contributed to the algorithm. For example, the contribution annotation may indicate when the dataset associated with the patient contributed to the algorithm, the purpose(s) of the contribution to the algorithm, and/or the like. The system may add the contribution annotation to the health data associated with the patient, e.g., as metadata.

In some examples, the system may audit tracking of access, inclusion, and/or utilization of the health data within the metadata of the health data. The system may keep logs of the tracking information that can be accessed by the patient for a complete itemized history of the access or usage of their data.

At 53804, the system may determine the utilization information associated with the patient's health data (e.g., based on the annotation). For example, the system may extract the utilization information from the annotation. In some examples, the utilization information may be encoded, and the system may be configured to decode the utilization information.

For example, given a specific data collection, the system may determine, based on the annotation, whether one or more datasets associated with the patient has been included in the data collection. If the patient's data has been included in the data collection, the system may identify the dataset(s) associated with the patient that has been included in the data collection. The system may include an indication of the data collection in the utilization information. The system may include an indication of the identified dataset(s) in the utilization information.

The system may identify a control program (e.g., system algorithm) that a dataset has been used in contribution to. For example, for a given control program, the system may determine whether at least one dataset associated with the patient has been used in contribution to the control program. The determination may be based on the annotation. Based on the determination that at least one dataset of the associated with the patient has been used in contribution to the control program, the system may identify the at least one dataset associated with the patient that has been used in contribution to the control program. The system may include an indication of the control program in the utilization information. The system may be configured to include an indication of the identified at least one dataset in the utilization information.

For example, given a specific dataset of the datasets associated with the patient, the system may identify, based on the annotation, a data collection that the dataset has been included in. The utilization information may include an indication of the identified data collection.

For example, given a specific dataset of the datasets associated with the patient, the system may identify, based on the annotation, one or more control programs (e.g., system algorithms) to which the dataset has contributed. The utilization information may include an indication of the control program.

The utilization information may include information regarding entities, users and/or systems that have accessed the patient's health data. The utilization information may be stored within the record or metadata of the patient's health data (e.g., as an annotation).

At 53806, the system may generate a patient data utilization report that includes at least a portion of the utilization information associated with the patient. For example, the patient data utilization report may include the dates, times, and locations of access attempts and/or uses. The patient data utilization report may include location(s) where the health data is stored, protection status of the health data, age of the health data, etc. The utilization information included in the patient data utilization report may depend on one or more factors. For example, the utilization information included in the patient data utilization report may depend on a request made by the patient (e.g., a request to view certain information), a type of access (e.g., unusual attempts to access the health data), or the like.

The system may determine an identification level of the patient's health data. The identification level may indicate a level of ease with which the patient could be identified based on the health data. For example, a dataset of the health data may indicate that a patient was treated in a State for a rare form of cancer. Accordingly, the identification level of that dataset may be high because it is unlikely that many people in the State were treated for that form of cancer. The report may include the identification level.

The reporting may be periodic. For example, the system may perform time-based reporting of the access, usage, and/or impact of the health data to the patient at a predefined interval. For example, the system may generate a weekly or monthly patient data utilization report summarizing the access, usage, and/or impact of the health data. The patient data utilization report may contain a variety of information, such as how long the data has been used and the type and frequency of requests to access the health data. The patient data utilization report(s) may help the patient determine whether the patient wants their health data to continue being used in the manner reported, or if the patient wants to limit or expand the usage of their health data.

The system may perform event-based reporting of access, usage, and/or impact of the health data to the patient. For example, the system may detect that an event related to access, inclusion, or utilization of the health data has occurred. The system may then generate the patient data utilization report in response to detecting the occurrence of the event. For example, the system may alert or contact the patient in response to detecting the occurrence of the event.

In some examples, the system may decide whether to send the patient data utilization report or alert based on the sensitivity of the health data. In some examples, the system may decide whether to send the patient data utilization report or alert based on the type of requestor that is requesting to access the health data (e.g., if the requestor is someone outside of an initial consent approval list). For example, the system may send the patient data utilization report or alert upon detecting changes in the frequency or volume of requests for access to the patient's health data. The patient data utilization report or alert may indicate whether the patient's health data and/or consent to use the health data has expired. In some examples, the system may send the patient data utilization report or alert upon determining that the patient's health data was translated into another language, used outside of the patient's country of citizenship, or used outside of the country in which the health data originated.

The reported information may provide a better opportunity for the patient to change their consent data in order to block certain uses of the patient's health data. The system may monitor time-based aspects of attempts to access the patient's health data. For example, the system may monitor the frequency of access to the patient's health data. In some examples, frequent or irregular access of the patient's health data without accessing similar other datasets could trigger a security alert to the patient, the system owners, and/or the faculty indicating potential vulnerability of the security of the data, thereby enabling the patient or other administrator to change the permissions or other control aspects of the data.

The system may monitor a duration of access (e.g., individual access timing, cumulative access, average time of access), and/or the time between access attempts (e.g., by storing the last time that the data was accessed). The patient may set a predefined amount of time by which the data must be deleted. For example, the system may start a counter, which may be restarted if the patient's health data is accessed. However, if the data is not accessed within the time (e.g., when the counter expires), then the data may be deleted to protect the security and privacy of the patient.

Figure 11:
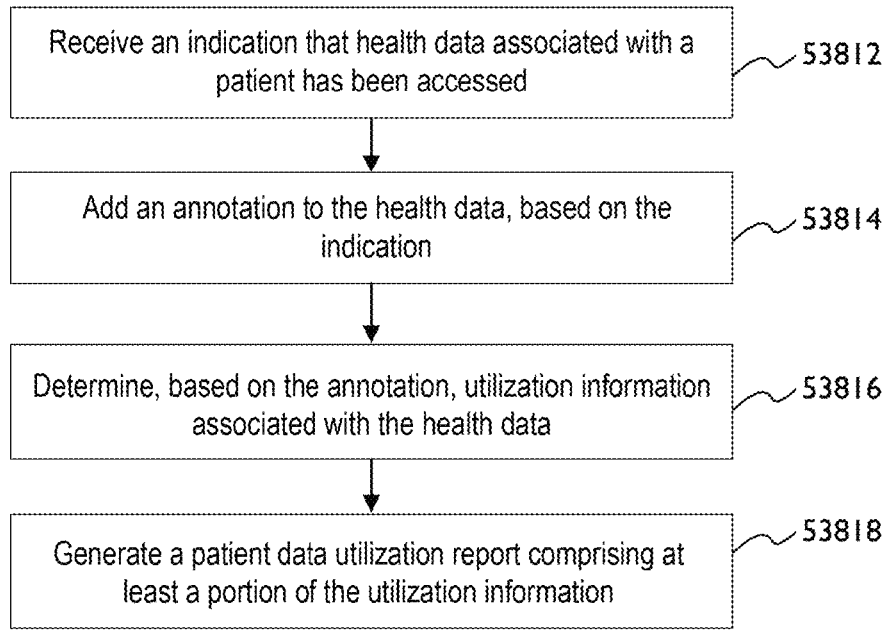

FIG. 11 shows an example process for data propagation reporting. At 53812, the data propagation reporting system may receive an indication that health data associated with a patient has been utilized. For example, the data propagation reporting system may receive the indication from the system that accessed the health data. At 53814, the data propagation reporting system may add an annotation to the health data (e.g., based on the indication). The annotation may include, for example, access annotation, inclusion annotation, and/or contribution annotation, as described herein.

At 53816, the data propagation reporting system may determine utilization information associated with the health data. The determination may be based on the annotation. The utilization information may include, for example, an indication of time(s) and/or durations when the patient's health data has been accessed and/or identification information of the system that accessed the health data. At 53818, the data propagation reporting system may generate a patient data utilization report. The patient data utilization report may include at least a portion of the utilization information.

The patient's health data may include smaller datasets. Tracking of the datasets may allow the system to more easily document trending, identification, or understanding of where or how the patient's health data has been utilized. For example, a dataset may include data that relates to a particular illness, treatment, procedure, part of the patient's body, health care provider, and/or the like. Such individualization of the use(s) and location(s) of particular subsets of the patient's health data may enable the patient to better customize access to their health data.

The system may enable the patient to track the origin(s) of a specific data set of the patient's health data and the utilization, duplication, and/or adaptation of the health data by other system(s). The data management system may determine a source of a dataset of the health data. For example, the source of the dataset may be determined based on the annotation. For example, the annotation may include an indication of the source of the dataset, such as an internet protocol (IP) address of the device that generated the dataset or another system-identifying number. The report may include an indication of the source of the dataset.

For example, given a specific dataset of the patient's health data, the system may determine a privacy characterization of the dataset. For example, the annotation for the dataset may indicate the privacy characterization of the dataset. Based on the privacy characterization, the system may determine whether the dataset includes private data, public data, or both. The report may include an indication of the determination (e.g., the privacy characterization of the dataset for a specific dataset associated with the patient).

For example, the system may determine whether the dataset includes private data, public data or both based on annotations indicating the source of the dataset. For example, the privacy characterization may indicate the source of the dataset. For example, based on a condition that the source of the dataset is the patient's primary care physician, the dataset may be characterized as private health data. For example, based on a condition that the source of the dataset is a publication, the dataset may be characterized as public data. The report generated by the system may indicate whether the dataset includes private data, public data or both.

Collection of the patient's health data, whether the collection is a single instance or collection over time, may create an enormous web of interactions and utilizations. Accordingly, the system may generate a visualization of the patient's health data by compiling subsets, aggregates, and/or compilations of the health data. This may help the patient understand the extent of their health data, its location(s), and the depth of the information contained in the health data.

The system may, based on the annotations, aggregate the usage and location(s) of the health data into summary depictions indicating of the extent to which a patient's health data has been used, what the patient's health data has been used for, and/or the benefits the patient has helped uncover (e.g., discovery of a novel treatment for diabetes, development of a vaccine, etc.).

The system may generate an assessment of the impact the patient's health data had on developments that resulted from use of the patient's health data. For example, the system may predict potential implications of the patient's health data being excluded from a given dataset. The system may provide a visualization of the impact of the patient's health data. For example, the impact of the health data may be an impact on an area of medicine, an impact on the development of a particular treatment, and/or an impact on a geographical area. For example, the system may indicate the impact the patient's health data has had on reducing the price for a procedure or treatment. The system may, based on the annotations, determine that the patient's health data was used to train a machine learning model for controlling a smart surgical instrument. The system may obtain information on how the patient's health data has impacted the functionality of the surgical instrument. The system may generate a summary of how other people's health data has had an impact on the patient's treatments and/or instrument behaviors. The impact information may be, for example, part of the utilization information. A transcription of this information may be automatically embedded in the patient's health data (e.g., as part of an annotation).

The patient data utilization report may include one or more visualizations. For example, the system may generate a visualization including a hierarchical view of the cascade of where the patient's health data is located (e.g., from within the treatment facility to the manufacturer's cloud). The visualization(s) may be interactive. For example, the patient may be able to select and explore various summaries to perform a more comprehensive review of the dataset(s) that the patient is interested in exploring. In some examples, the review may be coupled with the patient's permissions, thereby allowing the patient to determine what data sets to share at different levels.

Health data portability (e.g., moving patient health data from one location to another) may facilitate the creation of a complete record for the patient and/or health care provider(s) to utilize.

A secure data storage may be accessible and updatable by multiple healthcare providers (e.g., hospitals, medical labs, rehab centers, primary care physicians, surgical centers, and/or the like). The healthcare providers may access and update the data in secure data storage even though the healthcare providers may use separate protected networks to store the portion of the health data collected at their facility. The secure data storage may be, for example, part of a surgical data management system (e.g., the surgical data management system 53000, as described herein). The secure data storage may be, for example, external to a surgical data management system (e.g., external data storage such as a remote data storage 53046). Such sharing between the healthcare providers may be accomplished using consent key(s). The consent keys may be generated as part of the patient's granting of consent.

When a patient accesses a healthcare provider secure access point with the patient's personal container, the healthcare provider protected network may be updated with the information stored in the patient container to allow the healthcare provider access to a more complete dataset. The data that is stored in the patient container may be uploaded to the new protected network's storage and/or may be overlaid onto the data stored in the new protected network's storage.

The system may be configured to transfer consent records and/or private health data records for use by multiple healthcare providers. The private health data records may include treatments, outcomes, progress information, and/or monitoring data. The private health data records may be shared among multiple healthcare providers using separate protected networks. The system may control access to one or more protected data locations to give multiple healthcare providers access to a combined dataset that would enable a broader review of the patient's health status, recovery, surgical preparation, and/or the like. In some examples, the system may be a physical, secure system.

The following examples show example healthcare providers that may use the system to share private health data and should not be construed as limiting the scope of the present disclosure. In an example, a patient's primary care physician (PCP) may suspect that the patient has a mental health disorder (e.g., depression, progressive degenerative memory loss, dementia, schizophrenia, and/or other cognitive or behavioral disorders). As a result, the PCP may recommend that the patient consult with a psychiatrist. The patient may select a psychiatrist that is outside of the PCP facility and, therefore, outside of the protected network associated with the PCP.

The psychiatrist may diagnose the patient's disorder and prescribe a controlled substance for treatment. The controlled substance may be administered at a healthcare facility. The patient may be monitored for a time after administration due to possible side effects of the controlled substance. There may be limitations to the patient's activities when under the influence of the substance. Accordingly, the healthcare facility selected for administration of the substance may be selected because it is the closest administration site to the patient's home. The selected health care facility may be outside of the protected networks that the PCP and psychiatrist use.

Moreover, government regulations may call for the manufacturer of the substance to track and report the usage of the substance, thereby adding another party with an interest in accessing the collected health data. For example, the manufacturer may need to collect outcomes, side effects, interactions, and/or other implications of the substance. The information collected by the manufacturer may include patient-identifying data. If the information includes patient-identifying information, HIPAA (Health Insurance Portability and Accountability Act) compliance protection of the data may be triggered. HIPAA may specify multiple rules, for example, Privacy Rule; Transactions and Code Sets Rule; Security Rule; Unique Identifiers Rule; Enforcement Rule. In this example, there are at least four separate entities/networks that may want to regularly access and share the patient's health data between each other.

Figure 12:
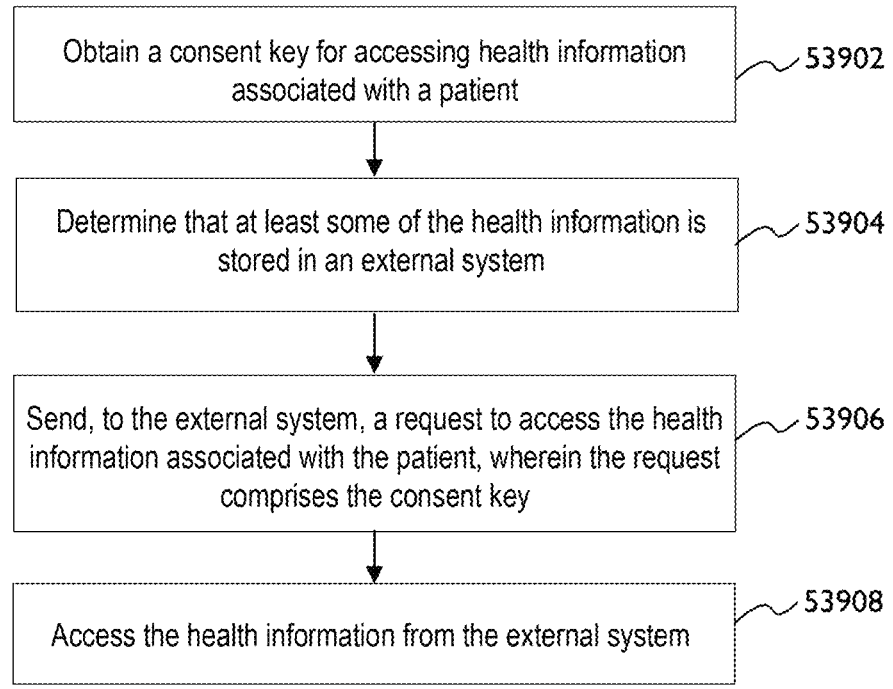
FIGS. 12 and 13 show example processes for sharing health data associated with a patient between separate health data systems.

Accordingly, healthcare providers may benefit from techniques and systems that allow the healthcare providers to share patients' health data between the separate health data systems associated with the health care providers. FIG. 12 is an example process for sharing health data associated with a patient between separate health data systems. For example, the systems may be on different sides of a privacy protection boundary (e.g., the privacy protection boundary 53040).

At 53902, a health data system may obtain a consent key for accessing health data associated with a patient. The consent key may be generated, for example, based on patient consent data. The consent key may be generated as part of the patient's granting of consent. The consent key may include consent documentation that may indicate a patient's consent data and/or data protection preference or requirements. The consent key may be associated with granting or restricting access to the patient's health data or subset(s) of the patient's health data. The consent key may be a digital key configured to indicate a patient's consent data and/or data protection preference or requirements. The digital key may be generated upon the patient granting consent and may be updated or re-generated when the patient modifies their consent. The consent key may be a digital key that may provide a receiving system secured access to the patient's consent data (e.g., current consent data, most-up-to date consent data). Upon generation, the digital key may be sent to various systems that may access the patient's health data.

A secure digital storage device may contain one or more keys (e.g., consent keys) configured to enable a patient to grant a healthcare provider access to the patient's health data stored within protected network(s) to which the healthcare provider may not have general access. Multiple protected networks may be interconnected, thereby enabling a network to access private data stored in another network. Multiple protected networks could provide each other with consent keys or secure gateways (e.g., a virtual private network (VPN)) between the two systems, thereby allowing each network to access the patient data stored within the protected networks.

At 53904, the health data system may determine that at least some of the health data is stored in an external system (e.g., a system on the other side of a privacy protection boundary). At 53906, the health data system may send, to the external system, a request to access the health data associated with the patient. The request may include the consent key.

In some examples, the health data system may receive, from the second health data system, an authentication request. The authentication request may include a request for the consent key. The health data system may send an authentication message, including the consent key, to the external system. The external system may verify that the consent key indicates that the health data system has consent from the patient to access the health data. The health data system may then be allowed to access the health data.

The health data system may, at 53908, access the health data from the external system. For example, the health data system may access the health data in response to the external system verifying that the health data system has consent from the patient to access the health data.

Figure 13:
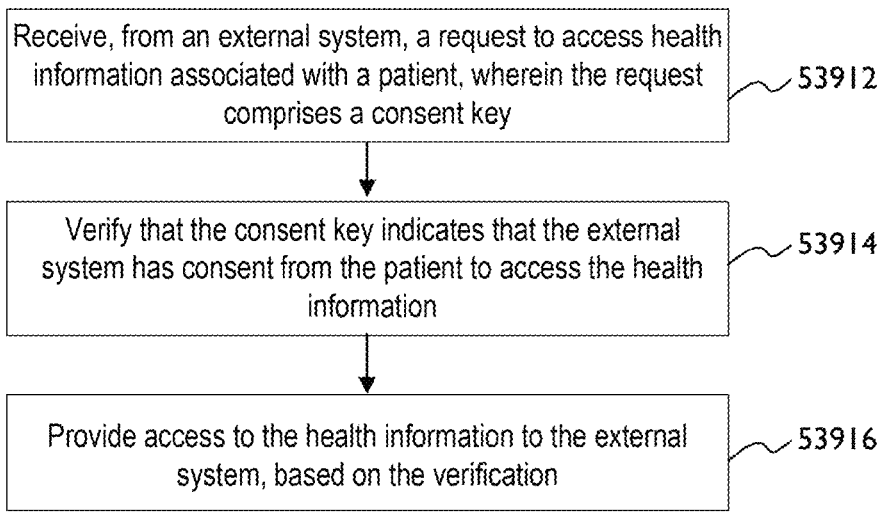

In some examples, the exchange of patient health data may be bi-directional (e.g., reciprocal) between the health data system and the external system. For example, FIG. 13 is an example process for data sharing by a system receiving a request for second health data associated with the patient. The health data stored in the external system may be first health data. At 53912, the health data system may receive, from the external system, a request to access the second health data. The request to access the second health data may include a second consent key. At 53914, the first health data system may verify that the second key indicates that the external system has consent from the patient to access the second health data. The health data system may, at 53916, provide access to the second health data to the second health data system, based on the verification.

The health data system may receive, from the external system, a request to modify the health data. The request to modify the health data may include a second consent key. The health data system may send, to the external system, an authorization message. The authorization message may be configured to allow the external system to modify the health data.

Private patient records may be shared among multiple protected networks. For example, the health data system may receive a request for the health data from a second external system (e.g., separate from the other external system). The second external system may be associated with a healthcare provider. The request for the health data may include a second consent key. The health data system may verify that the second consent key indicates that the second external system has consent from the patient to access the health data. The health data system may then provide the health data to the second external system associated with the health care provider, based on the verification.

One or more of the healthcare providers may want to be updated on and/or review treatment administration, timing, patient response, adjustments to an existing treatment, and/or impacts on other treatments not related to the primary data being collected. For example, the health data system may identify a modification to the health data stored in the external system. Accordingly, the health data system may wish to update the external system. The health data system may send, to the external system, a request to modify the health data. The request to modify the health data may include a second consent key. The second consent key may be generated, for example, based on consent associated with the modified health data. The external system may then modify the health data as requested.

In some examples, the health data system may modify the health data in accordance with the request to modify. The health data system may send the modified health data to the external system. Accordingly, the external system's records may be updated based on the health data sent by the health data system.

As an example, a patient may be prescribed an initial dosage by their PCP, but the patient's weight or other characteristics (e.g., biomarker measurements) may be different when the patient is in the administration facility. Accordingly, the actual dose administered to the patient may be different than the dosage that was originally prescribed. The system may determine the source of the discrepancy. In some examples, the system may send information regarding the administered dose back to the PCP's network. The system may send metadata for the administration, the reason for the change in dosage, and/or any biomarker data that needs to be updated.

The system may identify and/or resolve conflicting data between two separate privacy networks. The system may determine the correct data or may provide a means for resolving the conflict between data points that relate to a single patient's treatment. For example, a patient's weight may be a controlling factor for insulin (or another drug) dosage. In some cases, the weight determined at the prescribing doctor's location and the weight determined at the location where the dose is dispersed may be dramatically different. The second weight may be flagged as questionable. The system may request a confirmation weight measurement to discern which of the two weights is correct. Once the correct weight is determined, both systems may have the weight and dosage changes updated. In some examples, a flag may be placed on the original prescription in order to denote why the dosage was adjusted.

The health data system may be associated with a healthcare provider. The health data system may be granted access to the health data while the health care provider is actively interacting with the patient (e.g., while the patient is visiting for a check-up, or while the health care provider is performing surgery on the patient). In some examples, a real-time exchange of the health data may help inform the health care provider of the best steps to take during the interaction with the patient. As an example, the external system may receive a request for the patient's health data. The request may be, for example, from the healthcare provider that is actively interacting with the patient. The request may comprise a consent key for accessing the health data. The external system may then provide the health data to the health care provider (e.g., while the health care provider is interacting with the patient). Such real-time access to the health data stored in other systems may increase efficiency by reducing the amount of time and effort used to obtain the health data.

The health data system associated with the health care provider(s) may determine progress information associated with the patient. For example, the health data system may determine the progress information based on the patient's health data (e.g., which the health data system may have accessed through an external system). The health data system may then generate a report comprising the progress information. The progress information may provide the health care provider(s) with information regarding the patient's progress.

In an example, the health data system may be associated with a surgery center, and the external system may be associated with the patient's PCP. The system may determine, based on the health data accessed via the external system, progress information associated with the patient. The system may generate a report that may include the progress information. For example, the progress information may indicate readiness for surgery, a pre-existing medical condition of the patient, and/or the like.

For example, the health data system may be associated with a surgery center, and the external system may be associated with a rehabilitation facility. The system may determine, based on the health data accessed via the external system, progress information associated with the patient. The progress information may indicate recovery of the patient, long-term outcomes for the patient, and/or the like. The system may generate a report comprising the progress information.

As an example, a PCP may suspect that a patient has colon cancer due to results of a screening test. The PCP may then refer the patient to a colorectal surgeon specialist at a local hospital. The specialist may confirm the cancer and, with a team within the cancer center, identify a combination of surgical intervention and chemotherapy. The patient may have one or more co-morbidities such as being overweight and having high blood pressure and type 2 diabetes. Once the therapy and surgery are complete, the patient may be transferred to a rehabilitation facility for recovery. After the patient has recovered, the patient may be released from the rehab center. This example presents a case in which three separate HCPs within two protected networks and the PCP, which is separate from both, may need to share information about diagnosis, treatment, recovery outcomes, and long-term monitoring and outcomes.

It may be important for the patient know what data has been collected, with whom it is shared, and/or where the data will be archived and compiled. The system may present the likelihood of a person being able to identify the patient individually from the shared data. The system may provide information regarding the relative security of the patient's health data while it is being shared between health care providers. The patient may have control over what portions of the data may be shared.

Continuing from the previous example, the cancer center may have an edge network running a machine learning algorithm using data related to the facility, patient(s), care path(s), and/or treatments associated with the cancer center. The algorithm may consider a patient's pre-existing conditions, treatments, outcomes, side-effects, costs, and long-term recovery to identify improvements for treatments, better customizations for specific combinations to specialize care, relationships between treatments and outcomes, ways to reduce complications, and/or inefficiencies in cost.

The patient's PCP may want to be kept abreast of the treatments applied to the patient and may also report monitored aspects of the patient's long-term recovery. For example, indicator(s) of patient recovery or relapse may be difficult to associate with the diagnosed colon cancer and/or treatment of the colon cancer. Accordingly, only complete sharing of the monitored patient data over time may show the trends early and alert the health care providers to any indications that the patient's health is changing.

In some examples, the system may require that the patient provide initial consent for the communication of data among the three providers. The initial consent may be documented and may be used to generate access keys for accessing the patient's health data. However, the system may note that the patient may not have the capacity to grant or change the consent while under the influence of a substance or in certain other circumstances. A healthcare power of attorney may be used to grant another person access to the patient's health data usage, consent management, and/or decision-making responsibility.

In some examples, the consent key may be associated with a data requesting/receiving system. In some examples, the consent key may be associated with a data providing system. In some examples, the consent key may be associated with patient consent data. For example, the consent key may be generated based on the patient consent data and/or may include the patient consent data. The health data system may receive an indication that the patient has made a change to the patient consent data. The health data system may determine (e.g., based on the change to the patient consent data) whether to continue to provide access to the second health data. For example, the health data system may check to see if the change to the patient consent data modified (e.g., invalidated) the consent key used by the external system. For example, the health data system may determine to stop providing access to the health data if the change to the patient consent data revoked the original consent given to the external system.

The system may take steps to prevent unauthorized devices from updating the information, and/or from collecting data when the device does not have the patient's consent to gather the information. For example, the consent key may change based on changes to the patient consent data. If the other health data system is unaware of the new key and continues to try to access the health data based on an old key, the health data system may stop providing access to the health data.

In some examples, the system may selectively provide access to information regarding medical treatment and/or patient analysis from one health care provider to another health care provider. In some cases, levels of access for different data sets may be different. For example, the levels of access may depend on the patient consent data. For example, psychiatric notes of a patient are excluded from the HIPAA patient accessibility of medical records. Similarly, the levels of access may be different depending on the needs of the health care provider. For example, nurses, nurses' aides, and physical care providers generally do not require access to detailed diagnoses and/or analysis.

Devices, health care providers, and/or networks that have been granted a limited access permission may store the number of allowable uses or accesses and prevent additional access to the secured hub or network. The hub, edge server, or protected network may detect that the same device (e.g., a single use device or a limited multi-use device) has repeatedly attempted to access the health data. The hub, edge server, or protected network may detect that the device has not accessed the system recently or has exceeded its allowable number of accesses. In response to the detection, the system may limit or deny the device access to the shared datasets or data streams.

Repeated access attempts and/or exceeding the number of allowable accesses may indicate that the device is being re-processed or refurbished and that a third party is attempting to access the system without authorization. A re-processed device could provide an unauthorized company (e.g., a company that does not have consent from the patient) access to the patient data. Access of an OEM device by re-processors could allow them access to the device's recorded health data (e.g., data about a procedure or the patient's diagnoses) that could fall under the HIPAA secured network requirements and should prevent access.

The patient may be able to control access to portions of the patient's shared dataset. For example, the data could have tiered levels of opt-in or opt-out selections. The tiered levels may enable the patient to accept or reject access requests to entire dataset(s) or to accept or reject specific data selections and/or indicated usage(s). In some examples, the patient may opt-in or opt-out of default selections related to who may access the patient's health data.

It may be desirable to limit access to variables that link a first dataset or data stream to a second dataset or data stream. For example, selective access to these linking variables may be used to separate patient identifiable data from general illustration data. Some examples may provide collection of patient monitoring biomarker data streams. For example, a wearable or patient-useable repeatable biomarker monitoring system could store the biomarker data. In some examples, the biomarker data may be stored with no linkage other than the time of recording and a key associated with health care providers who may access the biomarker data. The wearable system may contain unlinked physiologic measurements. When the data from the wearable system is added to the protected network database, the data could be used to provide a fully linked dataset. When health data is recorded and/or linked, the granted access to the data may be stored as metadata of the health data. The granted access to the data may be used to determine the level of access.

In an example, a surgical instrument (e.g., a surgical stapler) may record device performance and link the performance to surgical events and/or tasks. As the instrument records these functional aspects, the instrument may define that the surgeon, the original equipment manufacturer (OEM), and/or a facility wound committee are the only people with access to the data, the linkages, and/or a combined version of the data and linkages.

In an example, the health data system may be associated with a rehabilitation facility and the external system may be associated with a surgery center. The health data system may obtain a dataset from a surgical instrument associated with the surgery center and involved in a procedure associated with a patient. The health data system may store the dataset as part of the patient's health data. The manufacturer of the surgical hub and/or surgical instrument(s) may collect data on the behavior and performance of the devices to identify potential device control adjustments. The manufacturer may use the collected data to make recommendations for improved product mixes.

In some examples, a surgical hub within the operating room may record and compile patient-specific health data along with outcomes and instrument performance and behaviors. The hospital network may compile surgical behaviors, product usage, and/or patient outcomes to improve recommendations for the facility's value committee, the physicians, and the departments, and use the compiled data to continuously improve future treatments. In some examples, an annotated video of a procedure or operational step(s) may be coupled to a healthcare record or biomarker recording. Metadata may be used to synchronize a surgical event monitor with recorded surgical activity, patient outcomes, and/or treatment impacts.

The system may present to a patient the benefit gained by allowing the day-to-day monitored data to be compiled and/or shared. For example, the monitored data may help the system look for and identify early warning signs for various health conditions.

A secure digital storage device may contain one or more keys (e.g., consent keys) configured to enable a patient to grant a healthcare provider access to the patient's health data stored within protected network(s) to which the healthcare provider may not have general access. Multiple protected networks may be interconnected, thereby enabling a network to access private data stored in another network. Multiple protected networks could provide each other with consent keys or secure gateways (e.g., a virtual private network (VPN)) between the two systems, thereby allowing each network to access the patient data stored within the protected networks.

A data system may generate a data catalog. For example, the surgical data system 45002 in FIG. 8 may organize and/or update a data catalog. The data catalog may include an inventory of data in an organization (e.g., a detailed inventory of various data assets in the organization). The data catalog may be used to identify data suitable for a certain purpose. For example, the data catalog may be used (e.g., by data professionals) to efficiently locate appropriate data for an analytical or business purpose.

In examples, a data catalog module may include one or more of a data searching function, a data evaluation function, a data access function, a data enrichment function, or a data curation function, one or more of which may be performed by or through a module or a combination of modules in FIG. 8.

A data catalog module may include a data searching function. Data searching (or dataset searching) may include searching data or dataset using one or more of facet(s), keyword(s), and business term(s). For example, natural language searching capabilities may be provided, for example, to non-technical users. Search results may be ranked (e.g., as a useful and beneficial feature) based on, for example, the relevance and/or the frequency of use.

A data catalog module may include a data evaluation function. Data evaluation (or dataset evaluation) may include choosing the right dataset(s) based on the suitability of the dataset(s) for an analysis use case, for example, without needing to download or acquire data of the dataset(s). Evaluation features may include one or more of the following: previewing a dataset; accessing, identifying, and/or reviewing the associated metadata (e.g., all associated metadata); accessing, identifying, and/or processing user rating(s); reading and/or processing user review(s) and/or curator annotation(s); viewing data quality information. A dataset may be selected based on a suitability of a dataset for a use case. Data evaluation techniques may eliminate or reduce the need to download or acquire some of the data in the dataset. Information may be provided to evaluate fitness data for intended use(s).

Dataset evaluation may be based on metadata associated with dataset(s). Metadata associated with dataset(s) may be processed (e.g., retrieved from the metadata repository 45062 in FIG. 8 and analyzed using the metadata engine 45060), for example, to provide information about the dataset(s)'s history and/or lineage, which may be used to decide (e.g., by an analyzing entity or an analyst) one or more of the following: if the dataset(s) is recent enough for the task at hand, if the dataset(s) comes from a reliable source, and/or if the dataset(s) has been updated by trustworthy individuals.

Dataset evaluation may include determining the suitability(ies) of different portions of a database (e.g., a relatively large database) or the suitability(ies) of different databases for an algorithm application or for one or more answers being sought. Different portions of a database may be associated with different levels of suitability to be used for a program, a use case, and/or for answering a question. Data may be classified for value based on the determined level(s) of suitability. For example, the suitability of data (or a dataset) for an intended analysis purpose may be determined based on one or more of the following (factors): the type of biomarker data, the completeness of data, the organization of data, or the ability to share the data (e.g., how shareable the data is), the ability to combine the data (e.g., how readily the data is to be combined with other data), and/or. In one or more examples herein, the suitability of data and the valuableness of data may be used interchangeably.

A data catalog module may include a data access function. A path or access protocol may be developed for transferring data from a data search function to a data evaluation function and for transferring from the data evaluation function to a data access function. A data catalog may provide access protocol(s) and/or access technology(ies) for a respective entry in the data catalog. Data may be accessed directly or by interoperating with access technologies. A data catalog may provide a seamless user experience. Data access function(s) may include access protections (e.g., protocols and/or techniques) for one or more of security, privacy, or compliance of sensitive data. The location of some or all shared data may be tracked, e.g., by data access function(s). Access permissions of some or all data may be identified. Data may be shared for certain purpose(s), for example, if access permission(s) of the data is identified. For example, some or all of the purposes for which the data has been shared may be listed. Individual(s), group(s), and/or facility(ies) that have access to the shared data may be listed. Tools and/or labeling that relate to one or more of personal identifiable information, data privacy, and/or reporting may be used in one or more examples herein.

A data catalog module may include a data enrichment function (e.g., the data processing model 45024 may include the data enrichment function). Data enrichment may include adding data to make a dataset more valuable. Data enrichment may include endogenous data enrichment and/or exogenous data enrichment. Endogenous data enrichment may transform original data into derived variables that are more informative and/or meaningful (e.g., to the question(s) being asked) than the original, untransformed data. The result(s) of bioinformatics and/or biomarker monitoring may provide pipelines that create derived results (e.g., using derived results integration). Data from a database (e.g., the existing database of information) may be added to a dataset to generate transformed data (e.g., to improve the usefulness or meaningfulness of the dataset to a system or to the users of the system). The transformed data may be a combination or a distillation. A distillation may include, for example, determining an impact of devices based on a device's operational data and a related device's operational data (e.g., determining an incidence level of a collateral damage of adjacent tissue(s) based on one or more of: devices used; the settings of the devices; the techniques used by the device and/or for which the devices are used). In one or more examples herein, distillations may include relating general surgical complications (e.g., one or more of a prolonged air leak duration, an incidence or magnitude of colorectal contents leak(s), hemostasis, the number of days before release, post operative infection rate(s), etc.) with procedural job(s) or constraint(s) (e.g., a minimally invasive surgery vs an open surgery, access port location(s), instrument selection(s), surgical approach(s), surgical technique(s), functional device setting(s) of operation, etc.). Examples of the distillations (e.g., transformed data generated by the distillations) may include one or more of a recovery time based on surgical approach(s), a pain intensity or pain duration based on an access port location or type(s), adjacent collateral complication(s) based on the aggressiveness of the device therapy, etc. Exogenous data enrichment (e.g., data integration) may use data received or ingested from additional sources (e.g., new sources), for example, to increase the valuableness of a dataset. Enriched data may be more informative or meaning than unenriched data for one or more sets of questions. Examples of data enrichment are described in U.S. patent application Ser. No. 17/384,337), titled SURGICAL DATA SYSTEM AND CONTROL, filed Jul. 23, 2021, the disclosure of which is herein incorporated by reference in its entirety.

The impact of data enrichment on a database may be assessed, e.g., before data in the database is enriched. Some data enrichments may not be allowed. Potential impacts, which may be resulted from adding data to the database for data enrichment, on one or more of the utilizations, patterns, conclusions may be assessed, for example, to identify and/or highlight irregularities (e.g., irregular impacting additions). A system (e.g., a data management system such as the surgical data system 45002) may compare one or more of the patterns, conclusions, trends, or relationships associated with the original dataset and one or more of the respective patterns, conclusions, trends, or relationships of the transformed dataset (e.g., after the inclusion of the enrichment data in the original dataset). Pre-run analysis(es) (e.g., analysis before the inclusion of enrichment data) may be used to determine if the enrichment data is valid or extraordinary. If the addition of the enrichment data to the original dataset changes a result of the pre-run analysis(es) (e.g., dramatically shifts the results of previous runs), the system may flag a review by a user or initiate a deeper evaluation of the enrichment data (e.g., the data to be added), for example, to determine whether the enrichment data is correct. The comparison may be used (e.g., if the correctness of the enrichment data is evaluated and confirmed) as a root cause analysis of why the enrichment data is impactful.

A data catalog module may include a data curation function. Data curation may include organizing and/or managing a collection of datasets based on usefulness of the datasets and/or interest of an entity (e.g., a specific group of people). The data curation function may categorize data collection sources, tag a dataset using metadata, and/or perform one or more of preserving data, sharing data, and/or discovering data. The data curation function may collect and continually enrich or curate a (each) dataset and/or metadata associated with the data asset, for example, to make the dataset easier to be identified, evaluated, and/or used properly. In some examples, the metadata engine 45060 may perform data curation as a metadata management activity, for example, to make metadata accessible and informative for non-technical data consumers. Examples of metadata are described in U.S. patent application Ser. No. 17/384,337, titled SURGICAL DATA SYSTEM AND CONTROL, filed Jul. 23, 2021, the disclosure of which is herein incorporated by reference in its entirety.

Figure 14:
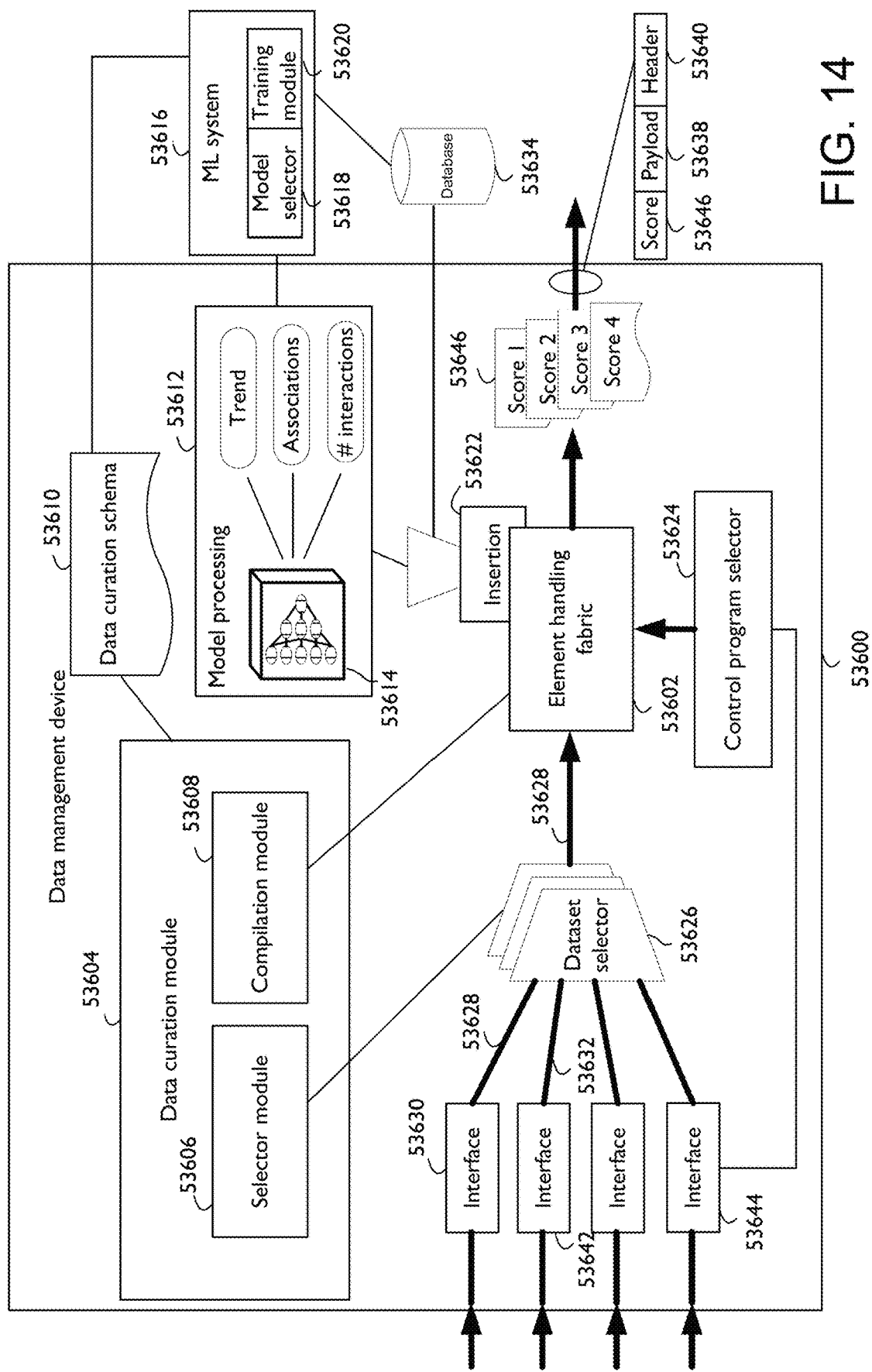
FIG. 14 shows an example data management device.

A data system (e.g., a surgical data system 45002 in FIG. 8) may include a data management device 53600. FIG. 14 shows an example data management device 53600. The data management device 53600 may include a data curation module or communicate with the data curation module. For example, the data curation module may be part of a metadata engine 45060. As shown in FIG. 14, the data management device 53600 may include a data curation module 53604. The data management device may determine a valuableness of data for a certain usage (e.g., a usage for a program). The data management device 53600 may organize data through data curation. Data curation may include, for example, adding an indication such as a tag to cataloged data. The indication may include a parameter relating to the valuableness of a dataset for a program.

As an example, data in a dataset may be curated by adding a parameter that indicates the valuableness of the dataset. The parameter may include a utilization score of the dataset. The utilization score of the dataset may indicate a level of relevancy or valuableness of the dataset for a program. In U.S. Patent Application Publication No. US 2018-0049822 A1 (U.S. patent application Ser. No. 15/237,753), titled CONTROL OF ADVANCEMENT RATE AND APPLICATION FORCE BASED ON MEASURED FORCES, filed Aug. 16, 2016, the disclosure of which is herein incorporated by reference in its entirety, smart tools (e.g., robot(s) or laparoscopic device(s)) may use data collected to limit or minimize one or more of over-compression, collateral damage, or tissue tension, and/or to optimize usage location(s) and behavior(s).

In examples, the utilization score of the dataset may indicate a valuableness of the overall dataset in generating one or more of pattern(s), conclusion(s) or outcome(s), which may be useful in influencing operational parameter(s) of interconnected device(s) and/or system(s). Examples of interconnected device(s) and/or system(s) may be disclosed in in U.S. Patent Application Publication No. US 2019-0059929 A1 (U.S. patent application Ser. No. 15/689,072), titled METHODS, SYSTEMS, AND DEVICES FOR CONTROLLING ELECTROSURGICAL TOOLS, filed Aug. 29, 2017, the disclosure of which is herein incorporated by reference in its entirety, in which robot(s) and advanced energy generator(s) may operate cooperatively to minimize unwanted side effects (e.g., tissue sticking) while improving tissue welding.

The parameter that indicates the valuableness of the dataset may be multidimensional. A multidimensional parameter may indicate the valuableness of the dataset for multiple programs. In examples, the multidimensional parameter may indicate utilization scores (e.g., each of the utilization score indicates a valuableness of the dataset for a respective program). A grid may be used to incorporate the multiple dimensions for the multidimensional parameter. For example, a 2×2 grid may be used for a two-dimensional parameter. The two dimensions may be two different programs, program A and program B. The utilization score for program A may be "0" or "1". The utilization score for program B may be "0" or "1". "01" may indicate low valuableness for program A and high valuableness for program B. For example, "00" may indicate low valuableness for program A and low valuableness for program B. Although two-dimensional parameter of binary values is used in the example herein, a multidimensional parameter may be any combination of numbers and symbols. The multidimensional parameter may be solved by a solver tailored to solve multidimensional parameters. In some examples, a utilization score of a dataset may be multidimensional.

In examples, the parameter that indicates the valuableness of the dataset may be an index. The index may include multiple bits. A bit of the multiple bits may be given a binary value. In some examples, the index may be a combination of numbers or symbols of different numbering system, with each symbol or number indicating a level of a certain dimension.

The data management device 53600 may retrieve data from a database (e.g., a database stored in the remote data storage 53046 in FIG. 9). The data management device 53600 may receive data, for example, from the patient data feeds 53016 in FIG. 9. The data management device 53600 may receive data, for example, through an interface. As shown in FIG. 14, the data management device 53600 may receive a dataset 53628 through an interface 53630 and receive a dataset 53632 through an interface 53642. The interface may be configured to receive data from a certain type of instrument or equipment, or a device that uses a certain type of program (e.g., a machine learning algorithm). The dataset 53628 and/or the dataset 53632 may include medical data, for example, surgical data. In some examples, the dataset 53628 and/or dataset 53632 may be received during a surgical event (e.g., in real time while the surgical event is ongoing). The surgical event may include one or more of pre-surgical, post-surgical, and/or intra-operative event.

A dataset selector 53626 may select a dataset to analyze. The selection of the dataset may be based on one or more of metadata associated with the dataset, the interface through which the dataset is received, a request identifying the dataset, a determination of a need to analyze the dataset, a predetermined order, or a randomized selection. The dataset selector 53626 may select a dataset using a selector module 53606. The selector module 53606 may identify a dataset based on one or more of metadata associated with the dataset, the interface through which the dataset is received, a request identifying the dataset, a determination of a need to analyze the dataset, a predetermined order, or a randomized selection. In some examples, the selector module may include a ruleset of selection. For example, the ruleset may indicate an order of selection for datasets collected from various imaging devices. The order of the selection may be the following: an arthroscope, angioscope, bronchoscope, choledochoscope, colonoscope, cytoscope, duodenoscope, enteroscope, esophagogastro-duodenoscope (gastroscope), endoscope, laryngoscope, nasopharyngo-neproscope, sigmoidoscope, thoracoscope, and ureteroscope. If the metadata of the dataset 53628 indicates that the dataset 53628 is collected from an arthroscope, the dataset 53628 may be selected by the selector module 53606 before a dataset collected from an esophagogastro-duodenoscope (gastroscope) is selected.

In the example shown in FIG. 14, the data selector 53626 may identify and/or select the dataset 53628, for example, instead of the dataset 53632. For example, the dataset 53628 may include image data that needs to be inspected before an incision operation is to be performed on a patient. The selector module 53606 may identify the dataset 53628 based on metadata associated with the dataset 53628. The metadata associated with the dataset 53628 may indicate that the dataset 53628 includes image data taken on the patient for whom the incision operation is to be performed. The metadata associated with the dataset 53628 may indicate that the dataset 53628 is collected by an imaging specialist who is assigned by a surgeon who will perform the incision operation for the patient. In some examples, the selector module 53606 may identify the dataset 53628 based on the interface 53630 (e.g., the interface 53630 may be connected to an imaging device that captures image data at the location of the incision operation). The selector module 53606 may identify the image data and/or determine that the dataset 53628 includes the image data, based on which, the selector module 53606 may select the dataset 53628. In the example shown in FIG. 14, the selector module 53606 may select the metadata associated with the dataset 53628.

The metadata associated with the dataset may be retrieved from a metadata repository. The metadata repository may store various types of metadata. For example, the various types of metadata may include technical metadata (e.g., structural metadata), process metadata (e.g., administrative metadata), or business metadata (e.g., external metadata). Technical metadata may describe how data (e.g., data in a dataset) is organized and/or displayed (to users). Technical metadata may describe the structure of data object(s) (e.g., table(s), column(s), row(s), index/indices, and/or connection(s)). Technical metadata may be used to determine (e.g., by data professionals) how to work with data associated with the metadata. Process metadata may describe the circumstances at which data assets have been created (e.g., when, how, and/or by whom the data assets have been accessed, used, updated, or changed). Process metadata may describe the utilization history of shared data. Process metadata may describe who has permission to access and/or use the data assets. Process metadata may be used to troubleshoot queries. In some examples, process metadata may be mined for information (e.g., information on software users and/or customers, such as what software they're using and the level of service they're experiencing). Business metadata may describe the business aspects of data asset(s) including, for example, one or more of the following: the business value the data asset(s) has to the organization, the fitness of the data asset(s) for a particular purpose or various purposes, information about regulatory compliance(s), etc. For example, by using business metadata, data professionals and line-of-business users may speak the same language about data asset(s).

The data management device 53600 may include an element handing fabric 53602. The element handing fabric 53602 may include a compilation module 53608. As shown in FIG. 14, the data curation module 53604 may include the compilation module 53608 and the selector module 53606. In examples, the data curation module 53604 may be part of metadata engine 45060 shown in FIG. 8.

The compilation module 53608 may be used to determine a level of relevancy and/or valuableness of a dataset to one or more of the following: a different dataset, an algorithm, and/or a program. The selector module 53606 may identify a dataset and the metadata associated with the dataset. The compilation module 53608 may determine the level of relevancy and/or valuableness of the dataset based on the identified dataset, the metadata associated with the dataset, and/or metadata associated with data of the dataset.

The compilation module 53608 may determine a level of relevancy and/or valuableness of the dataset using a data curation schema 53610. The data curation schema 53610 may include rules and/or provisions (e.g., rules or provisions consistent with HIPAA) on determining a level of relevancy and/or valuableness of a dataset to a program based on one or more of: a characteristic of a dataset; fields of the dataset; a characteristic of a control program; types of metadata of the dataset; a standard format of the dataset; a classification of the dataset (e.g., private or public data); a source of the dataset; associated timing of the dataset (e.g., when the dataset is collected); a type of storage location for the dataset; a configuration of a data storage location; a long-term treatment for the dataset; a reliability level associated with a communication path used for the data set; a security level associated with the type of storage location and/or the communication path; a retention period for the dataset; an environment (e.g., HIPAA protected) where the dataset may be used; and/or the like.

For example, the data management device 53600 may determine a utilization score for a dataset collected from a biomarker monitor within the OR and use the utilization score to determine a next course of action. The dataset collected from the biomarker monitor may indicate a sudden plummet outside of the normal acceptable level for the monitored biomarker, and the sudden plummet (or increase) outside of the normal acceptable level may be coincident with a certain surgical event. The data management device 53600 may retrieve metadata of the dataset, and the metadata of the dataset may indicate that the dataset was collected from the biomarker data. The data management device 53600 may retrieve historical operational data for the biomarker data. The data management device 53600 may determine a first utilization score of the dataset if the historical data indicates that the biomarker monitor does not have a history of similar events (e.g., a sudden plummet outside of the normal acceptable level for the monitored biomarker). The data management device 53600 may determine a second utilization score of the dataset if the historical data indicates that the biomarker monitor has a history of similar events (e.g., a sudden plummet outside of the normal acceptable level for the monitored biomarker). The first utilization score of the dataset may be higher than the second utilization score. A lower utilization score may indicate that the correlation between the sudden plummet and the coincidental surgical event may not be causal. A higher utilization score may indicate that the correlation between the sudden plummet outside of the normal acceptable level and the coincidental surgical event may be causal. If the coincidental surgical event may cause the sudden plummet outside of the normal acceptable level, the operation team may evaluate the coincidental surgical event and/or adjust the operations of surgical instruments accordingly.

The element handling fabric 53602 may receive information about one or more control programs from a control program selector 53624. The control program selector 53624 may receive information associated with a control program for which the dataset is to be used for. For example, the control program selector may determine that the control program information is received via interface 53644 from the surgical control system(s) as described in FIG. 9. Based on the determination that the control program information is received from the interface 53644, the control program selector 53624 may determine a type of control program. For example, a type of control program may be selected based on an operational mode of a device. Example of operational modes are described in U.S. Patent Application Publication No. US 2017-0202605 A1 (U.S. patent application Ser. No. 15/382,515), titled MODULAR BATTERY POWERED HANDHELD SURGICAL INSTRUMENT AND METHODS THEREFOR, filed Dec. 16, 2016, the disclosure of which is herein incorporated by reference in its entirety. A device equipped with a combination of energy devices may have the capability of utilizing more than one energy modalities and may use the energy modalities cooperatively or sequentially. Data collected from monitoring a patient (and potentially received from a smart hub system such as the surgical hub in FIG. 3) may provide the device the capacity of determining which operational mode is potentially more or the most useful. Example of energy devices are described in U.S. Patent Application Publication No. US 2019-0104919 A1 (U.S. patent application Ser. No. 16/209,458), titled METHOD FOR SMART ENERGY DEVICE INFRASTRUCTURE, filed Dec. 4, 2018, the disclosure of which is herein incorporated by reference in its entirety. The example energy devices may obtain a situational awareness of the tissue(s) and the surgical job(s) (e.g., by a combined operation with each other or with a device). A device may adapt the device function and/or behavior based on the situational awareness, which may result in improved outcomes.

In some examples, the control program selector 53624 may identity information associated with the control program using metadata associated with control information generated by the control program. As shown in FIG. 7, control programs for different modular devices and equipment 5106-5120 may generate control information associated with respective modular devices and equipment 5106-5120. The metadata of the control information may indicate different modular devices and equipment 5106-5120.

The control program selector 53624 may send an indication of the type of control program to the element handling fabric 53602. The compilation module 53608 may determine a level of relevancy and/or valuableness of the dataset to the control program based on the identified dataset, the metadata associated with the dataset, and/or the type of control program. In an example, the indication may indicate that the control program controls the power for a powered stapler generator that is to be used for a colorectal surgery. The compilation module 53608 may determine that a dataset including varying power data used to control a stapler for a previous colorectal surgery may be relevant or valuable to the control program. Details on utilizing collected dataset(s) to define one or more of the power, force, functional operation or behavior of a smart hand-held staple can be found in U.S. Pat. No. 10,881,399 B2 (U.S. patent application Ser. No. 15/628,175), titled TECHNIQUES FOR ADAPTIVE CONTROL OF MOTOR VELOCITY OF A SURGICAL STAPLING AND CUTTING INSTRUMENT, filed Jun. 20, 2017, the disclosure of which is herein incorporated by reference in its entirety. The collected dataset(s) may be used for comparisons to identify a configuration for the specific patient's needs (e.g., the most appropriate configuration(s) for the specific patient's needs), as disclosed in U.S. Patent Application Publication No. US 2020-0405296 A1 (U.S. patent application Ser. No. 16/458,103), titled PACKAGING FOR A REPLACEABLE COMPONENT OF A SURGICAL STAPLING SYSTEM, filed Jun. 30, 2019, the disclosure of which is herein incorporated by reference in its entirety.

In some examples, the compilation module 53608 may determine a level of relevancy and/or valuableness of the dataset to the control program based on metadata associated with control information generated by the control program. For example, the metadata associated with control information generated by the control program may indicate an identification of surgical device and/or indicate a type of surgery for which the surgical device is to be used. In an example, the metadata associated with the control information generated by the control program may indicate that the control information is for controlling a power for a powered stapler generator that is to be used in a colorectal surgery.

In some examples, the data curation schema 53610 may be developed using a machine learning system, for example, the machine learning system 53616. The machine learning system 53616 may be a local machine learning system 53032 in FIG. 9 and/or the remote machine learning system 53042 in FIG. 9 or include both. Examples of applying machine learning to a data collection to improve a surgical outcome are described in U.S. Patent Application Publication No. US 2022-0238216 A1 (U.S. patent application Ser. No. 17/156,293), titled MACHINE LEARNING TO IMPROVE ARTIFICIAL INTELLIGENCE ALGORITHM ITERATIONS, filed Jan. 22, 2021, the disclosure of which is herein incorporated by reference in its entirety.

The data management device 53600 may communicate with a machine learning system 53616, for example, via the interface module 45030 in FIG. 8. The data management device 53600 may use a model object 53614, which may be selected using the machine learning system 53616. In some examples, the data management device 53600 may include the machine learning system 53616. The data management device 53600 may include a model processing unit 53612. The model processing unit 53612 may include a model object 53614 (e.g., a trained model 53030 as described herein). The model object 53614 may generate one or more of a trend, an association, a number of interactions, a summary, or a conclusion as output data, for example, by using the dataset 53628 as input data. The output data may be inserted to the element handling fabric 53602.

The machine learning system 53616 may include a model selector 53618 and a training module 53620. The training module 53620 may train a machine learning model (e.g., the model object 53614) using data from a database 53634. For example, the training module 53620 may train a machine learning model using various data sets including one or more of patient EMR data, pre-surgical biomarker measurement data, surgical biomarker measurement data, surgical sensor measurement data, post-surgical biomarker measurement data, and/or biomarker sensor thresholds data. The machine learning model may predict surgical complications and/or post-surgical recovery milestones related to a patient's surgical procedure. In examples, the predicted surgical complications and/or post-surgical recovery milestones related to a patient's surgical procedure, and a difference from the actual patient's surgical procedure, for example, as provided by a healthcare provider may be used to improve the machine learning model. In some examples, the model object may be trained based on unsupervised learning (e.g., an algorithm may learn from training data that may not have been labeled). Details on using health data associated with a patient to analyze and/or improve surgical device algorithmic behavior(s) can be found in U.S. Patent Application Publication No. US 2019-0200981 A1 (U.S. patent application Ser. No. 16/209,423), titled METHOD OF COMPRESSING TISSUE WITHIN A STAPLING DEVICE AND SIMULTANEOUSLY DISPLAYING THE LOCATION OF THE TISSUE WITHIN THE JAWS, filed Dec. 4, 2018, the disclosure of which is herein incorporated by reference in its entirety. For example, the control program of staplers may be generated (e.g., adapted, improved) based on the health data for one or more of better adaptation of the compression, speed of operation, and/or location of use. Health data may provide feedback for a specific use of a surgical instrument on a specific patient's tissue for a specific treatment disclosed. Example of data that may be used to train the machine learning model are described in U.S. patent application Ser. No. 17/449,765, titled COOPERATIVE ACCESS HYBRID PROCEDURES, filed Oct. 1, 2021, the disclosure of which is herein incorporated by reference in its entirety, in U.S. patent application Ser. No. 17/493,904, titled SURGICAL METHODS USING MULTI-SOURCE IMAGING, filed Oct. 1, 2021, the disclosure of which is herein incorporated by reference in its entirety, in U.S. patent application Ser. No. 17/493,913, titled SURGICAL METHODS USING FIDUCIAL IDENTIFICATION AND TRACKING, filed Oct. 5, 2021, the disclosure of which is herein incorporated by reference in its entirety, and in U.S. Patent Application Publication No. US 2020-0015907 A1 (U.S. patent application Ser. No. 16/128,195), titled INTEGRATION OF IMAGING DATA, filed Sep. 11, 2018, the disclosure of which is herein incorporated by reference in its entirety.

The model selector 53618 may select the model object 53614, for example, based on the dataset 53628. For example, the model selector 53618 may determine that the dataset used to train the model object 53614 and the dataset 53628 share a common characteristic. The common characteristic may be that the dataset 53628 and the dataset used to train the model object 53614 are from test(s) or monitoring equipment for a same patient or patients with same or similar medical profiles. The common characteristic may be that the dataset 53628 and the dataset used to train the model object 53614 are for a same or similar type of surgical procedure. The common characteristic may be that the dataset 53628 and the dataset used to train the model object 53614 are collected from the same type of surgical instrument or the same surgical instrument. The common characteristic may be that the dataset 53628 and the dataset used to train the model object 53614 are collected from a same type of surgical equipment or same equipment. In some examples, the model selector 53618 may determine that the model object 53614 is trained on data associated with a control program that shares a common characteristic with the control program selected by the control program selector 53624.

Figure 15:
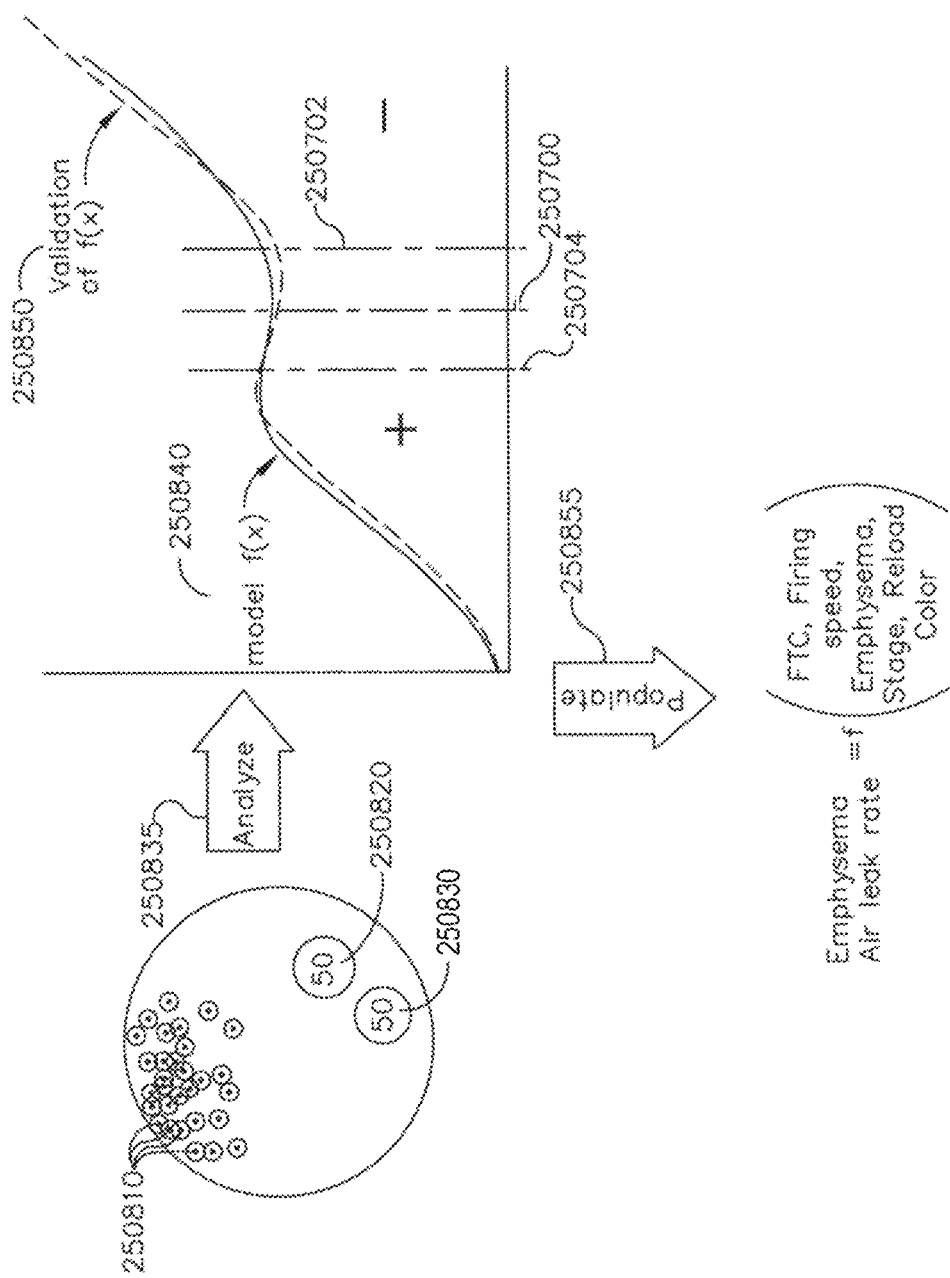
FIG. 15 is a diagram depicting a model development.

FIG. 15 is a diagram depicting a model development. As shown in FIG. 15, a dataset may be split into a training data set 250810 and test data set(s) 250820, 250830. The training data set 250810 may have labels, so the training module 53620 may learn from these labeled examples. Such labels may include, for example, various determined emphysema air leak rates and their corresponding stage of emphysema, the firing speed of the surgical stapler, the force required to close the jaws of an end effector, and the type and/or color of the cartridge within the end effector. The test set(s) 250820, 250830 may include data that does not have labels. A predicted value is not known. In other words, the machine learning system 53616 may generalize to situations it hasn't encountered before so that it can provide the most accurate prediction for the test data 250820, 250830. Examples of training data are described in U.S. Patent Application Publication No. US 2019-0201115 A1 (U.S. patent application Ser. No. 15/940,668), titled AGGREGATION AND REPORTING OF SURGICAL HUB DATA, filed Mar. 29, 2018, the disclosure of which is herein incorporated by reference in its entirety. As described in FIG. 28A of U.S. patent application Ser. No. 15/940,668, portion of the patient data may be removed, leaving anonymized, stripped patient data related to the patient's condition and/or the surgical procedure to be performed in the data set. A subset of patient data is removed to maintain patient anonymity for the processing of the data (including if the data is uploaded to the cloud for processing and/or data tracking for reports). The stripped patient data can include any medical conditions that the patient is suffering from, the patient's medical history (including previous treatments or procedures), medication that the patient is taking, and other such medically relevant details.

The machine learning system 53616 may create a model 250840 (e.g., the model object 53614 or 53728) based on the training data set 250810. The training data set may have a large sample size (e.g., n=1000) to define a function. A threshold 250700 may be a point at which an outcome of a surgical procedure is acceptable within a range indicated by 250704 and 250702. A test set 250820, 250830, or a validation set, may allow the machine learning system 53616 to check if the test sets 250820, 250830 fit the determined model. The test sets 250820, 250830 may include a smaller sample size (e.g., n=50). Analysis 250835 of the test sets 250820, 250830 may result in a validation model 250850 for comparison to the generated model 250840. In various instances, the machine learning system 53616 may keep anticipated data and remove any unanticipated data. The ability to adjust the model 250840 may allow for the fine tuning of the grouping process to populate 250855 a final model for use in data analysis. The developed model may be applied in analysis of collected data to estimate, for example, emphysema air leak rate.

The output data of the model object 53614 may be inserted into the element handling fabric 53602 using an insertion operation 53622. The compilation module 53608 may determine a level of relevancy and/or valuableness of the dataset 53628 to the control program based on the output data of the model object 53614. In examples, patterns and/or relationships within a dataset may be identified using a machine learning model or algorithm (e.g., the model object 53614). The identified patterns and/or relationships (e.g., as output data of the model object 53614) may be used to determine the level of relevancy and/or valuableness of the dataset, for example, to rank datasets based on their respective valuableness to the end-users (e.g., to HCPs that treat a patient or explore instrument operation(s)). The output data of the model object 53614 may indicate the number of interactions between the data contained in the dataset. The level of relevancy and/or valuableness of the dataset may be determined based on the number of interactions between the data contained in the dataset, for example, to enable the system to better view extraneous interrelationship(s) and/or pattern(s). For example, data that has fewer interactions with other data in the dataset may be extraneous, less relevant, or less valuable than data that has many interactions with other data in the dataset.

The element handling fabric 53602 may generate a utilization score 53646 for the dataset 53628, for example, based on one or more of the identified dataset, the metadata associated with the dataset, the type of control program, or the output data of the model object. The element handling fabric 53602 may associate the utilization score 53646 with the dataset 53628. For example, the element handling fabric 53602 may send the dataset 53628 along with the utilization score 53646 to a database for storage or send data in the dataset 53628 along with the utilization score 53646 to a database for storage. In some examples, the dataset 53628 may be tagged with the utilization score 53646 in the metadata of the dataset 53628, or the data in the dataset 53628 may be tagged with the utilization score 53646 in the metadata of the data.

The element handling fabric 53602 may send the dataset (or data in the dataset) along with the utilization score to an entity, for example, based on a request from the entity. As shown in FIG. 14, the element handling fabric 53602 may send a data stream including one or more elements. The data stream may include a header 53640, a payload 53638 (e.g., including the dataset 53628), and one or more indications of the utilization score 53646, a standard format ID, a classification parameter, a source, a payload type, a timing element, or the like. In some examples, the element handling fabric 53602 may generate an instruction to change how the dataset of a certain utilization score is collected (e.g., with a lower collection frequency) or generate an instruction to stop collecting a dataset of a certain utilization score, for example, if the utilization score is below a certain value, indicating that the dataset is not valuable to a control program.

The element handling fabric 53602 may determine a level of relevancy and/or valuableness of a dataset based on a combination of the dataset with one or more different datasets. For example, the element handling fabric 53602 may receive additional data from database 53634. The additional data may include data related to one or more of curation, outcome, local environment, or instrumentation of a patient. Data related to curation may include device functional parameters. Device functional parameters may include tissue responses to one or more of applied power levels, frequencies, forces, pressures, etc., and/or include detection identification or monitoring of additional tissue properties. Detection identification or monitoring of additional tissue properties may include advanced visualization (e.g., fluorescence, multi-spectral imaging, doppler or spectrographic analysis of the surgical site to gain additional perspectives of the organs, tissues, or circumstances), three-dimensional data (3Di) (e.g., integration into the collected data 3D generated models based on structured light projections as part of the visualization means), or the handling of more than one instrument sensing the same parameter (e.g., Zed & RF cautery devices both sensing tissue impendence in differing locations or at differing timings). Outcomes may include fluid migration (e.g., magnitude (color), surface area, or speed (laser doppler) and/or 3Di (e.g., volume)). Local environment may include temperature data, for example, internal ambient reflective to natural frequency of blades (e.g., indicating accuracy), ambient to internal arteries (hypothermia) (e.g., indicating patient reaction(s)), and/or blade temperature (e.g., infrared thermal). Instrumentation of a patient may include dual mono RF monitor, EKG, pulse Ox, and additional collected data.

The level of relevancy and/or valuableness of data or dataset may be determined based on or result from, for example, the extent of the data beyond individual control loop device operations. For example, the data management device 53600 may determine a utilization score of a dataset using data in addition to data collected from a controller of a medical device when the medical device is in a control loop operation. In some examples, the dataset 53628 may include medical data that is collected from a controller of a medical device when the medical device is in a control loop operation. The level of relevancy and/or valuableness of data or dataset may be determined based on data in addition to the medical data that is collected from the controller of the medical device when the medical device is in the control loop operation.

A dataset may include one or more fields, with a field contributing to the valuableness of the dataset more than another field (e.g., one field contributing to the valuableness of the dataset more than other fields). For example, the machine learning model may determine a respective utilization score for data associated with a field of the dataset. A first utilization score of a first data or subset of data associated with a first field of the dataset may be greater than a second utilization score of a second data or subset of data associated with a second field of the dataset, indicating that the first data or subset of data associated with the first field of the dataset contributes more to the valuableness of the dataset than the second data or subset of data associated with the second field of the dataset.

In some examples, the valuableness of the dataset may indicate (e.g., implicitly) that a first data or subset of data associated with a first field of the dataset contributes more to the valuableness of the dataset than a second data or subset of data associated with a second field of the dataset. For example, the valuableness of the dataset may be for a control program of a monopolar RF energy generator component and/or determined using an indication of the control program of the monopolar RF energy generator component. If the dataset includes a field of monopolar RF data and a field of bipolar RF data, it may be determined that the field of monopolar RF data contributes more to the valuableness of the dataset than the field of bipolar RF data.

The dataset may be compartmentalized based on the valuableness of the dataset and/or based on a determination of which field of the dataset contributes more to the valuableness of the dataset than other fields of the dataset. For example, a data management system may determine a first field in the dataset contributes to the valuableness of the dataset (e.g., to the utilization score of the dataset) to a greater extent than a second field in the dataset. The data management system may compartmentalize the dataset into a first subset of medical data associated with the first field and a second subset of medical data associated with the second field or the rest of the fields of the dataset. In some examples, the data management system may determine which field of the dataset contributes more to the valuableness of the dataset than other fields of the dataset using a machine learning model, for example, based on clustering information generated using an unsupervised machine learning model.

Compartmentalized data may be communicated to an entity. For example, compartmentalized aspects of the surgical treatment, as collected by smart devices, may be communicated to an entity involved in the surgical treatment (e.g., a user). The compartmentalization or reduction approaches may be presented to the entity. In some examples, the entity may have a standing rule within their device to only show aspects of surgical treatment(s) above a certain magnitude of privacy intrusion, for example, to inquire about consent and allow or consent to any of the sub-levels of collection. For example, the entity may be a patient who has a rule in the patient's device to require consent to certain compartmentalized aspects of the surgical treatment if the compartmentalized aspects are associated with a privacy level above a certain threshold.

A data management system may determine whether to keep (e.g., for a short-term storage or a long-term storage) data or a subset of data associated with a field of the dataset that contributes less than data or a subset of data associated with other field(s) of the dataset. The data management system may determine whether to stop collecting data associated with a field of the dataset that contributes less than data associated with other field(s) of the dataset. For example, a data management system may determine that a field of bipolar RF data in a dataset contributes less than other fields (e.g., a field of monopolar RF data) in the dataset, to a control program of a monopolar RF energy generator component. The data management system may determine whether to keep the field of bipolar RF data. The data management system may determine whether to stop collecting bipolar RF data. In some examples, if the dataset is limited to be used for the control program of the monopolar RF energy generator component, the data management system may determine to delete the field of bipolar RF data from the dataset and/or stop collecting bipolar RF data.

The utilization score may be used to predict the valuableness of a dataset. Deterministic usefulness of the data may include usage and/or benefit projections. The usage and/or benefit projections may be used to determine (e.g., by a user) if the benefits of sharing data of the dataset (e.g., benefits to HCPs) outweigh the risk(s) associated with sharing the data of the dataset (e.g., risk of violating the user's privacy). Usefulness (e.g., a valuableness or a deterministic usefulness) of data may be used as a category for data curation.

The data management system may evaluate whether to use identifiable combination(s) of biomarker data that identifies a specific patient based on the relevancy or valuableness of the identifiable combination(s) of biomarker data. HCPs may provide improved treatment to the patient or create better operating parameters for smart medical devices that are in use with treating the patient, for example, by using identifiable combination(s) of biomarker data that is relevant or valuable for a specific treatment of the patient and/or refraining from using identifiable combination(s) of biomarker data that is not relevant or not valuable for the specific treatment of the patient.

In an example, patient A's biomarker data is added to a collective database including, for example, patient B's data or more. Patient A's biomarker data includes one or more of the following data: blood pressure, blood sugar level, heart rate, heart rate variability, weight, height, girth, lung volume, respiration rate, skin capacitance, fluid intake and output, urine sugar level, urine protein levels, for patient A. Patient B's biomarker data includes one or more of the following data: blood pressure, blood sugar level, heart rate, heart rate variability, weight, height, girth, lung volume, respiration rate, skin capacitance, fluid intake and output, urine sugar level, urine protein levels, for patient B.

A data management system may categorize data in the collective database, for example, by determining a respective utilization score associated with a kind of biomarker data, or by determining a respective utilization score for patient A's biomarker data and patient B's biomarker data. The categorization may be based on identifications of pattern(s) and trend(s) within the collective database, which may be generated using a machine learning algorithm. In some examples, the data management system may categorize data in the collective database as relevant data categories and irrelevant data categories.

The data management system may determine whether the irrelevant data categories may provide context or metadata to one or more of the relevant data categories, for example, whether an irrelevant data category may enrich a relevant data category. In examples, the data management system may determine whether an interaction or coupling occurs between an irrelevant data category and a relevant data category, for example, using a machine learning algorithm. For example, if patient A presents heart issues and blood chemistries that an analysis of associated medical data (e.g., using a machine learning model) suggests colon or liver cancer, the biomarkers of fluid intake and output, blood sugar level, urine sugar level, girth, may be irrelevant, and/or blood pressure, heart rate, heart rate variability, weight, height, lung volume, respiration rate, skin capacitance, urine protein levels may be relevant. Urine protein levels may be "related" if they are used to eliminate a similar cause of symptoms like ketosis.

The data management system may determine that an irrelevant data category does not add context or metadata for a relevant data category. The data management system may discontinue a storage of the irrelevant data category (e.g., in a short-term or long-term storage). The data management system may stop collecting data of the irrelevant data category or adjust a collection scheme for data of the irrelevant data category (e.g., collecting data of the irrelevant data category less frequently). In some examples, the data management system may inform downstream systems to stop collecting data of the irrelevant data category or collect data of the irrelevant data category less often.

The data curation function may tag a dataset with a utilization score of the dataset using metadata tagging. In examples, metadata tagging may be based on the valuableness of a dataset to a program or an algorithm or based on a valuableness of the combination of the dataset with other dataset(s). One or more indications (e.g., tags) may be added to cataloged data, for example, to indicate or denote the valuableness of the cataloged data to utilization. A metadata tag of the valuableness of data may be used as a prioritizing factor of the data. Data may be prioritized or organized based on the valuableness of the data or dataset.

Figure 16:
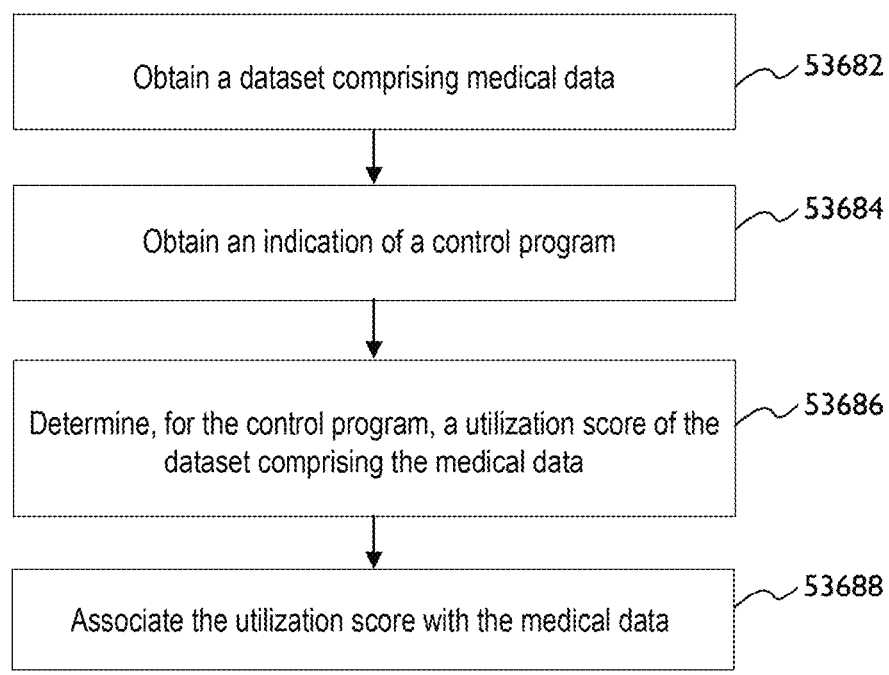
FIG. 16 shows an example for a determination of a utilization score.

FIG. 16 shows an example for a determination of a utilization score. At 53682, a medical data processing system (e.g., the surgical data system 45002 including the data management device 53600) may obtain a dataset (e.g., the dataset 53628). The dataset may include medical data (e.g., surgical data). At 53684, the medical data processing system may obtain an indication of a control program (e.g., based on the control program selector 53624). At 53686, the medical data processing system may determine, for the control program, a utilization score (e.g., the utilization score 53646) of the dataset. At 53688, the medical data processing system may associate the utilization score with the medical data.

A medical data processing system may determine a utilization score (e.g., the utilization score 53646) of a dataset (e.g., the dataset 53628) based on metadata associated with the dataset. For example, the medical data processing system may determine metadata associated with a dataset (e.g., using the metadata engine 45060), retrieve the metadata associated with the dataset from a metadata repository (e.g., the metadata repository 45062), and determine a utilization score of the dataset based on the metadata associated with the dataset. The metadata repository may include one or more of structural metadata, administrative metadata, or external metadata. The utilization score may indicate a level of valuableness of the dataset to a control program.

A medical data processing system may determine, for a control program, a utilization score (e.g., the utilization score 53646) of a dataset based on a type of the control program. For example, the medical data processing system may determine a type of the control program based on an indication of the control program (e.g., the indication received from the control program selector 53624). The type of the control program may include a program type configured to control an operational parameter of a medical device (e.g., a surgical instrument 45016).

A medical data processing system may determine a utilization score (e.g., the utilization score 53646) of a dataset based on an output of a machine learning model. For example, the medical data processing system may input data in the dataset to the machine learning model (e.g., the model object 53614). The medical data processing system may predict a valuableness of the dataset based on an output of the machine learning model. The output of the machine learning model may include one or more of an association, a number of interactions, a pattern, a trend associated with the data in the dataset.

A medical data processing system may compartmentalize a dataset into subsets of data. For example, the medical data processing system may determine that a first field in the dataset contributes to a utilization score of the dataset to a greater extent than a second field in the dataset. The medical data processing system may compartmentalize the dataset into a first subset of data associated with the first field and a second subset of data associated with the second field. The medical data processing system may continue collecting data associated with the first field and add the collected data associated with the first field to the first subset of data associated with the first field. The medical data processing system may discontinue a collection of additional data associated with the second field.

A medical data processing system may rank datasets in a database based on a respective utilization score associated with a dataset. For example, a medical data processing system may obtain a first dataset and a second dataset from the database and determine a first utilization score for the first dataset and a second utilization score for the second dataset, for example, as described in one or more examples herein. The medical data processing system may rank the first dataset and the second dataset based on the first utilization score and the second utilization score. The medical data processing system may determine that the first dataset is ranked higher than the second dataset and discontinue a collection of additional medical data associated with the second dataset based on the determination that the first dataset is ranked higher than the second dataset.

A medical data processing system may determine a utilization score (e.g., the utilization score 53646) of a dataset based on medical data in addition to medical data collected when medical device(s) is in control loop operation(s). For example, the dataset may include medical data collected from a controller of a medical device when the medical device is in a control loop operation. The medical data processing system may determine the utilization score of the dataset based on data in addition to the medical data collected when the medical device is in the control loop operation.

A data system (e.g., a surgical data system 415002) may adjust (data that contributes to a program, for example, based on a change in a patient consent, patient consent to health (data associated with the patent may specify the purpose for which the health data is to be used, the extent to which the health data is to be used (e.g., where the health data is to be used, whether the health data is to be combined with public data, etc.), the duration. For which the which data is to be stored, the manner in which the health data is to be stored and/or protected, whether and or how the health data is to be use d to identify a certain individual from a group of individuals. A data handling scheme for the health data may vary based on the patient consent to the health data. Example data handling schemes are disclosed in U.S. patent application Ser. No. 17/384,348, titled SURGICAL DATA SYSTEM AND CLASSIFICATION, filed Jul. 23, 2021, the disclosure of which is herein incorporated by reference in its entirety. The health data may be subject to laws and regulations governing protected health data (e.g., HIPAA including Privacy Rule; Transactions and Code Sets Rule; Security Rule; Unique Identifiers Rule; Enforcement Rule). The health data may be handled as specified by the patient consent, which may change, for example, when a patient requests a change in the patient consent.

A patient may have granted a consent for the use of die data by de program (e.g., at least in some scenarios). The patient may have changed the granted consent in some way (e.g., change at least a portion of the granted consent). In examples, the patient may alter what the patient has granted consent for. The patient may request a summary of one or more of the following: where the data has been used; where the data is currently being or will be held; how the data has been used; how the data is currently being or will be used; or the like. The patient may alter what the patient has granted consent for, for example, by limiting the usage of the data. The level of alteration may vary. A data system (e.g., as shown in the example surgical data management system 53000 in FIG. 9) may, based on a change in a consent associated with the patient (e.g., based on the level of alteration of what the patient has granted consent for), expand/curtail the usage of the data, increase/decrease the requirements for the access of the data, and/or increase/decrease the requirements for the storage of the data. In some examples, the data may be removed (e.g., completely) from storage or usage (e.g., in the data system). The data system may facilitate patient granting and revoking of consent for data logging and/or data usage. In one or more examples herein, a combination of one or more private data, public data, population data, individual identifying data may be collected for a short-term storage, a long-term local storage, or a long-term remote storage and utilization. Consent rules may control and/or limit the access, storage, or usage of data (e.g., usage of data to enhance process(es) or procedures(s)). In some examples, consent rules may negate or prevent clinical improvements.

A patient may request a change in a consent (e.g., the granted consent), for example, via the user portal 53048. For example, a consent option may be presented to the patient for the patient to enter the request of the change. Examples of secure consent recording and communications to HCPs are described in U.S. patent application Ser. No. 17/156,298, filed CONTEXTUAL TRANSFORMATION OF DATA INTO AGGREGATED DISPLAY FEEDS, filed Jan. 22, 2021, the disclosure of which is herein incorporated by reference in its entirety.

The data associated with the change is a patient's consent may have been used (e.g., with other data such as private data or public data) for data analysis or to compile a program. The program may be used to generate one or more of results, patterns, or adjustments, which may be used to adapt a device control program, a procedure step, or a surgical usage/technique. For example, in U.S. Patent Application Publication No. US 2019-0206562 A1 (U.S. patent application Ser. No. 16/209,416), filed METHOD OF HUB COMMUNICATION, PROCESSING, DISPLAY, AND COULD ANALYTICS, filed Dec. 4, 2018, the disclosure of which is herein incorporated by reference in its entirety, patient data may be used with smart interconnected systems (such as multiple surgical hubs, robotic hubs, robot staplers, etc.) to define the relationship(s) of the interconnected systems, cooperative behavior(s) of the interconnected systems, or monitoring and storage of procedure details, or the patient data may be aggregated to develop better algorithms, trends, or procedure adaption based on the comparison of the outcomes with the choices made in the procedures disclosed same application. Examples of data analytics are described in U.S. Patent No. U.S. Ser. No. 10/966,791 B2 (U.S. patent application Ser. No. 15/940,694), filed CLOUD-BASED MEDICAL ANALYTICS FOR MEDICAL FACILITY SEGMENTED INDIVIDUALIZATION OF INSTRUMENT FUNCTION, filed Mar. 29, 2018, the disclosure of which is herein incorporated by reference in its entirety.

The program may include a machine learning model. In examples, the data system may receive a request (e.g., from a patient) to remove data that has contributed to be machine learning model (e.g., data used to train the machine learning model). In some examples, the data system may receive a request to include data in a dataset used to train the machine learning model. The data to be added or removed may be private data.

The data system may identify private data (e.g., patient identifying protected data) and/or public data (e.g., non-identifying data). Data, if identified as private data, may be subject to laws and/or regulations described herein such as HIPAA and a change of patient consent such as a removal requested by a patient. Public data may or may not be removed in response to a patient's request.

The data system may determine a privacy level of data (e.g., data received by the data system). The data system may include a data classification module (e.g., the data classification module 45004 in FIG. 8). The data classification module may classify data into public data, confidential data, or restricted data (e.g., highly sensitive data). In examples, private data my include confidential data and/or restricted data.

Data may be classified using a classification parameter. For example, in U.S. patent application Ser. No. 17/384,348, titled SURGICAL DATA SYSTEM AND CLASSIFICATION, filed Jul. 23, 2021, the disclosure of which is herein incorporated by reference in its entirety, the classification parameter may indicate one of more of a privacy of the data, a priority of the data, a content type of the data, a context of the data, a retention period associated with the data, or the like.

The classification parameter may indicate different levels of priorities for different data. A data system may share and/or use data based on prioritization rule(s). The data system may handle data of different priority levels based on the prioritization rule(s). A priority level of data may be determined based on one or more of a source of data, a time when the data is created, a creator of the data, or how the data is created. In examples, the data system may receive multiple related sources of data created at different times, with different methods, and/or with different tests (e.g., fasting glucose, glucose tolerance test, HbA1c for diabetes). The multiple related sources of data may be associated with different priority levels and/or used according to the prioritization rule(s). In some examples, the prioritization rule(s) may be weighted by a timestamp. Examples of different related sources of data are described in U.S. patent Ser. No. 11/304,699 B2 (U.S. patent application Ser. No. 16/209,465, e.g., FIG. 35), titled METHOD FOR ADAPTIVE CONTROL SCHEMES FOR SURGICAL NETWORK CONTROL AND INTERACTION, filed Dec. 4, 2018, the disclosure of which is herein incorporated by reference in its entirety.

A data system may determine a level of privacy for the data. The level of privacy for the data may be determined based on the data. A data handling scheme in consistency with an acceptable level of privacy protection (e.g., more likely than not to keep the privacy of the patient or the risk to identify a patient is smaller than a certain threshold) may be determined for the data. The data handling scheme may include one or more of a type of storage location for the data or a reliability level associated with a communication path used for the data, which is consistent with the acceptable level of privacy protection. For example, the data obtained from a task-specific device may require a different data storage location from that for the data received from a publication in a medical journal. Example data handling schemes are disclosed m U.S. patent application Ser. No. 17/384,348, titled SURGICAL DATA SYSTEM AND CLASSIFICATION, filed Jul. 23, 2021, the disclosure of which is herein incorporated by reference in its entirety.

The classification module may classify data as public data if the risk resulting from an unauthorized disclosure, alteration, or destruction of the data is low (e.g., lower than a value). Public data may include de-identified health data that does not identify or provide a reasonable basis to identify an individual. In examples, public data may include data associated with public health reporting (e.g., report(s) of statistical data when influenza is detected in a certain geographic area, as required by federal or state laws; public health reports (PHR); data in peer reviewed journal articles).

The classification module may classify data as confidential data if the risk resulting from an unauthorized disclosure, alteration, or destruction of the data is moderate (e.g., higher than a certain value). Confidential data may include one or more of the following: Uniform Hospital Discharge Data Set (UHDDS); Uniform Ambulatory Care Data Set Source (UACDS); Minimum Data Set for long term care (MDS); Data elements for emergency department systems (DEEDS); Outcomes and Assessment Information Set (OASIS); Health Plan Employer Data and Information Set (HEDIS).

The data classification module 45004 may classify data as restricted data if the risk resulting from an unauthorized disclosure, alteration, or destruction of the data is significant (e.g., higher than a value). Restricted data may contain highly sensitive information. For example, restricted data may include HIPAA protected data (e.g., protected health data (PHI)). HIPAA protected data may include one or more of the following: names (e.g., one or more of a full name, a last name, and/or an initial); geographical identifiers (all geographical identifiers smaller than a state, except for the initial three digits of a zip code if, according to the publicly available data from the U.S. Bureau of the Census, the geographic unit formed by combining all zip codes with the same three initial digits contains more than 20,000 people, and the initial three digits of a zip code for all such geographic units containing 20,000 or fewer people is changed to 000); dates related to an individual (e.g., dates directly related to an individual other than year); phone numbers; fax numbers; email addresses; social security numbers; medical record numbers; health insurance beneficiary numbers; account numbers; certificate/license numbers; vehicle identifiers (e.g., serial numbers and/or license plate numbers); device identifiers and/or serial numbers; web uniform resource locators (URLs); Internet Protocol (IP) address numbers; biometric identifiers (e.g., one or more of finger, retinal, and/or voice prints); full face photographic images and/or comparable images; any other unique identifying number, characteristic, or code (e.g., except the unique code assigned by the investigator to code the data).

A data system may identify, determine, classify, or categorize data as private data (e.g., private user data) or public data (e.g., public population data), for example, using a deterministic algorithm such as a machine learning algorithm. In some examples, the data system may automatically classify data as private or public, for example, based on a pattern of the data. The pattern of the data may be generated using a machine learning algorithm.

A data system may determine a probability that a dataset includes private data using a machine learning system. For example, the data system may determine (e.g., by highlighting) information that identifies a specific user out of a list of users (e.g., the overall stored data). Data may be tagged (e.g., using metadata tagging) as private data or public data based on the determination. The data system may classify data that has not been classified, for example, based on the determination, and/or tag the data accordingly. In some examples, the data system may validate an original classification of public data or private data, for example, based on the determination.

A machine learning model may be used to identify private data (e.g., by determining the likelihood of a dataset containing private data). The machine learning model may identify the source of data in the dataset, for example, using the background of surgical procedures and the data. In examples, the machine learning model may identify pattern(s) associated with a dataset. A list of patients, for example, based on the pattern(s), may be narrowed down to a number of patients (e.g., a number smaller than a threshold value). Data associated with a patient on the narrow-down list may risk identifying the patient. The data associated with the patient may be classified as private data.

For example, a data system may group one or more of comorbidity data, complication data, or restrictive biomarker data based on interaction and/or coupling among the data (e.g., using a machine learning model). The data system may compare the grouped data to procedure specialties. Some group data may be linked to a procedure specialty. The data system may narrow down a list of patients in a specific geographic area, for example, based on the grouped data and the linked procedure specialty and based on additional data such as regional or ethnicity biomarkers. The narrowed down list may indicate the identities of the patients on the list. If the list was narrowed below a predefined threshold (e.g., 10 out of 10,000), the data system may tag the datasets associated with the patients on the list as private data. As described in one or more examples herein, private data may require special handling, storage, or redacting, for example, to maintain the privacy of the patient.

The data system may use a combination of private data and public data (e.g., in one dataset) and enable a removal of a portion of the private data from the public-private combination or a removal of a portion of public data from the public-private data combination, for example, by compartmentalizing data.

The data system may compartmentalize data (e.g., into compartmentalized portions of data). Compartmentalized data may be displayed, moved, removed, or replaced, for example, based on a system task. In examples, removing compartmentalized data from a dataset (e.g., based on a withdrawn consent to use the compartmentalized data) may not impact an operation of a system or algorithm that uses the dataset.

Combined data or paired data may be separated, for example, for display or disclosure. In examples, private data and public data may be coupled or paired. Parsing or severing paired data may enable removing private data without removing public data. In some examples, parsing or severing paired data may enable disclosing public data without disclosing private data (or disclosing private data without disclosing public data). A user of the data system (e.g., a patient) may review private data associated with the user without seeing other data (e.g., public data associated with the private data). Examples of data pairs are described in U.S. patent Ser. No. 11/304,699 B2 (U.S. patent application Ser. No. 16/209,465, e.g., FIG. 35), titled METHOD FOR ADAPTIVE CONTROL SCHEMES FOR SURGICAL NETWORK CONTROL AND INTERACTION, filed Dec. 4, 2018, the disclosure of which is herein incorporated by reference in its entirety.

In examples, during a surgical procedure, data indicating how the surgical procedure is carried out (e.g., by a surgeon) and data indicating how a patient responds to the surgical procedure (e.g., a step of the surgical procedure) may be collected. The data indicating how the patient responds to the surgical procedure may be associated with (e.g., paired or combined) with the data indicating how the surgical procedure is carried out. For example, a dataset (e.g., recorded data) may be a mixture of the data indicating how the patient responds to the surgical procedure and the data indicating how the surgical procedure is carried out.

The dataset may be compartmentalized to a first portion of the dataset including the data indicating how the patient responds to the surgical procedure and a second portion of the dataset including the data indicating how the surgical procedure is carried out. If the patient revokes a consent to a usage of the first portion of dataset (e.g., the usage by the data system), the first portion of the dataset may be removed without removing the second portion of the dataset.

In some examples, if the patient requests a display of the data indicating how the patient responds to the surgical procedure, the first portion of the dataset may be displayed or disclosed without disclosing the second portion of the dataset, for example, to maintain a privacy of the surgeon who carries out the surgical procedure. If a surgeon requests a display of the data indicating how the surgical procedure is carried out, the second portion of the dataset may be displayed or disclosed without disclosing the first portion of the dataset, for example, to maintain a privacy of the patient who underwent the surgical procedure.

Compartmentalized data may be associated with an assigned entity (or an owner). For example, the owner of data on a surgical technique or treatment may be the primary surgeon who performs the surgical technique or treatment. The owner of internal functional data of an instrument may be the facility where the instrument is used or the manufacturer of the instrument. The owner of data on procedure(s), vitals, and biometric including outcomes may be the patient who underwent the procedures and/or a measurement of whom produced the vitals, and biometric including the outcomes. In examples, the assigned entity of the compartmentalized data may be indicated in metadata associated with the compartmentalized data, for example, using metadata tagging.

An entity may access a dataset portion to which the entity is assigned and may not access a dataset portion to which the possession entity is not assigned. In examples, when an entity requests a portion of a dataset that includes the portion the entity owns and a portion that the entity does not own, the portion that the entity does not own may be removed from the dataset (or a non-released subset, for example, the subset that requires a consent of transfer). When an entity requests a removal of a portion of the dataset, the portion that the entity does not own may not be changed. In some examples, if a dataset is compartmentalized, the compartmentalized portion that an entity does not own (or the non-released subset) may be summarized (e.g., in a way that does not identify an individual who is not the owner). A generalized or summarized version of data may provide the basics of the information without the individualized data details. The entity may be a patient who requests a change in the patient consent to use the compartmentalized data.

A healthcare system or facility may have one or more policies in place that further limit data disclosure. In examples, the healthcare system or facility may prevent or forbid coupled transmission or display of data that is both partially accessible (and partially inaccessible) to a user, for example, based on the consent and assignment of rights to the system and/or the data. A data system may provide data access through one or more of redaction, separation into individual elements, display of the user raw data (e.g., display of the user raw data only), or another level of removal of data that is subject to the policies.

For example, data on purchasing cost of instruments may be separated from data on the billing price of the procedure, tasks, and recovery. Within a system, the data on the purchasing cost (e.g., instrument purchase price inventory numbers) may be linked to the data on the billing price of the procedure, tasks, and recovery. The data on the purchasing cost may be owned by the healthcare facility. The data on the billing price may include detailed patient billing that indicates patient identifier elements and is likely at least partially owned by the patient. The patient may have a right to view a list (e.g., a full detailed list). A data system may redact the instrument purchase price inventory numbers, etc. from the view of the patient, for example, if the facility may have one or more policies in place that limit the disclosure of the full detailed list in this circumstance.

The data system may determine minimum decomposition subset(s) based on the data. The minimum decomposition subset(s) may include the minimum subset that does not identify a patient (e.g., more likely than not to keep the privacy of the patient or a risk to identify a patient is smaller than a certain threshold). A minimum decomposition subset(s) for a dataset may be determined based on a risk of identifying a patient. For example, a rage replacement datapoint with respect to the uniqueness of the comorbidity or biomarker may be used to determine the magnitude of the abstraction or minimum decomposition subset(s) (e.g., a subset of patients aged 10-24 with cancer may risk identifying a patient out of the population). Outlier(s) within a predefined dataset may be used to adjust the summary or abstraction level. In some examples, an impact of a subset (e.g., as a key driver) on an output of a machine learning model may be used to determine or control an inclusion criterion (e.g., which data to include in the subset).

The data system may add data, remove data, change data, replace data, for example, based on a request. The data system may identify the data that is subject to the request. The data system may determine a location of the data, for example, by tracking the access, inclusion, and/or utilization of the data (e.g., as shown by the example in FIG. 9). The data system may keep logs of tracking information, for example, using utilization information. The utilization information may be accessed (e.g., by a patient) for a complete itemized history of the access or usage of the data. The location and/or utilization of the data may be displayed. Displaying location and/or utilization of the data throughout an overall system may enable a review and potentially a removal (e.g., by the administrator or scientists) of data (e.g., patient's data) that is not contributing to the patterns, conclusions, or results of the system.

The data system may remove private data from a dataset that is used by a program (or an algorithm). For example, if a patient revokes a consent to the usage of the patient's data by the program, the data system may identify the patient's data using the utilization information and remove the patient's data via a data removal module (e.g., the data removal module 45022). In some examples, a removal of private data may improve an operation of a device, a system, or a surgical task.

The removal of data (e.g., the private data) may impact the program, an output of the program, and/or a database (e.g., integrated database) which may contain or use the data. In examples, the impact may be minimized by replacing the removed data with one or more of the following: a summary of the data (e.g., a generic or system generated summary); a weighted summary parameter; an aggregation of the data; public data. In some examples, the data system may convert private data into public data or data that do not require HIPAA protection, or replace the private data subject to removal with other private data.

An impact of the removal of the data on the program or the database may be minimized (e.g., to an extent) using a generalized version of data or a summary of the data. A generalized or summarized version of data may provide basic information without the individualized data details. In examples, if a user requests the removal or the redaction of the user's data from shared database(s) and/or compilation algorithm(s), a data system may replace the user's data with a generic summary or a system-generated summary. The generic summary or system-generated summary may include basic information generalized from the user's data or a general conclusion of the user's data without identifying the user. Replacing the removed data with the generalized version of data or the summary of the data may prevent an impact on a compilation result (e.g., the compilation result of an algorithm that actively uses a database that previously includes the removed data). In some examples, a removal of the user's data may result in a shift in a trend or in an average associated with the database.

An impact of the removal of the data on the program or the database may be minimized using a summary parameter (e.g., a weighted summary parameter). For example, the data system may replace the removed data with the summary parameter. Replacing the removed data with the summary parameter may prevent the removal of data from dramatically changing the output of a program, for example, a machine learning model. In examples, the summary parameter may indicate a synthetically generated aspect of the removed data. For example, the summary parameter may be generated using distillations in one or more examples herein. In some examples, the summary parameter may indicate an impact (e.g., the resulting directionality or bias) of the removed data on the program, for example, whether the removed data positively or negatively impacted the output of the program.

An impact of the removal of the data on the program or the database may be minimized by replacing private data with other data (e.g., functionally non-private data such as public data). For example, replacing the private data with public data may minimize the impact of the removed data of a specific private dataset on a machine learning model that uses the private dataset or on an output of the machine learning model.

For example, the data system may generate a population average data based on the removed data and other private data (e.g., all of the available private data may be combined to generate the population average data). The population average data may include one or more of the following: an average; a mean and standard deviation; limits (e.g., minimum/maximum); quartiles; a probability distribution or characterization (e.g., skewness or other aspect(s)) of an overall dataset; directionality or aspect(s) of internal device operational parameter(s); response(s) of a device to the environment that the device is exposed (e.g., interactive device information may be different from the response(s) of the device to the environment). The population data average may be generated by combining individual data points. Using the population data average or replacing the removed data with the population data average may minimize the impact of a data point (e.g., the single data point that is being removed or purged from a machine learning model). In some examples, a level of abstraction may be determined.

An impact of the removal of the data on the program or the database may be minimized by aggregating (e.g., averaging) the private data that is to be removed. In examples, the average of the private data may be used if the number of summarized variables (e.g., individual data point aspect variables) is not less than a predetermined number. The predetermine number may vary based on the uniqueness of the biomarker or the risk of the biomarker in identifying a specific individual.

The data system may determine whether to replace the removed data, for example, based on an impact or potential impact of the removal of the data.

The data system may determine an impact of a removal of data on a database (e.g., on an overall database) and may determine a location (e.g., which part of the database or system has been impacted) impacted by the removal of the data. The data system may track for the location and/or impact of a specific user's data (e.g., within the overall database and/or conclusions). In examples, the data system may identify and/or graphically display the locations and impacts of the user's data on the overall database or system. For example, the data system may determine a impact score that indicates a potential impact of a removal of private data on a machine learning model.

The data system may control or manage an impact of the removal of the data on a program (e.g., a machine learning model) or an output of the program (e.g., an algorithm forecast, prediction, summation determination of impacts) based on the addition or subtraction of data from the overall dataset (e.g., the implications or changes to the databased may be determined based on the inclusion or exclusion of a specific dataset or data pair). The data system may limit the magnitude of impact of the removal of the data on the output of the program in proportion to the amount of the removed data.

Figure 17:
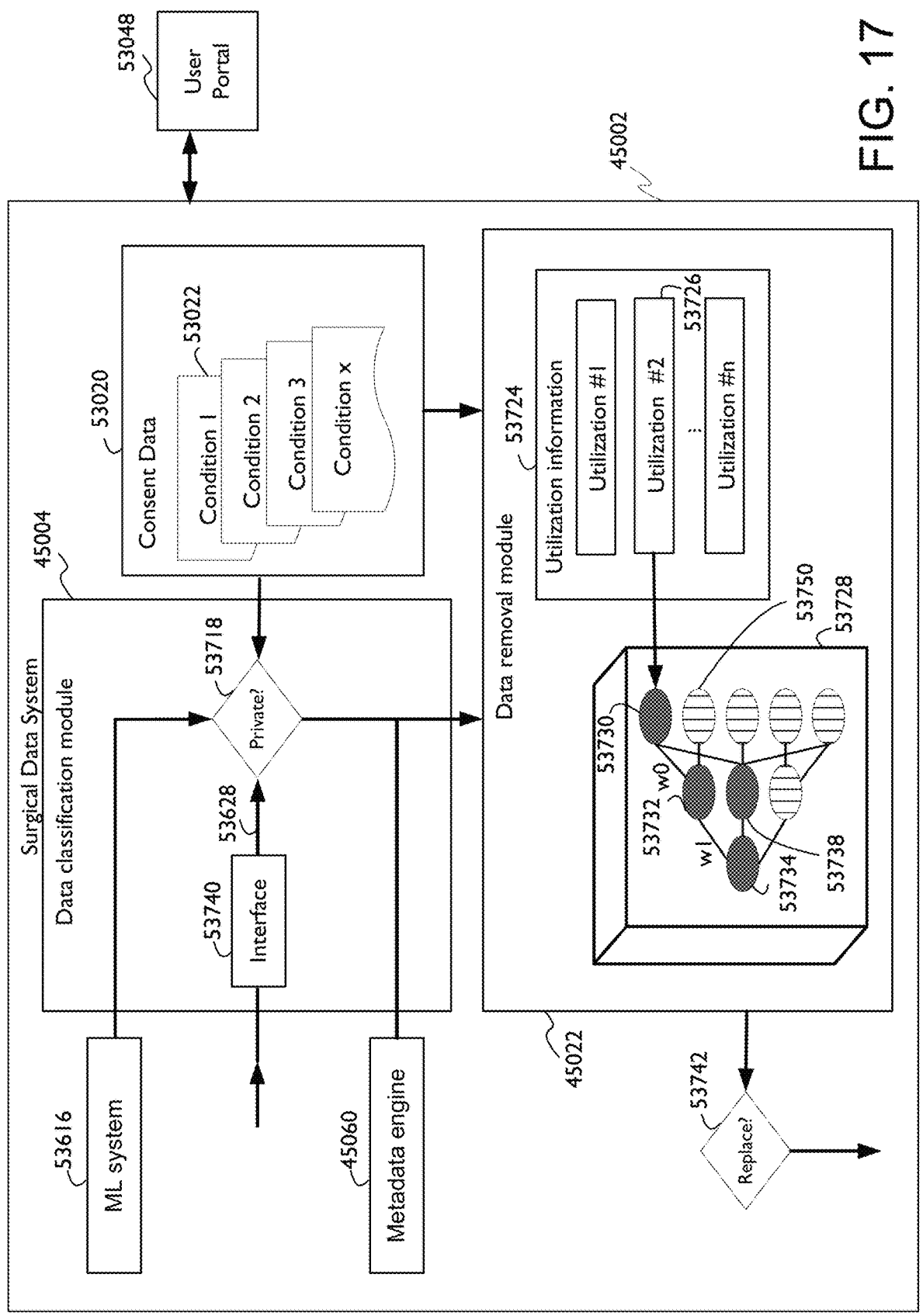
FIG. 17 shows an example of data removal.

FIG. 17 shows an example of data removal. The surgical data system 45002 may receive a request to change of a consent to use a dataset, for example, via the user portal 53048.

The data classification module 45004 may determine whether a dataset, for example, the dataset 53628, is private data. The data classification module 45004 may receive the dataset 53628 though an interface 53740.

The data classification module 45004 may determine whether the dataset 53628 is private data or public data based on one or more of the interface 53740 via which the dataset 53628 is received, the patient consent data 53020 associated with the dataset 53628, or metadata associated with the dataset 53628. In examples, the data classification module 45004 may determine whether the dataset 53628 is private data or public data using a machine learning model. The machine learning model may be generated using the machine learning system 53616. The interface 53740 may be configured to receive the dataset 53628 from a certain type of instrument or equipment, or a device that uses a certain type of program (e.g., a machine learning model). Based on the interface 53740 via which the dataset 53628 is received, the data classification module 45004 may determine that the dataset 53628 is from a specific type of instrument or equipment or a device that uses a specific type of program.

The patient consent data 53020 may include condition 53022. The condition 53022 may be associated with the dataset 53628. For example, the condition 53022 may indicate that if dataset 53628 is owned by the patient's primary surgeon (e.g., who created the dataset). The interface 53740 may indicate that the dataset 53628 is received from a type of surgical instrument which is consistent with the specialty of the primary surgeon. The metadata associated with the dataset may indicate a background of a surgical procedure (e.g., the surgical procedure may be performed by the primary surgeon using the surgical instrument). For example, the metadata of the dataset may identify the surgical instrument and/or the primary surgeon. In U.S. patent application Ser. No. 17/493,913, titled SURGICAL METHODS USING FIDUCIAL IDENTIFICATION AND TRACKING, filed Oct. 5, 2021, the disclosure of which is herein incorporated by reference in its entirety, information about a surgical instrument may be tracked using a fiducial marker.

The machine learning model may have been trained using the machine learning system 53712 to identify private data, for example, based on pre-labeled historical data including consent data, interface information, and/or metadata.

The data classification module 45004, at 53718, may determine whether the dataset 53628 includes private data. For example, the determination of whether the dataset 53628 includes private data may be based on an output of the trained machine learning model which may indicate a probability that the dataset 53628 identifies a patient. If the probability is higher than a certain value, the data classification module 45004 may determine that the dataset 53628 includes private data. The dataset 53628 may be tagged, for example, by the metadata engine 53714, as private data.

The data removal module 45022 may identify the dataset 53628 based on the request to change the consent. The request may include a consent key, which includes an encrypted patient identifier. The data removal module 45022 may identify the dataset 53628 based on the consent key (e.g., the metadata of the dataset 53628 may include the consent key). The change may include revoking a consent previously given to, for example, a medical entity such as a hospital. The change may include granting a consent to a different usage (e.g., data to be used in a new control program) or include renewing a consent that has been revoked. In some examples, the data removal module 45022 may identify the consent key associated with the changed consent based on the patient consent data 53020.

The data removal module 45022 may identify the consent key in utilization information 53724, which logs a history of access and usage of the dataset 53628 associated with the consent key. Utilization file #1 through #n may indicate various usages of the dataset 53628 associated with the consent key. For example, the utilization file 53726 may indicate the usage (e.g., the location) of the dataset 53628 for a machine learning model 53728, e.g., by logging the usage of the dataset 53628 in the training process. The utilization file 53726 may indicate which function the dataset 53628 has been used for, for example, whether the dataset 53628 has been used as a training dataset, a validation dataset, or a test dataset for the machine learning model 53728. The utilization file 53726 may indicate which model parameter has been associated with the consent key.

For example, the dataset 53628 may be used as part of input data to train the machine learning model 53728. The model parameter that has been impacted by the inclusion of the dataset 53628 in the input data may include node 53730 and may not include node 53750. The impacted model parameter(s) may be determined using the utilization file 53726. In some examples, the impacted model parameter(s) may be identified based on one or more of a change in the output of the model with the inclusion of the dataset, the consent key associated with the dataset (e.g., when tracked in the training process), the metadata associated with the dataset, an association of a model parameter with another model parameter.

For example, training using the dataset 53628 may generate the connection between the node 53730 and a node 53732, the connection between the node 53730 and a node 53738, and weight parameter W0 for the connection between the node 53730 and the node 53732. Although the machine learning model 53728 and the model parameters in FIG. 17 are used herein, other type of models (e.g., linear regression, deep neural networks, linear discrimination analysis) may be used in association with one or more examples herein.

The surgical data system 45002 may determine the impact of the removal of the dataset 53628 from the input data to the machine learning model 53728. The request received via the user portal 53048 may indicate a removal of the dataset 53628 from the input data of the machine learning model 53728. As shown in FIG. 17, the node 53730 may be connected to the node 53732 and the node 53738. In some examples, weights associated with the node 53732 and the node 53738 may also be affected by the removal. The connection between the node 53732 and a node 53734 or the connection between the node 53738 and the node 53734 may be affected by the removal. In the example shown in FIG. 17, node 53735 is not affected by the removal of the dataset 53628 from the input data to the machine learning model 53728.

The surgical data system 45002 may determine an impact score by comparing the machine learning model (e.g., the output of the machine learning model) to which the data that is subject to removal contributes with a machine learning model that the data does not contribute (e.g., a known non-dataset algorithm). In examples, machine learning models for controlling different devices may be associated, while the data used to train the machine learning models may not be associated.

For example, dataset A may be used to train a machine learning model A for control adjustment of a monopolar energy device. Dataset B may be used to train a machine learning model B for control adjustment of a bipolar energy device. Machine learning model A and machine learning model B may be associated, for example, if the monopolar energy device and the bipolar energy device have been used in a same surgical operation. Dataset A may include imaging data showing the identity of the patient undergoing the surgical operation such as visual smoke plume data. The imaging data may be removed from dataset A upon a request from the patient. Dataset B may not include the imaging data showing the identity of the patient. An output of the machine learning model A (e.g., after retraining due to the removal of the imaging data from dataset A) may be compared with an output of the machine learning model B, for example, to determine an impact score of the imaging data.

The data system may determine the impact score based on a variance in an output of a machine learning model before the data that contributes to the machine learning model is removed and after the data is removed. The data system may determine the impact of the data on the machine learning model (e.g., an overall result of the machine learning model). The data system may measure the impact of the data (e.g., the influence of the data). The data system may adjust the machine learning model based on the impact of the data. In examples, the data system may determine a weight response based on the impact of the data.

The surgical data system 45002 may determine the impact score associated with the dataset 53628, for example, based on one or more of the number of affected nodes, the layer(s) in which the affected nodes are located, the number of connections related to the affected nodes, or the weights associated with the connections. For example, an impact score associated with the dataset 53628 may increase as the number of affected nodes increases.

A removal of a different dataset may affect different model parameter(s). In some examples, the model parameters that are affected by the removal may be displayed and/or used by a patient to understand where the patient's data has made an impact and the magnitude of the impact.

The surgical data system 45002 may replace the removed dataset 53628 with replacement data, for example, if the impact score is greater than a certain value. The value may be determined based on an impact of historical data on the machine learning model 53728. The value may be predetermined.

If the impact score is lower than the value, the data system may remove the dataset 53628 without replacing the dataset 53628. As shown in FIG. 17, a decision may be made, at 53742, on whether to replace the removed dataset 53628 based on the determined impact score.

Figure 18:
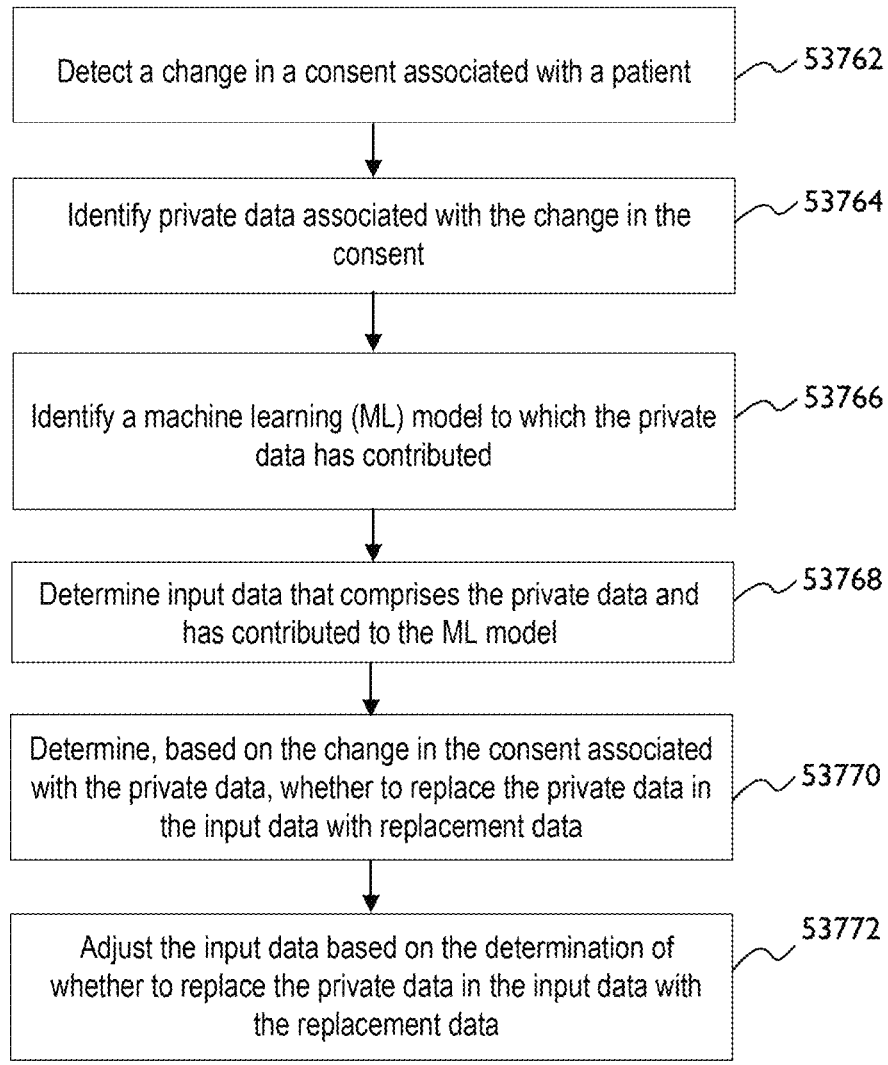
FIG. 18 shows an example for data adjustment for a machine learning model.

In some examples, the surgical data system 45002 may adjust the machine learning model 53728 if the impact score is greater than the value. For example, the surgical data system 45002 may adjust the affected module parameters. For example, the surgical data system 45002 may lower the value of W0 and/or W1 to lower the impact score, for example, until the impact score is lower than the value. FIG. 18 shows an example for data adjustment for a machine learning model. At 53762, a data system (e.g., the surgical data system 45002 including the data classification module 45004 and the data removal module 45002) may detect a change in a consent associated with a patient. At 53764, the data system may identify private data (e.g., the dataset 53628) associated with the change in the consent. At 53766, the data system may identify a machine learning model (e.g., the machine learning model 53728) to which the private data has contributed. At 53768, the data system may determine input data that has contributed to the machine learning model. The input data may include the private data. At 53770, the data system may determine, based on the change in the consent associated with the private data, whether to replace the private data in the input data with replacement data. At 53772, the data system may adjust the input data based on the determination of whether to replace the private data in the input data with replacement data.

A data system (e.g., the surgical data system 45002) may adjust the input data to a machine learning model (e.g., the machine learning model 53728) by one or more of the following: removing at least a portion of private data (e.g., the dataset 53628) associated with a change of a consent from the input data, replacing the private data with private data that differs from the private data associated with change in the consent, replacing the private data with public data, or converting the private data to the public data.

A data system (e.g., the surgical data system 45002) may replace private data (e.g., the dataset 53628) associated with a change in a consent with synthetic data. For example, the data system may generate synthetic data based on the private data if the data system determines, based on the change in the consent, to replace the private data. The data system may replace the private data in the input data with the generated synthetic data. For example, the synthetic data may include transformed data or transformed dataset after the private data is processed using data enrichment. In some examples, the synthetic data may be generated by replacing one or more fields of a dataset with artificial data.

Figure 19:
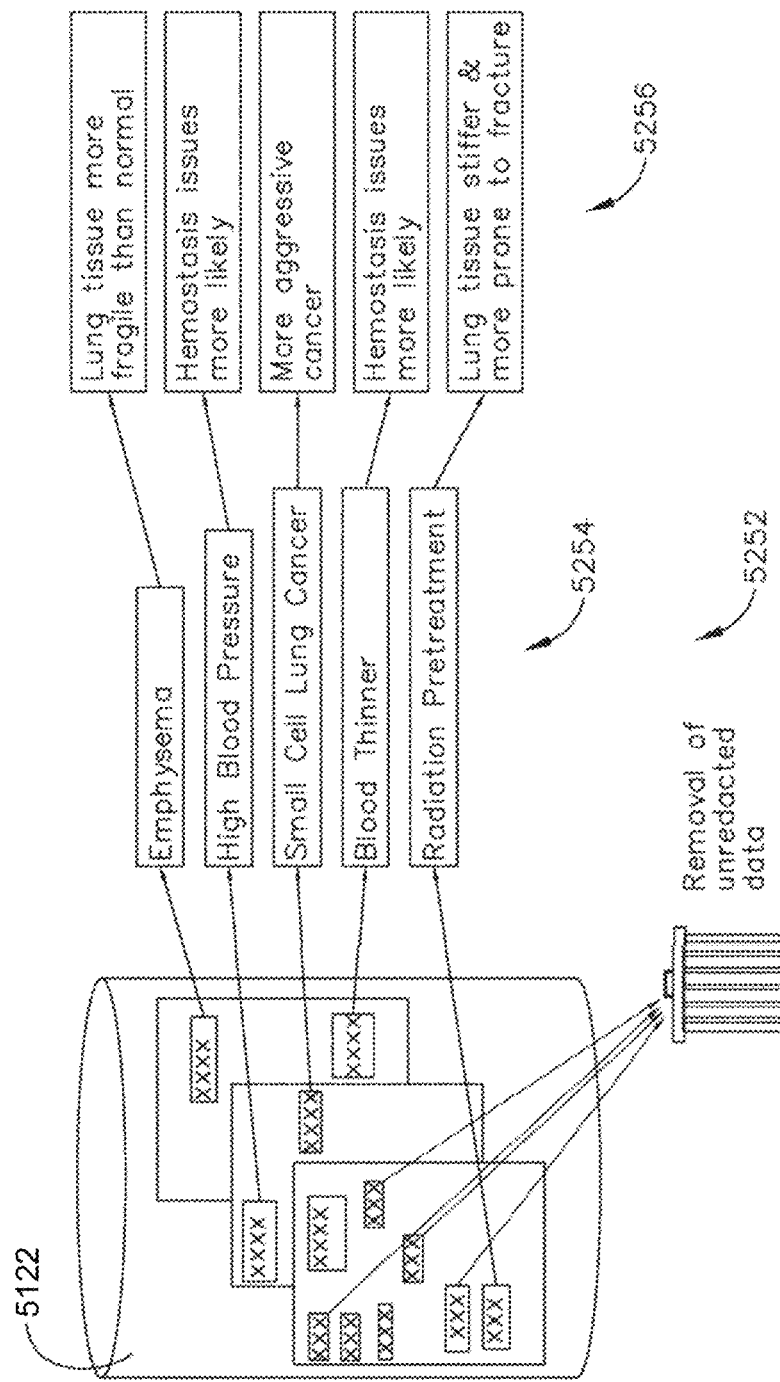
FIG. 19 shows an example of replacing private data with synthetic data.

FIG. 19 shows an example of replacing private data with synthetic data. As shown in FIG. 19, the data system may retrieve data stored in a database 5122, to which the data system is communicatively connected. Private data (e.g., unredacted private data) 5252 may be identified using one or more examples herein (e.g., the example shown in FIG. 17). Private data 5252 may be removed. The removed private data 5252 may include medical conditions that a patient is suffering from, the patient's medical history (including previous treatments or procedures), medication that the patient is taking, and other such medically relevant details. As shown in FIG. 19, the removed private data 5252 may include data 5254 indicating various medical conditions and history of a patient: (i) the patient is suffering from emphysema; (ii) has high blood pressure; (iii) is suffering from a small cell lung cancer; (iv) is taking warfarin (or another blood thinner); and/or (v) has received radiation pretreatment. Inferences 5256 may be derived from the data 5254 may include that (i) the lung tissue will be more fragile than normal lung tissue, (ii) hemostasis issues are more likely, (iii) the patient is suffering from a relatively aggressive cancer, (iv) hemostasis issues are more likely, and (v) the lung tissue will be stiffer and more prone to fracture, respectively. The data system may replace the removed data with various inferences 5256. A control program may use the various inferences 5256 to derive various control adjustments (e.g., for the modular devices 5102), for example, without data 5254. The derived inferences 5256 can be based upon individual pieces of data or combinations of pieces of data. Further, the derived inferences 5256 may, in some cases, be redundant with each other as some data may lead to the same inference. The data system may identify and/or remove redundant inferences. The control program may generate pre-procedure adjustments, for example, to optimally control each of the modular devices 5102 based on the unique circumstances associated with individual patients even after the patient data has been removed.

A data system (e.g., the surgical data system 45002) may adjust a machine learning model that is impacted by a removal of private data from the input data to the machine learning model (e.g., the machine learning model 53728). For example, the data system may determine to remove at least a portion of the private data (e.g., the dataset 53628) from the input data and not to replace the removed portion of the private data. The data system may identify an impacted model parameter associated with the machine learning model based on the removed portion of the private data. The impacted model parameter may include, for example, the node 53730, a weight used in a trained machine learning model such as the machine learning model 53728, or a bias used in the trained machine learning model such as the machine learning model 53728. The weight and/or the bias may be associated with the node 53730. The data system may determine an adjustment to the impacted model parameter based on removed portion of the private data. For example, the data system may adjust the bias to make up the variance between the output of the machine learning model after the removal of the data and the output of the machine learning model before the removal of the data. The data system may adjust the weight to increase or decrease the extent in which the output of the machine learning model varies with a change of data that is inputted to the machine learning model, for example, by comparing the output of the machine learning model after the removal of the data and the output of the machine learning model before the removal of the data. The data system may adjust the machine learning model based on the determined adjustment associated with the impacted model parameter.

A data system (e.g., the surgical data system 45002) may replace private data (e.g., the dataset 53628) associated with a change in a consent with other private data. For example, the data system may obtain private data that is not impacted by the change in the consent based on the private data associated with the change in the consent, if the data system determines, based on the change in the consent, to replace the private data. The data system may replace the private data associated with the change in the consent with the private data that is not impacted by the change in the consent. As an example, the private data that is not impacted by the change in the consent may share a common characteristic with the private data associated with the change in the consent.

A data system (e.g., the surgical data system 45002) may determine whether to replace private data (e.g., the dataset 53628) associated with a change in a consent with replacement data based on a predicted change of the output of a machine learning model (e.g., the machine learning model 53728). The data system may predict the change of the output of the machine learning model based on the change in the consent associated with the private data. For example, the data system may predict the change of the output of a machine learning model based on historical data (e.g., a change in an output of the machine learning model due to a removal of a dataset that has common characterization as the dataset 53628). The change in the output of the machine learning model due to the removal of the dataset that has common characterization as the dataset 53628 may have been determined based on a variance in an output of the machine learning model before the removal of the historical data and after the removal of the historical data.

A data system (e.g., the surgical data system 45002) may determine whether to replace private data (e.g., the dataset 53628) associated with a change in a consent with replacement data based on an impact score associated with the private data. For example, the data system may determine the impact score based on the number of model parameters that are to be impacted by a removal of the private data and/or the extent to which the model parameters are to be impacted by the removal of the private data. For example, the extent to which a model parameter is to be impacted by the removal of the private data may be indicated by a weight of the model parameter (e.g., the model parameter 53730) associated with a machine learning model (e.g., the machine learning model 53728). If the determined impact score is greater than or equal to a threshold, the data system may replace the private data with the replacement data. If the determined impact score is less than the threshold, the data system may not replace the private data with the replacement data.

A data system (e.g., the surgical data system 45002) may determine whether a dataset (e.g., the dataset 53628) contains private data based on a machine learning model (e.g., the machine learning model generated by the machine learning system 53616). For example, the data system may determine a classification parameter for the dataset based on a data classification machine learning model (e.g., the machine learning model generated by the machine learning system 53616). The classification parameter may indicate a privacy level associated with the dataset. The privacy level being private (e.g., if the privacy level is greater than to equal to a threshold) may indicate that the dataset is capable of identifying a patient (e.g., the dataset may include private data). The privacy level being public (e.g., if the privacy level is less than the threshold) may indicate that the dataset is not capable of identifying a patient (e.g., the dataset may include public data and not private data). The data system may add the classification parameter in metadata of the dataset. The data system may identify private data associated with a change in a consent associated with a patient based on the classification parameter of the dataset. In some examples, the data system may replace the private data associated with the change in the consent with public data if the data system identifies the public data using the classification parameter associated with a dataset that includes the public data.

The invention claimed is:

1. A medical data processing system, comprising:
a memory; and
a processor configured to:
  obtain a consent key associated with a patient;
  detect a change in a consent associated with the patient based on the consent key;
  identify private data associated with the change in the consent;
  identify a machine learning (ML) model to which the private data has contributed;
  determine input data that has contributed to the ML model, wherein the input data comprises the private data;
  determine an impact score associated with the private data;
  determine, based on the change in the consent associated with the private data and the impact score associated with the private data, whether to replace the private data in the input data with replacement data; and
  adjust the input data based on the determination of whether to replace the private data in the input data with the replacement data.

2. The medical data processing system of claim 1, wherein the adjustment of the input data comprises a removal of at least a portion of the private data from the input data, a replacement of the private data with private data that differs from the private data associated with the change in the consent, a replacement of the private data with public data, or a conversion of the private data to the public data.

3. The medical data processing system of claim 1, wherein the processor is further configured to:
  based on a determination to replace the private data, generate synthetic data based on the private data; and
  replace the private data in the input data with the generated synthetic data.

4. The medical data processing system of claim 1, wherein the processor is further configured to:
  based on a determination to not replace the private data, remove a portion of the private data from the input data;
  identify an impacted model parameter associated with the ML model based on the removed portion of the private data;
  determine a weight adjustment to the impacted model parameter based on the removed portion of the private data; and adjust the ML model based on the determined weight adjustment associated with the impacted model parameter.

5. The medical data processing system of claim 1, wherein the private data is first private data, and the processor is further configured to:
based on a determination to replace the first private data, obtain second private data based on the first private data, wherein the second private data is not impacted by the change in the consent; and
replace the first private data with the second private data.

6. The medical data processing system of claim 1, wherein the processor is further configured to predict a change of an output of the ML model based on the change in the consent associated with the private data, and the determination of whether to replace the private data in the input data with the replacement data is based on the predicted change of the output of the ML model.

7. The medical data processing system of claim 1, wherein,
based on a condition that the determined impact score is greater than or equal to a threshold, the processor is configured to replace the private data with the replacement data, or,
based on a condition that the determined impact score is less than the threshold, the processor is configured to remove the private data.

8. The medical data processing system of claim 1, wherein the ML model comprises a weight of a model parameter associated with the ML model, and the impact score associated with the private data is determined based on the weight of the model parameter associated with the ML model.

9. The medical data processing system of claim 1, wherein the processor is further configured to:
obtain a dataset associated with the patient; and
determine privacy characterization of the dataset based on a data classification ML model, wherein the privacy characterization being private indicates that the dataset being capable of identifying the patient,
wherein the private data associated with the change in the consent associated with the patient is identified based on the privacy characterization of the dataset.

10. The medical data processing system of claim 1, wherein the processor is further configured to:
based on a determination to replace the private data, identify public data based on a classification parameter of a dataset comprising the public data, wherein the classification parameter of the dataset comprising the public data indicates a privacy level being public, and the privacy level being public indicates that the dataset does not identify the patient; and
replace the private data with the identified public data.

11. A method performed by a medical data processing system, comprising:
obtaining a consent key associated with a patient;
detecting a change in a consent associated with the patient based on the consent key;
identifying private data associated with the change in the consent;
identifying a machine learning (ML) model to which the private data has contributed;
determining input data that has contributed to the ML model, wherein the input data comprises the private data;
determining an impact score associated with the private data;

determining, based on the change in the consent associated with the private data and the impact score associated with the private data, whether to replace the private data in the input data with replacement data; and
adjusting the input data based on the determination of whether to replace the private data in the input data with the replacement data.

12. The method of claim 11, wherein adjusting the input data comprises a removal of at least a portion of the private data from the input data, a replacement of the private data with private data that differs from the private data associated with the change in the consent, a replacement of the private data with public data, or a conversion of the private data to the public data.

13. The method of claim 11, further comprising:
based on a determination to replace the private data, generating synthetic data based on the private data; and
replacing the private data in the input data with the generated synthetic data.

14. The method of claim 11, further comprising:
based on a determination to not replace the private data, removing a portion of the private data from the input data;
identifying an impacted model parameter associated with the ML model based on the removed portion of the private data;
determining a weight adjustment to the impacted model parameter based on the removed portion of the private data; and
adjusting the ML model based on the determined weight adjustment associated with the impacted model parameter.

15. The method of claim 11, wherein the private data is first private data, and the method further comprises:
based on a determination to replace the first private data, obtaining second private data based on the first private data, wherein the second private data is not impacted by the change in the consent; and
replacing the first private data with the second private data.

16. The method of claim 11, further comprising predicting a change of an output of the ML model based on the change in the consent associated with the private data, and wherein the determination of whether to replace the private data in the input data with the replacement data is based on the predicted change of the output of the ML model.

17. The method of claim 11,
wherein,
based on a condition that the determined impact score is greater than or equal to a threshold, the method comprises replacing the private data with the replacement data, or,
based on a condition that the determined impact score is less than the threshold, the method comprises removing the private data.

18. The method of claim 11, wherein the ML model comprises a weight of a model parameter associated with the ML model, and the impact score associated with the private data is determined based on the weight of the model parameter associated with the ML model.

19. The method of claim 11, further comprising:
determining a classification parameter for a dataset based on a data classification ML model, wherein the classification parameter indicates a privacy level associated with the dataset, wherein the privacy level being private indicates that the dataset being capable of identifying the patient, and wherein the private data associated with the change in the consent is identified based on the classification parameter of the dataset.

20. The method of claim 11, further comprising:

based on a determination to replace the private data, identifying public data based on a classification parameter of a dataset comprising the public data, wherein the classification parameter of the dataset comprising the public data indicates a privacy level being public, and the privacy level being public indicates that the dataset does not identify the patient; and replacing the private data with the identified public data.

* * * * *